(12) United States Patent
Suzuki et al.

(10) Patent No.: US 7,943,228 B2
(45) Date of Patent: *May 17, 2011

(54) PRINTING MEDIUM

(75) Inventors: Katsuhito Suzuki, Matsumoto (JP);
Mitsuaki Yoshizawa, Minowa-machi (JP); Mitsuru Nakata, Suwa (JP);
Fumiaki Mukaiyama, Ina (JP)

(73) Assignee: Seiko Epson Corporation, Tokyo (JP)

( * ) Notice: Subject to any disclaimer, the term of this patent is extended or adjusted under 35 U.S.C. 154(b) by 951 days.

This patent is subject to a terminal disclaimer.

(21) Appl. No.: 11/739,436

(22) Filed: Apr. 24, 2007

(65) Prior Publication Data
US 2007/0248774 A1    Oct. 25, 2007

(30) Foreign Application Priority Data

Apr. 24, 2006  (JP) .................. 2006-119016
Jun. 2, 2006   (JP) .................. 2006-154659
Jun. 16, 2006  (JP) .................. 2006-167036

(51) Int. Cl.
*B41M 5/00* (2006.01)
(52) U.S. Cl. .............. 428/195.1; 359/624; 359/618; 359/619; 359/710; 359/455; 359/463
(58) Field of Classification Search .......... 359/624, 359/618, 619, 710, 455, 463; 428/195.1
See application file for complete search history.

(56) References Cited

U.S. PATENT DOCUMENTS

| 4,497,126 A * | 2/1985 | Dejean ............... 40/124.02 |
| 6,404,555 B1 * | 6/2002 | Nishikawa ............ 359/619 |
| 7,212,346 B2 * | 5/2007 | Krause ............... 359/619 |
| 7,359,120 B1 * | 4/2008 | Raymond et al. ...... 359/626 |
| 7,672,053 B2 * | 3/2010 | Suzuki et al. ........ 359/619 |
| 2006/0013993 A1 * | 1/2006 | Havive et al. ......... 428/131 |

FOREIGN PATENT DOCUMENTS

| CN | 1304836 | 7/2001 |
| JP | 61-192873 | 12/1986 |

(Continued)

OTHER PUBLICATIONS

U.S. Appl. No. 11/682,826, Oct. 30, 2009, Notice of Allowance.

(Continued)

*Primary Examiner* — Bruce H. Hess
*Assistant Examiner* — Tamra L Amakwe
(74) *Attorney, Agent, or Firm* — Workman Nydegger

(57) ABSTRACT

A printing medium includes: a rectangular lens sheet that has a surface formed in a predetermined lens shape; and a thin base that is fixed to a rear surface of the lens sheet on which no lens is formed and has an extending portion extending from one side of the lens sheet to the outside. In the printing medium, when a region corresponding to the rear surface of the lens sheet is referred to as a unit region, the extending portion includes a plurality of unit regions adjacent to one another with adjacent portions, which are common sides, interposed therebetween, and a first printing surface and a second printing surface having predetermined images formed thereon are formed in corresponding unit regions on one surface of the base that is fixed to the rear surface of the lens sheet or the other surface of the base. In addition, at least one unit region is additionally interposed between the unit region where the first printing surface is formed and the unit region where the second printing surface is formed.

8 Claims, 26 Drawing Sheets

FOREIGN PATENT DOCUMENTS

| | | |
|---|---|---|
| JP | 04-289892 | 10/1992 |
| JP | 3001917 | 6/1994 |
| JP | 3471930 | 5/1996 |
| JP | 11-192696 | 7/1999 |
| JP | 2000-190668 | 7/2000 |
| JP | 2001-105723 | 4/2001 |
| JP | 2001-166402 | 6/2001 |
| JP | 2000-365405 | 12/2002 |
| JP | 2003-067707 | 3/2003 |
| JP | 2004-177727 | 6/2004 |
| JP | 2004-192406 | 7/2004 |
| JP | 2005-196152 | 7/2005 |
| JP | 2005-196153 | 7/2005 |
| JP | 2007-004014 | 1/2007 |
| JP | 2007-011040 | 1/2007 |

OTHER PUBLICATIONS

U.S. Appl. No. 11/682,826, Apr. 2, 2009, Office Action.
U.S. Appl. No. 11/682,826, Oct. 29, 2008, Final Office Action.
U.S. Appl. No. 11/682,826, Aug. 4, 2008, Office Action.

* cited by examiner

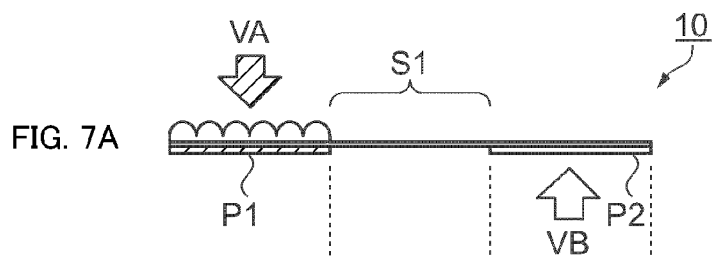
FIG. 7A
FIG. 7B
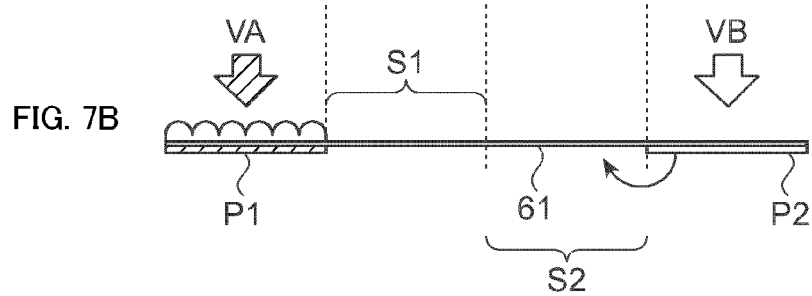
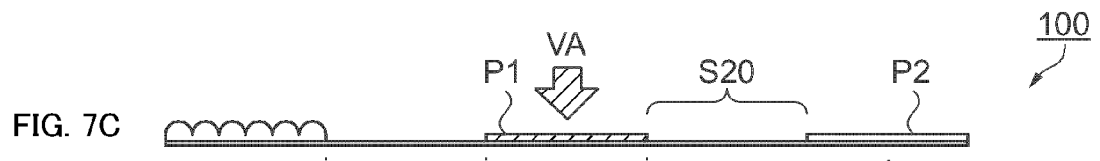
FIG. 7C
FIG. 7D
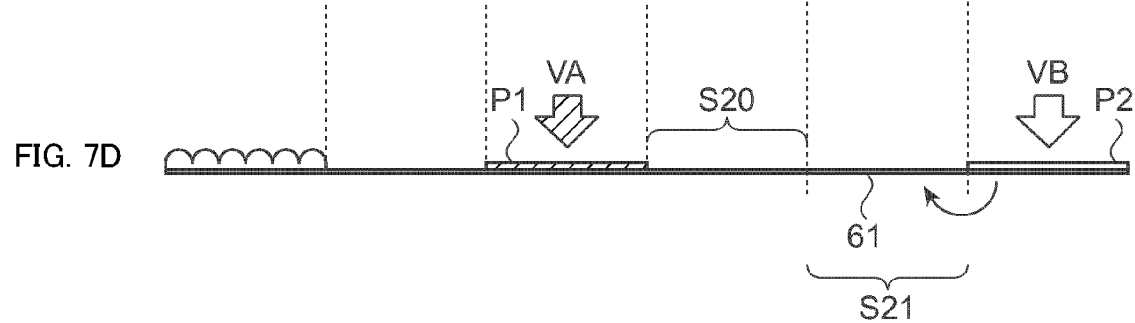

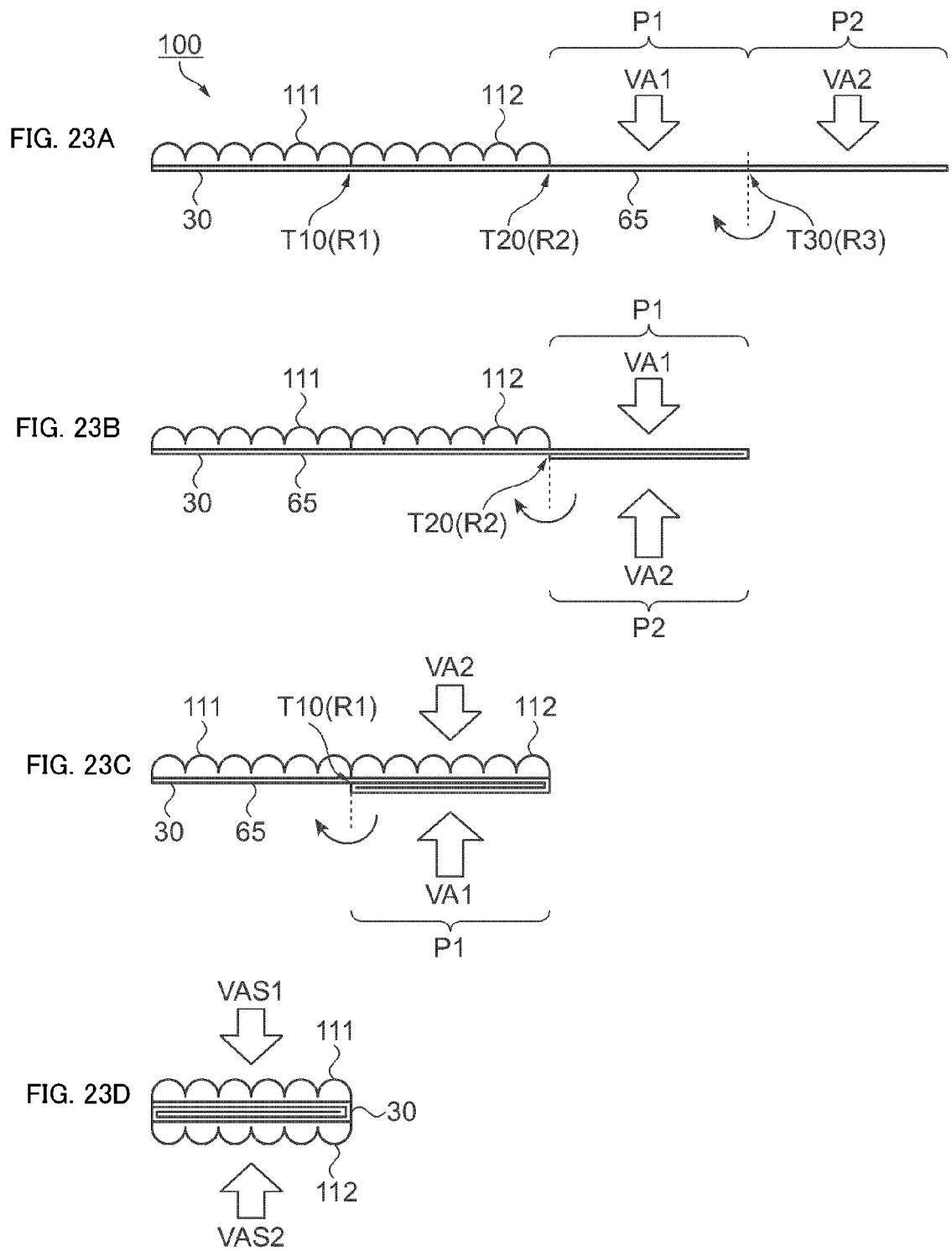

PRINTING MEDIUM

BACKGROUND

1. Technical Field

The present invention relates to a printing medium having a rectangular lens sheet formed in a predetermined lens shape on a surface thereof.

2. Related Art

In the related art, three-dimensional images are formed by the following methods: a method of using a lens sheet (hereinafter, referred to as a 'lenticular sheet') that has a lenticular lens including a plurality of cylindrical convex lenses arranged on a surface thereof; and a method of using a fly-eye lens having a plurality of convex lenses arranged in plan view, which is called integral photography.

In these methods, images for right and left eyes, that is, parallax images are arranged at positions corresponding to a plurality of lenses, so that a three-dimensional image is obtained due to the arranged parallax images. Therefore, when the parallax images are not arranged at exact positions corresponding to the lenses, it is difficult to obtain a three-dimensional image.

Therefore, a technique for directly printing parallax images on the lenticular sheet has been proposed in order to exactly align the parallax images with the lenses (for example, see Japanese Patent No. 3471930). In addition, a technique for leaving a portion of the lenticular sheet on the printing surface and for printing parallax images at positions corresponding to the lenses of the left portion of the lenticular sheet has been proposed (for example, see JP-A-2005-196153).

In addition to the printing techniques disclosed in Japanese Patent No. 3471930 and JP-A-2005-196153, in recent years, a user can easily print parallax images on a printing medium to form a three-dimensional image, due to a reduction in the manufacturing costs of the lenticular sheet and the proliferation of printers. In addition to printing parallax images on a printing medium to form a three-dimensional image, the user can send a printing medium having parallax images printed thereon to another person as a postcard.

Considering this situation, in the technique disclosed in Japanese Patent No. 3471930, in order to send the written lenticular sheet as a postcard, the user needs to write the addressee's name and address on the lenticular sheet having the parallax images printed thereon. In this case, when the user writes the addressee's name and address on the lenticular sheet, the addressee's name and address overlap the parallax images. In order to solve this problem, for example, the user needs to perform an operation of bonding a sheet that does not affect the parallax images even when the addressee's name and address are written over the parallax images by using an adhesive, while aligning the sheet with the lenticular sheet. When performing the bonding operation, the user must consider that the printing surface having the parallax images printed thereon is not contaminated and the printed parallax images are not peeled off. As a result, a large amount of work is required of the user.

In the technique disclosed in JP-A-2005-196153, a parallax image cannot be printed on a portion of the lenticular lens remaining on the printing surface having the parallax image printed thereon. Therefore, for example, when a lenticular sheet is sent as a postcard, it is difficult to use the entire surface of the postcard as a surface for forming a three-dimensional image.

SUMMARY

An advantage of some aspects of the invention is that it provides a printing medium having parallax images printed on the entire surface of a lenticular sheet, so that a user can send the printing medium to another person as, for example, a postcard without performing a complicated operation.

According to an aspect of the invention, a printing medium includes: a rectangular lens sheet that has a surface formed in a predetermined lens shape; and a thin base that is fixed to a rear surface of the lens sheet on which no lens is formed and has an extending portion extending from one side of the lens sheet to the outside. In the printing medium, when a region corresponding to the rear surface of the lens sheet is referred to as a unit region, the extending portion includes a plurality of unit regions adjacent to one another with adjacent portions, which are common sides, interposed therebetween, and a first printing surface and a second printing surface are formed in corresponding unit regions on one surface of the base that is fixed to the rear surface of the lens sheet or the other surface of the base. In addition, at least one unit region is additionally interposed between the unit region where the first printing surface is formed and the unit region where the second printing surface is formed.

According to the above-mentioned structure, when a region corresponding to the rear surface of the lens sheet is referred to as a unit region, the extending portion includes an area corresponding to a plurality of unit regions adjacent to one another with adjacent portions, which are common sides, interposed therebetween. Therefore, when the unit regions are sequentially bent, the entire extending portion can be folded to overlap one surface of the base opposite the other surface to which the lens sheet is fixed, that is, the rear side of the lens sheet. In addition, since the first printing surface and the second printing surface are formed on the same surface of the base, the parallax images and the addressee's name and address can be simultaneously printed on the first printing surface and the second printing surface by single-sided printing, respectively.

Further, when the base is folded at the adjacent portions to overlap the unit regions with the rear surface of the lens sheet, the first printing surface and the second printing surface are formed in the unit regions, and at least one unit region is additionally interposed between the two unit regions. For example, a double-sided adhesive tape is stuck or an adhesive is applied to the interposed unit region to bond the first printing surface and the second printing surface. Therefore, the double-sided adhesive tape does not need to be directly stuck to the unit region, or the adhesive does not need to be directly applied onto the unit region, which makes it possible to prevent the printing surfaces from being contaminated or damaged. As a result, the parallax image and the addressee's name and address can be viewed from both surfaces without being damaged. In addition, when the unit regions are sequentially bent at the adjacent portions to fold the entire extending portion so as to overlap the rear side of the lens sheet, the parallax image can be viewed from the front surface of the lens sheet, and the addressee's name and address can be viewed from the rear surface of the lens sheet. In this way, the printing medium according to this aspect can be used as a postcard.

In the printing medium according to the above-mentioned aspect, preferably, at least one unit region is additionally interposed between the unit region corresponding to the rear surface of the lens sheet and the unit region where the first printing surface is formed.

According to the above-mentioned structure, for example, when the parallax image is formed on the first printing surface and the first printing surface overlaps the rear side of the lens sheet, the first printing surface and the rear surface of the lens sheet can be bonded to each other by an adhesive that is applied to the unit region interposed between the lens sheet and the first printing surface. Therefore, the adhesive does not need to be directly applied onto the first printing surface having the parallax image printed thereon, which makes it possible to prevent the parallax image from being contaminated or damaged. As a result, it is possible to overlap the printing surface with the rear surface of the lens sheet without deteriorating the quality of the parallax image.

In the printing medium according to the above-mentioned aspect, preferably, an adhesive layer is formed on at least one of the one surface of the base that is fixed to the rear surface of the lens sheet and the other surface of the base, unit regions other than the unit region where the first printing surface is formed and the unit region where the second printing surface is formed.

According to the above-mentioned structure, when the base is folded at the adjacent portions between the unit regions, the entire extending portion is bonded to the rear surface of the lens sheet by the adhesive layer. Therefore, the user can send a postcard to another person without applying an additional adhesive to bond the extending portion to the rear surface of the lens sheet. In addition, since the adhesive layer is formed on unit regions other than the unit regions where the printing surfaces are formed, it is possible to bond the parallax image or the addressee's name and address without contaminating the printing surfaces.

In the printing medium according to the above-mentioned aspect, preferably, at least an ink absorption layer for absorbing printing ink or a predetermined printing sheet is provided on the first printing surface or the second printing surface.

According to the above-mentioned structure, when printing ink is used to print parallax images on the first printing surface, the ink can be stably held on the printing surface by the ink absorption layer or the printing sheet, which makes it possible to stably form parallax images on the first printing surface. In particular, when parallax images are printed on an ink jet sheet or a transfer sheet, which is the printing sheet, it is possible to more stably hold ink on the printing surface. As a result, it is possible to prevent the printing quality of parallax images formed of ink from deteriorating.

When printing ink is used to print the addressee's name and address on the second printing surface, the ink can be stably held on the second printing surface by the ink absorption layer or the printing sheet, which makes it possible to stably form the addressee's name and address on the second printing surface. In particular, when the addressee's name and address are printed on an ink jet sheet or a transfer sheet, which is the printing sheet, it is possible to more stably hold ink on the printing surface. As a result, it is possible to prevent the printing quality of the addressee's name and address formed of ink from deteriorating. In addition, when an ink absorption layer or a predetermined printing sheet is provided on the second printing surface, it is easy to meet regulations required for a postcard, such as the color of an address section, which makes it possible to provide a printing medium suitable for a postcard.

In the printing medium according to the above-mentioned aspect, preferably, the lens is a lenticular lens having a plurality of cylindrical convex lenses arranged in parallel to each other.

Since a combination of the lenticular lens and the parallax images makes it possible to easily form a three-dimensional image, the lenticular lens is suitable for the lens according to the above-mentioned aspect.

In the printing medium according to the above-mentioned aspect, preferably, the extending portion extends from one of four sides of the rectangular lens sheet that is substantially parallel to the axis of each of the cylindrical convex lenses to the outside.

According to the above-mentioned structure, for example, when a parallax image is printed on the first printing surface formed in the extending portion, a printing apparatus may be configured to detect pitches among the convex lenses of the lenticular lens and to print the parallax image on the basis of the detected pitches among the convex lenses. In this case, when the extending portion extends from one side of the lens sheet that is substantially parallel to the axis of the cylindrical convex lens to the outside, it is possible to print images on the printing surface while accurately detecting the pitches among the convex lenses. As a result, it is possible to prevent the positional deviation between the parallax images and the convex lenses.

In the printing medium according to the above-mentioned aspect, preferably, folding lines at which the base is folded are provided at the adjacent portions.

In the printing medium according to the above-mentioned aspect, preferably, folding lines at which the base is folded are provided at positions corresponding to the adjacent portions on at least one of the first printing surface and the second printing surface.

According to the above-mentioned structure, when the base is folded at the adjacent portions to overlap the extending portion including a plurality of unit regions with the rear surface of the lens sheet, the unit regions can be bent at the folding lines provided at the adjacent portions, which makes it possible to overlap the first printing surface or the second printing surface formed in one unit region to the rear surface of the lens sheet at an appropriate position. Therefore, for example, when the parallax image formed on the first printing surface is bonded to the rear surface of the lens sheet, the first printing surface is bent at the folding line, which makes it possible to prevent the positional deviation between the parallax image and the convex lenses. In addition, since the extending portion is folded at the folding lines, it is easy to fold the extending portion, which makes it possible to reduce the amount of work.

According to another aspect of the invention, a printing medium includes: a rectangular lens sheet that has a surface formed in a predetermined lens shape; and a thin base that is fixed to a rear surface of the lens sheet on which no lens is formed and has an extending portion extending from one side of the lens sheet to the outside. In the printing medium, when a region corresponding to the rear surface of the lens sheet is referred to as a unit region, the extending portion includes a first unit region and a second unit region adjacent to each other with an adjacent portion, which is a common side, interposed therebetween. In addition, a first printing surface is formed in one of the first and second unit regions, and a second printing surface is formed in the other unit region, on one surface of the base that is fixed to the rear surface of the lens sheet or the other surface of the base.

According to the above-mentioned structure, when a region corresponding to the rear surface of the lens sheet is referred to as a unit region, the extending portion includes two printing surfaces corresponding to two unit regions. In addition, since the two unit regions having the printing surfaces formed therein are adjacent to each other with an adjacent portion, which is a common side, interposed therebetween, it is possible to sequentially bend the unit regions to overlap one surface of the base opposite the other surface to which the lens sheet is fixed. Therefore, it is possible to print a parallax image on the entire surface of the lens sheet by printing a parallax image on the first printing surface and bending the first printing surface to overlap the entire rear surface of the lens sheet. Further, the first printing surface and the second printing surface are formed on the same surface of the base, which makes it possible to simultaneously print a parallax image and the addressee's name and address on the first printing surface and the second printing surface, respectively.

In the printing medium according to the above-mentioned aspect, preferably, at least an ink absorption layer for absorbing printing ink or a predetermined printing sheet is provided on the first printing surface or the second printing surface.

According to the above-mentioned structure, when printing ink is used to print parallax images on the first printing surface, the ink can be stably held on the first printing surface by the ink absorption layer or the printing sheet, which makes it possible to stably form parallax images on the first printing surface. In particular, when parallax images are printed on an ink jet sheet or a transfer sheet, which is the printing sheet, it is possible to more stably held ink on the printing surface. As a result, it is possible to prevent the printing quality of parallax images formed of ink from deteriorating.

When printing ink is used to print the addressee's name and address on the second printing surface, the ink can be stably held on the second printing surface by the ink absorption layer or the printing sheet, which makes it possible to stably form the addressee's name and address on the second printing surface. In particular, when the addressee's name and address are printed on an ink jet sheet or a transfer sheet, which is the printing sheet, it is possible to more stably hold ink on the printing surface. As a result, it is possible to prevent the printing quality of the addressee's name and address formed of ink from deteriorating. In addition, when an ink absorption layer or a predetermined printing sheet is provided on the second printing surface, it is easy to meet regulations required for a postcard, such as the color of an address section, which makes it possible to provide a printing medium suitable for a postcard.

In the printing medium according to the above-mentioned aspect, preferably, an adhesive layer is formed in the first unit region and/or the second unit region on the other surface of the base that is opposite the one surface of the base on which the first printing surface and the second printing surface are formed.

According to the above-mentioned structure, since the base is folded at the adjacent portions between the unit regions, the first printing surface and the second printing surface can be bonded to each other by an adhesive layer. Therefore, for example, when a parallax image and the addressee's name and address are printed on the first printing surface and the second printing surface, respectively, the user bonds the first printing surface and the second printing surface to make a postcard without applying an additional adhesive to bond the first printing surface and the second printing surface. In addition, since an adhesive layer is formed on one surface of the base opposite the other surface on which the printing surface is formed, the printing surface is less likely to be contaminated.

In the printing medium according to the above-mentioned aspect, preferably, an adhesive layer is formed in a range corresponding to the rear surface of the lens sheet, on the other surface of the base opposite the one surface to which the lens sheet is fixed.

According to the above-mentioned structure, the first printing surface having the parallax image printed thereon can be bonded to the rear surface of the lens sheet by the adhesive layer. Therefore, the user can send, for example, a postcard having a three-dimensional image printed thereon to another person without applying an additional adhesive to bond the parallax image to the rear surface of the lens sheet. In addition, since the adhesive layer is formed on the surface of the base, not on the printing surface, it is possible to bond the parallax image without contaminating the printing surface.

According to still another aspect of the invention, a printing medium includes: a thin base that has a plurality of unit regions adjacent to one another in a line with adjacent portions interposed therebetween; first and second lens sheets each having a front surface formed in a lens shape and a rear surface fixed to one of the plurality of unit regions on one surface of the base; a first printing surface that is formed in one of the plurality of unit regions on the one surface or the other surface of the base and has an image corresponding to the shape of the lens formed on the first lens sheet printed thereon; and a second printing surface that is formed in one of the plurality of unit regions on the one surface or the other surface of the base and has an image corresponding to the shape of the lens formed on the second lens sheet printed thereon. In the printing medium, when the base is folded at the adjacent portions such that the plurality of unit regions overlap one another, the first lens sheet is fixed to the one surface of the base, and the second lens sheet is fixed to the other surface of the base. In addition, the first printing surface is viewed from a front surface of the first lens sheet, and the second printing surface is viewed from a front surface of the second lens sheet.

According to the above-mentioned structure, since the base includes a plurality of unit regions adjacent to one another in a line with adjacent portions interposed therebetween, the unit regions are sequentially bent at the adjacent portions to overlap one another. When all the unit regions are bent so as to overlap one another, lens sheets are fixed to two unit regions on the front and rear surfaces of the base, and printing surfaces corresponding to the shape of lenses formed on the lens sheets are formed on the front and rear surfaces of the fixed two lens sheets in the unit regions. That is, two lens sheets and two printing surfaces for forming two three-dimensional images can be formed on one base before hand. Therefore, the user folds the base at the adjacent portions to overlap the unit regions, thereby making a printing medium having three-dimensional images on both surfaces thereof.

In the printing medium according to the above-mentioned aspect, preferably, the first printing surface is formed in the unit region corresponding to the rear surface of the first lens sheet, on the other surface of the base that is opposite the one surface of the base to which the first lens sheet is fixed. In addition, preferably, the second printing surface is formed in the unit region corresponding to the rear surface of the second lens sheet, on the other surface of the base that is opposite the one surface of the base to which the second lens sheet is fixed.

According to the above-mentioned structure, the first printing surface having an image corresponding to the shape of lenses formed on the first lens sheet can be formed on the base in a unit region corresponding to the rear surface of the first lens sheet beforehand. Therefore, it is possible to view a three-dimensional image from the first lens sheet without folding the base to overlap the printing surface with the lens sheet. In addition, the second printing surface having an image corresponding to the shape of lenses formed on the second lens sheet can be formed on the base in a unit region corresponding to the rear surface of the second lens sheet beforehand. Therefore, it is possible for a viewer to view a three-dimensional image from the second lens sheet without folding the base to overlap the printing surface with the lens sheet.

In the printing medium according to the above-mentioned aspect, preferably, at least an ink absorption layer for absorbing printing ink or a predetermined printing sheet is provided on the first printing surface or the second printing surface.

According to the above-mentioned structure, when printing ink is used to print parallax images on the first printing surface or the second printing surface, the ink can be stably held on the printing surface by the ink absorption layer or the printing sheet, which makes it possible to stably form parallax images on the printing surface. In particular, when parallax images are printed on an ink jet sheet or a transfer sheet, which is the printing sheet, it is possible to more stably hold ink on the printing surface. As a result, it is possible to prevent the printing quality of parallax images formed of ink from deteriorating.

In the printing medium according to the above-mentioned aspect, preferably, among the plurality of unit regions of the base, an adhesive layer is formed on the other surface of the base, in the unit regions, that is opposite the one surface to which the first and second lens sheets are fixed and/or one of the two surfaces of the base, in the unit regions, that is opposite the other surface on which the first and second printing surfaces are formed.

According to the above-mentioned structure, it is possible to bond the unit regions by using the adhesive. For example, when an adhesive layer is formed on one surface of the base opposite the other surface to which the lens sheet is fixed in the unit region where the lens sheet is provided, the user can bond the unit regions so as to overlap each other without applying an additional adhesive or sticking a double-sided adhesive tape to form an adhesive layer on the base or the printing surface. In addition, when the printing surface is formed on the surface of the base in one unit region, the adhesive layer is formed on the surface of the base in unit regions other than the one unit region where the printing surface is formed, which makes it possible to prevent the printing surface from being contaminated or damaged.

BRIEF DESCRIPTION OF THE DRAWINGS

The invention will be described with reference to the accompanying drawings, wherein like numbers refer like elements.

FIG. 7A is a diagram schematically illustrating the printing medium 10 according to the first embodiment.

FIG. 7B is a diagram schematically illustrating a first modification of the first embodiment.

FIG. 7C is a diagram schematically illustrating the printing medium 100 according to the second embodiment.

FIG. 7D is a diagram schematically illustrating a first modification of the second embodiment.

FIGS. 23A to 23D are diagrams schematically illustrating a process of folding the printing medium according to the sixth embodiment.

DESCRIPTION OF EXEMPLARY EMBODIMENTS

Hereinafter, printing media according to embodiments of the invention will be described below.

First Embodiment

Figure 1:
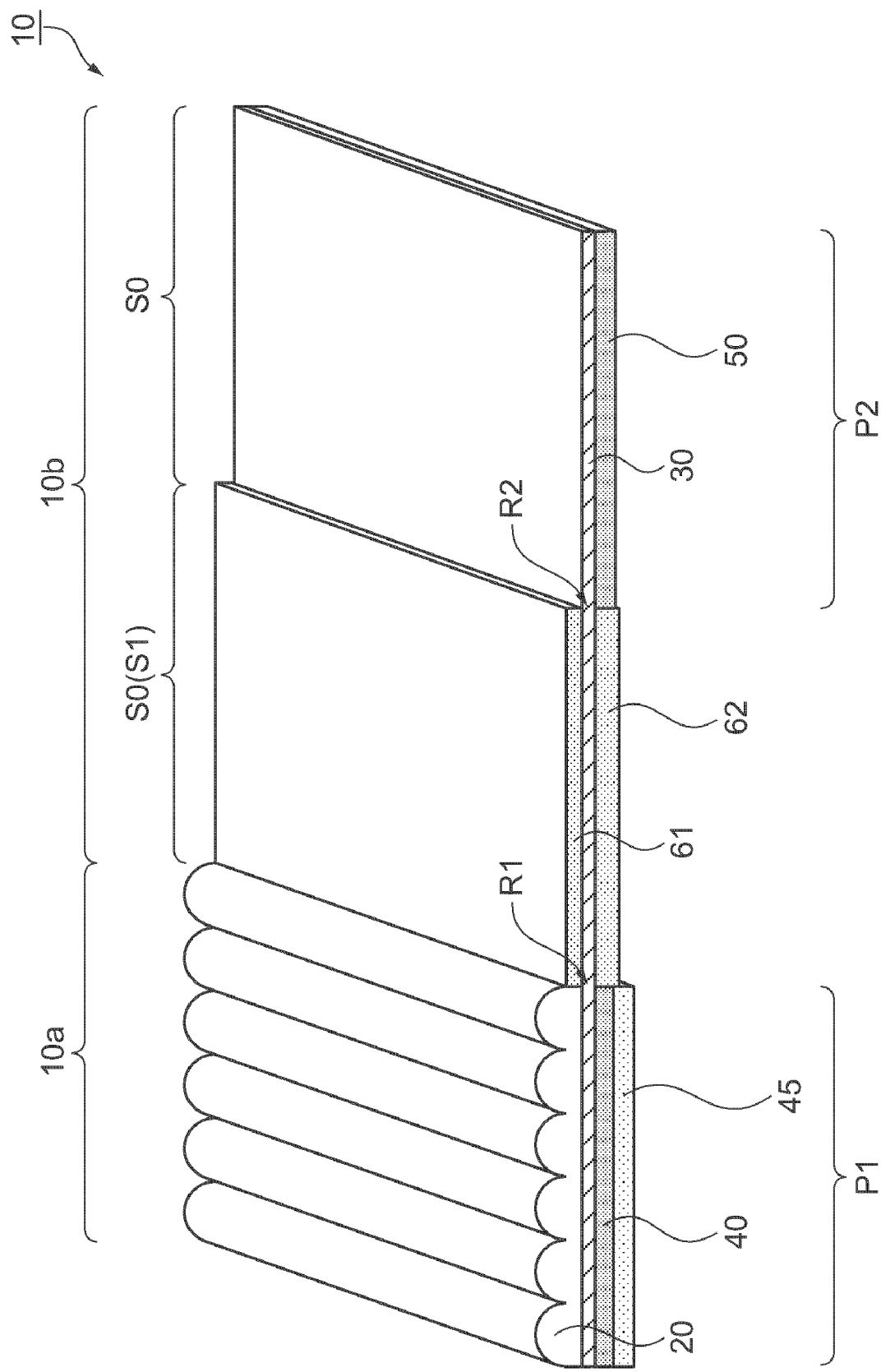
FIG. 1 is a diagram schematically illustrating components of a printing medium according to a first embodiment of the invention.

A printing medium 10 according to a first embodiment of the invention will be described with reference to FIG. 1. FIG. 1 is a diagram schematically illustrating components of the printing medium 10. The printing medium 10 includes a rectangular lenticular sheet 10a having a plurality of circular convex lenses 20 formed on the surface thereof (an upper surface in FIG. 1), a base 30, an ink absorption layer 40, an ink transmission layer 45, an ink absorption layer 50, an adhesive layer 61, and an adhesive layer 62.

When a region corresponding to a rear surface of the lenticular sheet 10a is a unit region S0, the ink absorption layer 40 and the ink transmission layer 45 are formed on the rear surface of the base 30 (a lower surface in FIG. 1) as a first printing surface P1 having the unit region S0. Therefore, the first printing surface P1 overlaps the lenticular sheet 10a in plan view. In addition, the ink absorption layer 50 is formed on the rear surface of the base 30 as a second printing surface P2 having the unit region S0.

The adhesive layers 61 and 62 are formed on the front and rear surfaces of the base 30 as adhesive surfaces S1 each having the unit region S0, respectively. The adhesive surface S1 is adjacent to the lenticular sheet 10a and the first printing surface P1 at an adjacent portion R1 in the base 30, and is also adjacent to the second printing surface P2 at an adjacent portion R2 in the base 30. The adhesive surface S1 and the second printing surface P2 are formed on an extending portion 10b (which will be described later) on the base 30.

In this embodiment, the axial direction of each of the cylindrical convex lenses 20 is parallel to a long side of the rectangular lenticular sheet 10a. In addition, for simplicity of explanation, it is assumed that the lenticular sheet is composed of six cylindrical convex lenses 20. In many cases, the lenticular sheet 10a having convex lenses 20 arranged at pitches of 30 to 180 LPI (lenses per inch) is generally used, and actually, the number of convex lenses corresponding to the pitches is provided in the lenticular sheet.

Further, in FIG. 1, the components of the printing medium 10 are shown to have recognizable thicknesses, but actually, the components are formed in sheets (thin films) having a thickness of several tens of microns to several hundreds of microns.

Next, the components of the printing medium 10 will be described in detail. Then, a structure for bending the extending portion 10b to use the printing medium as a postcard will be described with reference to FIG. 2.

The lenticular sheet 10a is formed of a transparent resin material capable of being used as a lens, such as PET (polyethylene terephthalate), PETG (glycol-modified polyethylene terephthalate), APET, PP, PS, PVC, acryl, UV, or PC (polycarbonate) resin, or PMMA (methacrylic) resin, and the entire rear surface (the entire lower surface) of the lenticular sheet 10a is fixed to the base 30. A known method, such as welding or adhesion, is used to fix the lenticular sheet 10a to the base 30 according to a material forming the base 30. However, any method can be used to fix the lenticular sheet 10a to the base 30 as long as transparency of the lenticular sheet 10a and the base 30 can be ensured.

The base 30 is formed of a transparent material, such as a PETG resin, in a thin film form. Of course, the base 30 may be formed of a general PET resin. In addition, the base 30 may be formed of any transparent material as long as a viewer can view a parallax image formed on the ink absorption layer 40, which will be described later, through the lenticular sheet 10a and the base 30 can be folded at a folding line, which will be described later.

As shown in FIG. 1, the base 30 has an extending portion 10b that extends from the lenticular sheet 10a toward the right side of FIG. 1 and is adjacent to the right of the right long side of the rectangular lenticular sheet 10a. The extending portion 10b has a shape that overlaps the entire rear surface of the lenticular sheet 10a when the base 30 is folded at the adjacent portions R1 and R2. That is, the extending portion 10b has an area corresponding to two rectangular unit regions S0 each having substantially the same area as that of the lenticular sheet 10a. Therefore, the base 30 has an area corresponding to three unit regions S0 partitioned by the adjacent portions R1 and R2.

The ink absorption layer 40 formed on the rear surface (the lower surface in FIG. 1) of the base 30, which is opposite the surface of the base 30 having the lenticular sheet 10a fixed thereto, is a component for forming a parallax image corresponding to each convex lens 20. When the parallax image is formed by ink jet printing, the ink absorption layer 40 absorbs the jetted ink and fixes the ink to a desired position. The ink absorption layer 40 makes it possible to stably form a parallax image at a position corresponding to each convex lens 20, and to appropriately form a three-dimensional image. The ink absorption layer 40 is formed of, for example, a lyophilic polymer resin, such as PVA (polyvinyl alcohol), a cation compound, or fine particles, such as silica.

When the ink is jetted on the ink transmission layer 45 formed on the rear surface of the ink absorption layer 40, the ink transmission layer 45 transmits the ink. That is, the ink transmission layer 45 appropriately transmits the ink to the ink absorption layer 40 such that no ink remains on the ink transmission layer 45. Therefore, the ink transmission layer 45 serves as a base for the parallax image. The ink transmission layer 45 is formed of, for example, a titanium oxide, silica gel, PMMA (methacrylic resin), binder resin, barium sulfate, glass fiber, or plastic fiber, and has a white color which is suitable for a base.

In the extending portion 10b, when characters corresponding to information of an addressee, such as a zip code or an address, are formed by ink jet printing on the ink absorption layer 50 formed on the rear surface (the lower surface in FIG. 1) of the base 30, the ink absorption layer 50 absorbs the jetted ink and fixes the ink at desired positions. The ink absorption layer 50 is formed of, for example, a lyophilic polymer resin, such as PVA (polyvinyl alcohol), a cation compound, fine particles, such as silica. The ink absorption layer 50 makes it possible to appropriately form the addressee's name and address. In general, the color of the surface of a postcard on which information of an addressee is written is preferably white or a light color, but the invention is not limited thereto. For example, the ink absorption layer 50 can be formed of any other material as long as it can transmit ink and is of a light color.

When the unit region S0 of the base 30 where the ink absorption layer 50 is formed is bent at the adjacent portion R2 toward the unit region S0 of the adhesive surface S1 adjacent to the left side of the ink absorption layer 50, the adhesive layer 61 formed on the front surface of the base 30 is used to bond the unit region S0 of the base 30 where the ink absorption layer 50 is formed to the front surface of the unit region S0 of the adhesive surface S1 in the extending portion 10b. Therefore, after the bonding is performed using the adhesive layer 61, the addressee's name and address printed on the ink absorption layer 50 can be viewed from the surface of the adhesive surface S1.

Therefore, the adhesive layer 61 is formed of a material having sufficient adhesion to prevent the second printing surface P2 from peeling off from the postcard during assortment or mailing when the printing medium 10 is sent as a postcard. For example, the adhesive layer 61 may be formed of an epoxy-based, an acryl-based or a cyanoacrylate-based adhesive. In addition, the adhesive layer 61 may be formed of a double-sided adhesive tape. Of course, an adhesive capable of bonding the base 30 may be used.

When the unit region S0 of the adhesive surface S1 is bent at the adjacent portion R1 toward the ink transmission layer 45 adjacent to the left side of the adhesive surface S1, the adhesive layer 62 formed on the rear surface of the base 30 is used to bond the unit region S0 of the adhesive surface S1 to the ink transmission layer 45 in the extending portion 10b. Therefore, after the bonding is performed using the adhesive layer 62, the unit region S0 of the adhesive surface S1 overlaps the rear surface of the lenticular sheet 10a.

Therefore, the adhesive layer 62 is formed of a material having sufficient adhesion to bond the ink transmission layer 45 to the base 30. For example, the adhesive layer 62 may be formed of an epoxy-based, an acryl-based or a cyanoacrylate-based adhesive. In addition, any material can be used to form the adhesive layer 62 as long as it can bond the ink transmission layer 45 to the base 30.

In this embodiment, a peeling sheet is not provided on the surface of the adhesive layer. Assuming that the adhesion of the adhesive layer deteriorates due to contamination, a peeling sheet may be provided to protect the adhesive layer. Of course, the peeling sheet is peeled off from the adhesive layer before bonding the unit regions. Therefore, the peeling sheet may be formed of a material that can be peeled off from the adhesive layer, such as a resin material or paper.

Figure 2A:
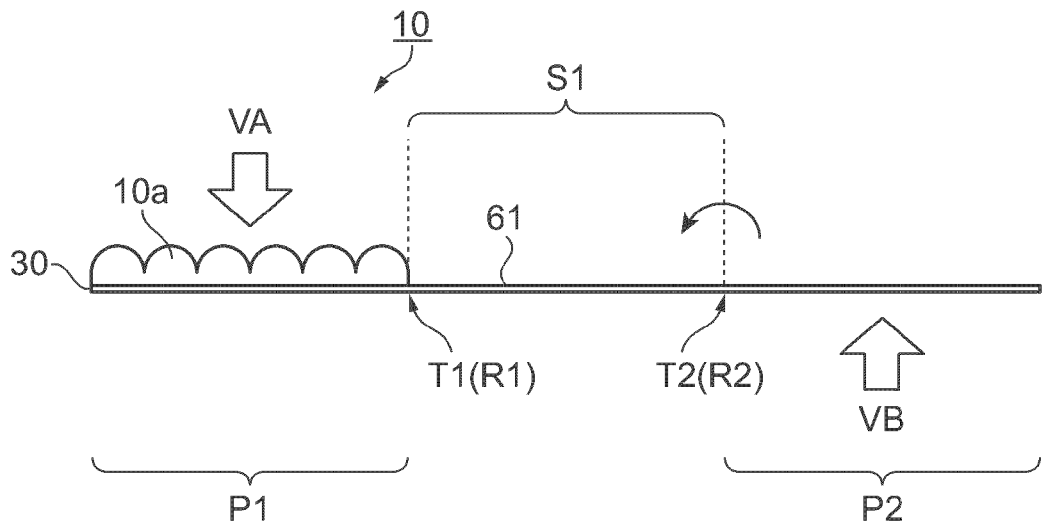
FIG. 2A is a diagram schematically illustrating the printing medium according to the first embodiment, as viewed in the thickness direction.
Figure 2B:
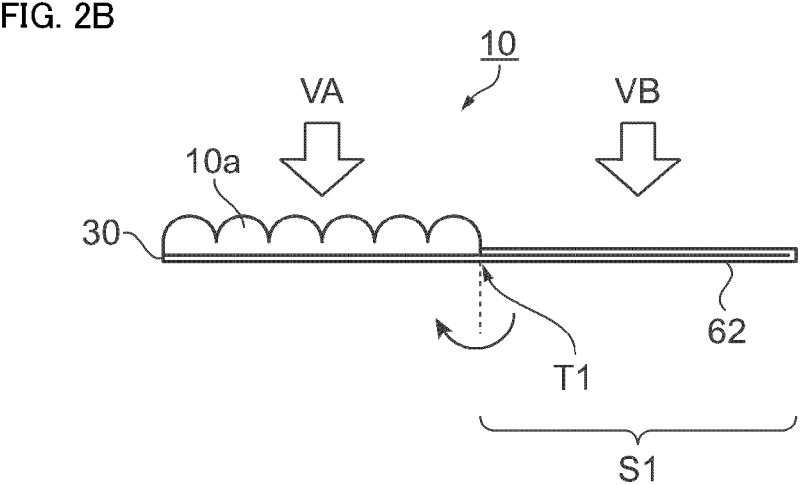
FIG. 2B is a diagram schematically illustrating a folded extending portion.
Figure 2C:
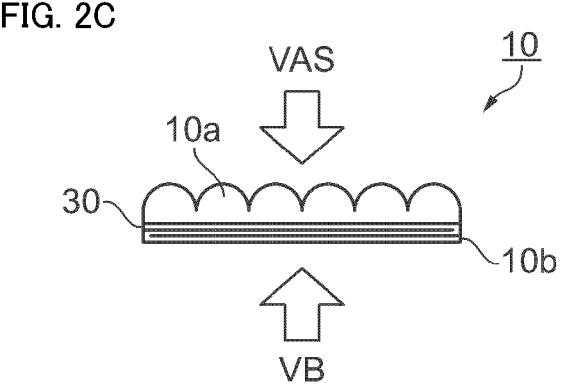
FIG. 2C is a diagram schematically illustrating the printing medium after the extending portion is folded.

Next, a process of sequentially bending the extending portion 10b to bond the bent portion to the rear surface of the lenticular sheet 10a will be described with reference to FIGS. 2A to 2C. FIGS. 2A to 2C are diagrams schematically illustrating the printing medium 10 as viewed in the thickness direction. The components of the printing medium 10, such as the base 30 and the ink absorption layer 40, are formed in sheets (thin films) each having a thickness of several tens of microns to several hundreds of microns, as described above. Therefore, for simplicity of explanation, in FIGS. 2A to 2C, components other than the base 30 are omitted, and only the base 30 is shown as a sheet.

As shown in FIG. 2A, it is assumed that, in the printing medium 10, a 'parallax image' VA is printed on the first printing surface P1 corresponding to the unit region of the lenticular sheet 10a and the 'addressee's name and address' VB is printed on the second printing surface P2 on the rear surface (the lower surface in FIGS. 2A to 2C) of the base 30. In this case, as represented by large arrows in FIGS. 2A to 2C, the parallax image VA can be viewed from the front surface of the lenticular sheet 10a, and the addressee's name and address VB can be viewed from the rear surface of the base 30 opposite the front surface of the lenticular sheet 10a. A 'folding line T1' corresponding to the adjacent portion R1 and a 'folding line T2' corresponding to the adjacent portion R2 are formed on the rear surface of the printing medium 10. The folding line T1 and the folding line T2 will be described in detail later.

First, as shown in FIG. 2A, the base 30 is folded at the folding line T2. That is, the second printing surface P2 is bent in the direction of an arrow in FIG. 2A, and the unit region of the adhesive surface S1 and the unit region of the second printing surface P2 are bonded to each other by the adhesive layer 61. FIG. 2B shows the base 30 after the bonding. As represented by a large arrow in FIG. 2B, the addressee's name and address VB and the parallax image VA can be viewed in the same direction, that is, from the front surface of the base 30.

Next as shown in FIG. 2B, the base 30 is folded at the first folding line T1. That is, the adhesive surface S1 is bent in the direction of an arrow in FIG. 2B, and the unit region of the adhesive surface S1 and the unit region of the first printing surface P1 are bonded to each other via the adhesive layer 62. FIG. 2C shows the base 30 after the bonding.

As can be seen from FIG. 2C, when the base 30 is folded at the folding lines T2 and T1, the extending portion 10b is bonded to the lenticular sheet 10a so as to overlap the rear surface of the lenticular sheet 10a. As represented by a large arrow in FIG. 2C, in the printing medium 10, the parallax image VA can be viewed from the front surface of the lenticular sheet 10a, and the addressee's name and address VB can be viewed from the rear surface of the lenticular sheet 10a. That is, the printing medium 10 is a postcard having one surface from which a three-dimensional image VAS due to the parallax image VA can be viewed and the other surface from which the addressee's name and address VB can be viewed.

As described with reference to FIGS. 2A to 2C, in the printing medium 10 according to this embodiment, the base 30 is folded at the folding line T1 and the folding line T2 inward and outward, which makes it possible to easily bond the lenticular sheet 10a to the extending portion 10b. Therefore, a user can easily write a postcard having a three-dimensional image to be visible without bonding a sheet having the addressee's name and address written thereon to the parallax image VA by using an adhesive while performing alignment with the lenticular sheet.

Figure 3A:
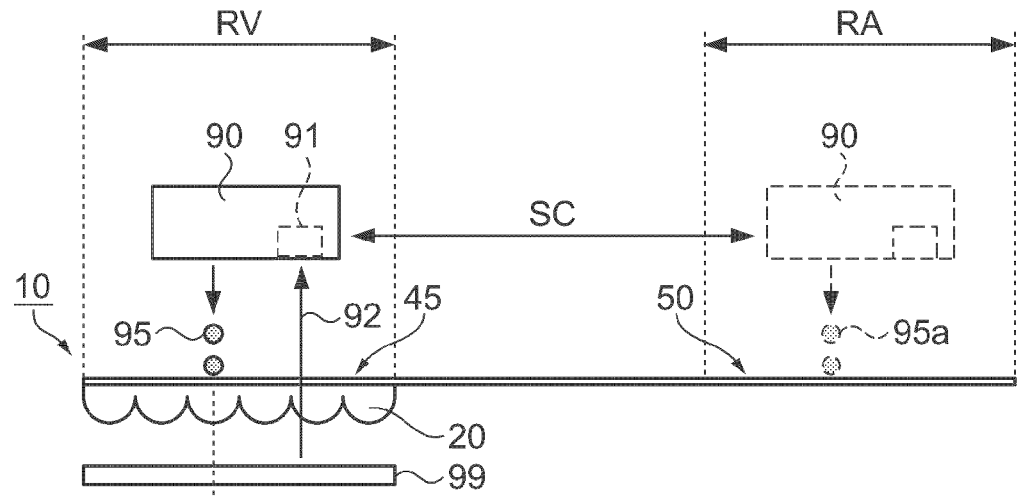
FIG. 3A is a diagram schematically illustrating the printing of images on the printing medium according to the first embodiment.
Figure 3B:
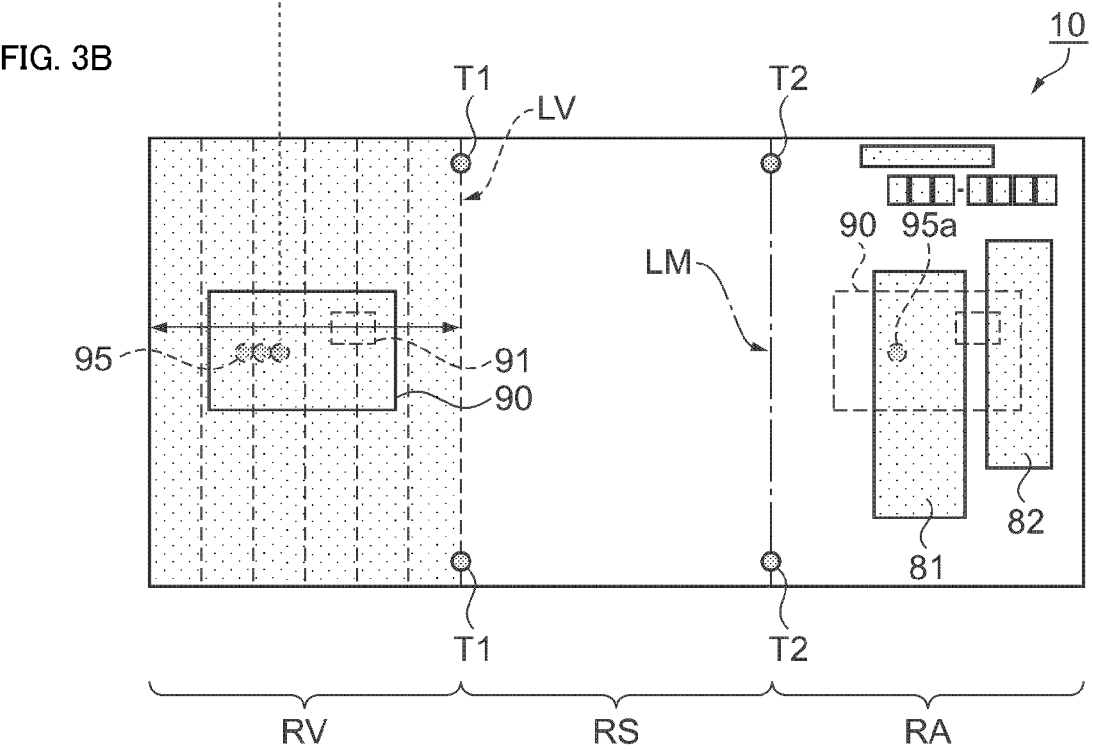
FIG. 3B is a diagram schematically illustrating the printing medium shown in FIG. 3A, as viewed from the upper side.

Next, the printing of the 'parallax image' VA and the 'addressee's name and address' VB will be described with reference to FIGS. 3A and 3B. FIG. 3A is a diagram schematically illustrating the printing medium 10 as viewed in the thickness direction, and FIG. 3B is a diagram schematically illustrating the printing medium 10 as viewed from the upper side. In this embodiment, it is assumed that a printer includes a carriage having a printing head, and the printing head discharges ink droplets while the carriage is being moved, thereby printing a parallax image, the addressee's name and address, and folding lines on a printing medium. Any kind of printers, such as thermal printers, other than ink jet printers can be used to perform printing as long as the carriage can scan a printing medium.

As shown in FIG. 3A, a carriage 90 having a printing head (not shown) of a printer is arranged above the printing medium, and the carriage 90 scans the printing medium 10 in the horizontal direction to perform printing, as represented by an arrow in FIG. 3A. The printing medium 10 is transported backward in the vertical direction of the plane of the drawing by a transport member of the printer, such as a roller, so that printing is performed on the entire region of the printing medium 10.

A light-emitting surface 99 is arranged below the lower surface of the lenticular sheet 10a of the printing medium 10. A detecting unit 91 is provided in the carriage 90 to detect transmission light 92 that is emitted from the light-emitting surface 99 and then sequentially passes through each convex lens 32, a base, an ink absorption layer, and an ink transmission layer. Since the amount of transmission light 92 depends on a variation in the thickness of the convex lens 20, the detecting unit 91 detects a variation in the amount of transmission light caused by the scanning of the carriage (which is represented by an arrow in FIGS. 3A and 3B) and thus detects pitches among the convex lenses 30 in the lenticular sheet 10a.

As represented by a netted portion in FIG. 3B, the detection range is the overall range of the lenticular sheet 10a. As represented by an arrow in FIG. 3B, the detecting unit detects pitches among the convex lenses according to the scanning of the carriage 90. Then, a predetermined process is performed on the results of the detection, and the processed results are stored in, for example, a storage unit provided in the printer. In this way, information on the pitches among the convex lenses 20 of the lenticular sheet 10a can be stored before the printing of a parallax image.

When the carriage 90 scans a parallax image printing range RV, as described above, the information on the pitches among the convex lenses 20 stored before the printing of the parallax image is read, and ink 95 is discharged from the printing head (not shown) of the carriage 90 at positions corresponding to the convex lenses 20 on the basis of the read pitch information such that the ink is dropped on the surface of the ink transmission layer 45, thereby printing a predetermined parallax image. Then, as described with reference to FIG. 1, the dropped ink is moved to the ink absorption layer to form the parallax image at an appropriate position relative to each convex lens 20.

Next, as represented by a dotted line in FIG. 3A, when the scanning position of the carriage 90 is moved from the parallax image printing range RV to an addressee's name and address printing range RA, information of an addressee, such as an address and name, is printed on the postcard, which is the printing medium. For example, as represented by a netted portion on the right side of FIG. 3B, predetermined characters are printed in a name section 81 and an address section 82. In addition, characters corresponding to the items to be written on a postcard, such as the characters 'postcard', are printed. More specifically, the printing head (not shown) of the carriage 90 discharges ink 95a onto the surface of the ink absorption layer 50 to print the addressee's name and address. In addition, the addressee's name is printed in the name section 81 at the scanning position of the carriage 90 represented by dotted lines in FIGS. 3A and 3B.

In general, since the parallax image is a color image, color ink is used as the ink 95. In order to print parallax images for right and left eyes at a narrow pitch between the convex lenses, ink droplets having a small diameter are preferably discharged. Meanwhile, since a zip code and an address are written as characters in an address section, black ink is generally used as the ink 95a. In many cases, since bold characters are used so as to be recognizable, ink droplets having a large diameter are preferably discharged.

In this embodiment, the printing head of the carriage 90 can discharge both the ink 95 and the ink 95a to print the parallax image and the addressee's name and address. The ink 95 is used in the parallax image printing region RV, and the ink 95a is used in the addressee's name and address printing range RA. In this way, it is possible to simultaneously print both the parallax image and the addressee's name and address by moving the carriage 90.

Since the size of characters printed in the address and name sections is larger than that of the parallax image, the carriage 90 may scan the printing medium at a larger pitch in the addressee's name and address printing range RA than in the parallax image printing range RV. In this way, it is possible to shorten the time required to print the addressee's name and address. In addition, color ink may be used as the ink 95a, and ink droplets may have the same diameter. Further, the carriage may scan the printing medium at the same pitch.

Next, the formation of the folding line T1 and the folding line T2 will be described below. In this embodiment, as shown in FIG. 3B, when the carriage 90 scans the printing medium to print the parallax image, the carriage 90 prints the folding line T1 at the right end of the parallax image printing range RV, that is, at a position corresponding to the adjacent portion R1 shown in FIG. 1. In addition, the carriage 90 prints the folding line T2 at the left end of the addressee's name and address printing range RA, that is, at a position corresponding to the adjacent portion R2 shown in FIG. 1. Therefore, the printing head of the carriage 90 discharges ink onto the surface of the ink transmission layer 45 and the surface of the ink absorption layer 50 at the corresponding positions to print the folding lines T1 and T2.

In this case, the ink discharged onto the ink transmission layer 45 to print the folding line T1 is transmitted to the ink absorption layer 40, similar to the ink for printing the parallax image. Therefore, since a user views the printed folding line T1 through the ink transmission layer 45, ink for printing the folding line T1 may be ink having a high chroma such as black ink.

In FIG. 3B, each of the printed folding lines T1 and T2 is composed of two dots, that is, upper and lower dots, but the invention is not limited thereto. The printed folding lines T1 and T2 may be dotted lines or solid lines having sufficient sizes for the user to recognize. In addition, the folding line T1 may be printed in a portion of or over the entire adjacent portion R1. As can be seen from FIGS. 2A to 2C, the base 30 is folded in different directions at the adjacent portion R1 and the adjacent portion R2. Therefore, the folding line T1 may be a valley fold LV (dotted line), and the folding line T2 may be a mountain fold LM (one-dot chain line). In this way, it is possible to improve the visibility of a bending direction as well as the positions of the folding lines.

As described above, according to the printing medium 10 of the first embodiment, it is possible to print the 'parallax image' VA on the first printing surface P1 provided on a surface of the base 30 opposite the lenticular sheet 10a and the 'addressee's name and address' VB on the second printing surface P2. Therefore, it is possible to simultaneously print the parallax image and the addressee's name and address on one surface of a printing medium, without performing double-faced printing on the printing medium.

Further, information on the pitches among the convex lenses 20 is detected before the parallax image is printed, and the parallax image is printed on the first printing surface P1 on the basis of the detected pitch information, which makes it possible to print the parallax image at positions aligned with the convex lenses 20.

Furthermore, the adhesive surface S1 is interposed between the first printing surface P1 and the second printing surface P2, and the base is sequentially folded at the folding lines T2 and T1, which makes it possible to easily bond the extending portion 10b having the addressee's name and address printed thereon to the rear surface of the lenticular sheet 10a. Therefore, a user can send a postcard to another person without bonding the extending portion 10b to the rear surface of the lenticular sheet 10a using an additional adhesive.

Second Embodiment

Figure 4:
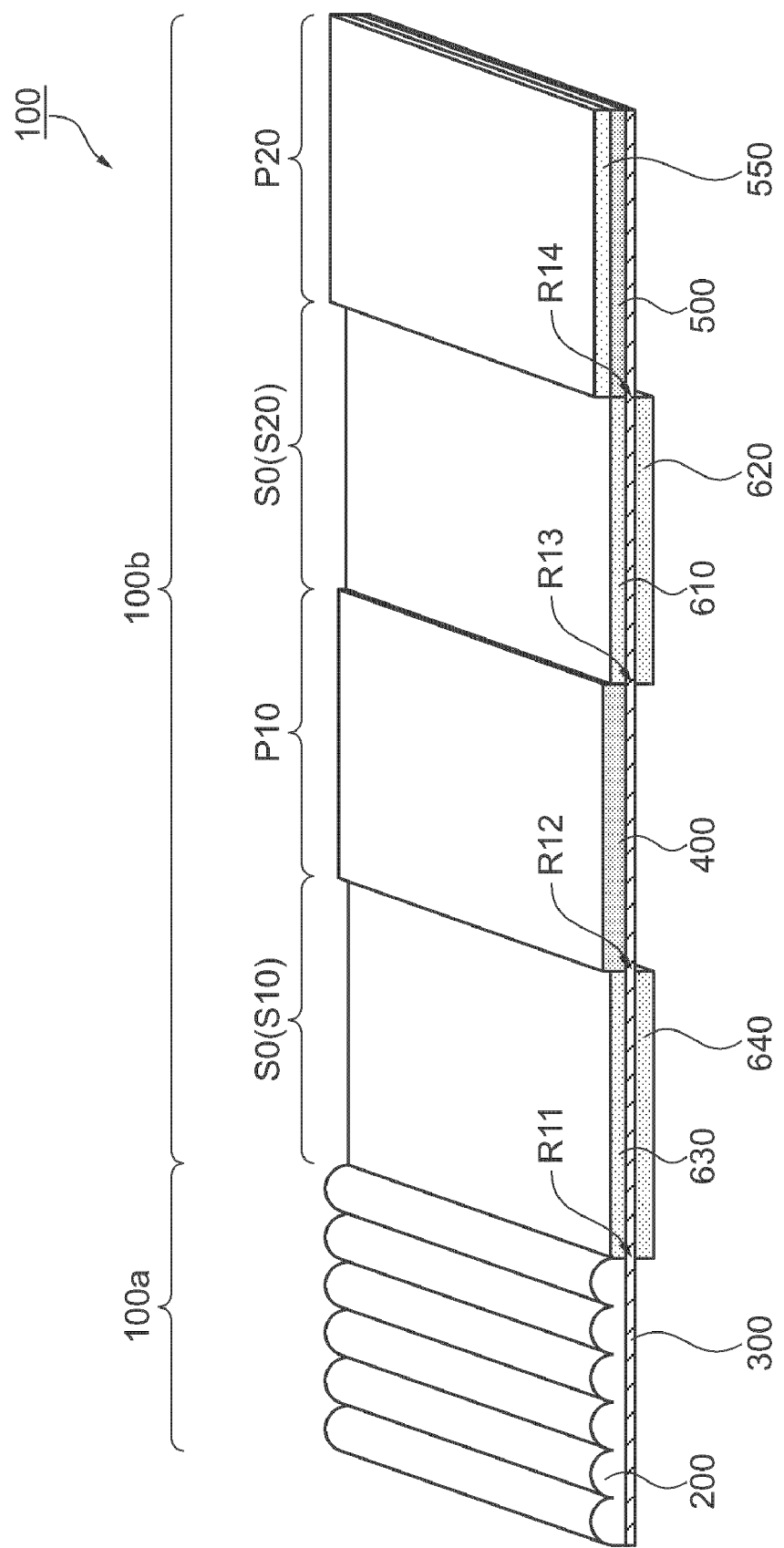
FIG. 4 is a diagram schematically illustrating components of a printing medium according to a second embodiment of the invention.

Next, a printing medium 100 having a first printing surface, a second printing surface, and a lens sheet formed on the same surface of a base will be described with reference to FIG. 4. In the second embodiment, the same components as those in the first embodiment are denoted by the same reference numerals, and a detailed description thereof will be omitted. FIG. 4 is a diagram schematically illustrating components of the printing medium 100. The printing medium 100 includes a rectangular lenticular sheet 100a having a plurality of cylindrical convex lenses 200 formed on the surface thereof (upper surface in FIG. 4), a base 300, an ink absorption layer 400, an ink absorption layer 500, an ink transmission layer 550, an adhesive layer 610, an adhesive layer 620, and an adhesive layer 630, and an adhesive layer 640.

When a region corresponding to a rear surface of the lenticular sheet 100a is a unit region S0, the ink absorption layers 400 and the ink absorption layer 500 are formed on a front surface of the base 300 (an upper surface in FIG. 4) as a first printing surface P10 and a second printing surface P20 each having the unit region S0, respectively.

The adhesive layers 630 and 640 are formed on the front and rear surfaces of the base 300 as adhesive surfaces S10 each having the unit region S0, respectively. The adhesive surfaces S10 are adjacent to the lenticular sheet 100a at an adjacent portion R11 in the base 300, and are also adjacent to the first printing surface P10 at an adjacent portion R12 in the base 300.

The adhesive layers 610 and 620 are formed on the front and rear surfaces of the base 300 as adhesive surfaces S20 each having the unit region S0, respectively. The adhesive surfaces S20 are adjacent to the first printing surface P10 at an adjacent portion R13 in the base 300, and are also adjacent to the second printing surface P20 at an adjacent portion R14 in the base 300.

Therefore, the adhesive surfaces S10, the first printing surface P10, the adhesive surfaces S20, and the second printing surface P20 are formed on an extending portion 100b, which will be described later.

In this embodiment, the axial direction of each of the cylindrical convex lenses 200 is parallel to a long side of the rectangular lenticular sheet 100a. In addition, for simplicity of explanation, it is assumed that the lenticular sheet is composed of six cylindrical convex lenses 200. In many cases, the lenticular sheet 100a having convex lenses 200 arranged at pitches of 30 to 180 LPI (lenses per inch) is generally used, and actually, the number of convex lenses corresponding to the pitches is provided in the lenticular sheet.

Further, in FIG. 4, the components of the printing medium 100 are shown to have recognizable thicknesses, but actually, the components are formed in sheets (thin films) having a thickness of several tens of microns to several hundreds of microns.

Next, the components of the printing medium 100 will be described in detail. Then, a structure for bending the extending portion 100b to use the printing medium as a postcard will be described with reference to FIG. 5.

The lenticular sheet 100a is formed of a transparent resin material, similar to the first embodiment, and the entire rear surface (the entire lower surface in FIG. 4) of the lenticular sheet 100a is fixed to the base 300. A known method, such as welding or adhesion, is used to bond the lenticular sheet 100a to the base 300 according to a material forming the base 300. However, any method can be used to bond the lenticular sheet 100a to the base 300 as long as transparency of the lenticular sheet 100a and the base 300 can be ensured.

The base 300 is formed of a transparent material in a thin film form, similar to the first embodiment. Of course, the base 300 may be formed of any transparent material that has sufficient transparency for a viewer to view a 'parallax image' formed on the ink absorption layer 400 through the lenticular sheet 100a and 'addressee's name and address' VB formed on the ink absorption layer 500 and can be bent at 'folding lines' formed at each adjacent portion. The formation of the 'parallax image', the 'addressee's name and address', and the 'folding lines' will be described later.

As shown in FIG. 4, the base 300 has an extending portion 100b that extends from a bonding portion between the base 300 and the lenticular sheet 100a toward the right side of FIG. 4 and is adjacent to the right long side of the rectangular lenticular sheet 100a. The extending portion 100b has a shape that overlaps the entire rear surface of the lenticular sheet 100a when the base 300 is folded at a folding line corresponding to an adjacent portion R11 that is disposed at the right long side of the lenticular sheet 100a, folding lines corresponding to adjacent portions R12 and R13 that are disposed at the right and left sides of the first printing surface P10, and a folding line corresponding to an adjacent portion R14 that is disposed at the left side of the second printing surface P20. That is, the extending portion 100b has an area corresponding to four rectangular unit regions S0 each having substantially the same area as that of the lenticular sheet 100a. Therefore, the base 300 has an area corresponding to five unit regions S0 partitioned by the adjacent portions R11 to R14.

The ink absorption layer 400 formed on the front surface (the upper surface in FIG. 4) of the base 300 to which the lenticular sheet 100*a* is fixed is a component for forming a parallax image corresponding to each convex lens 200. When the parallax image is formed by ink jet printing, the ink absorption layer 400 absorbs the jetted ink and fixes the ink at a jetted position. The ink absorption layer 400 makes it possible to stably form a parallax image at a position corresponding to each convex lens 200, and to appropriately form a three-dimensional image. The ink absorption layer 400 is formed of, for example, a lyophilic polymer resin, such as PVA (polyvinyl alcohol), a cation compound, or fine particles, such as silica.

When characters corresponding to information of an addressee, such as a zip code and an address, are formed by ink jet printing, the ink absorption layer 500 formed on the front surface of the base 300 in the extending portion 100*b* is a component for absorbing the jetted ink and fixing the ink at a jetted position. The ink absorption layer 500 is formed of, for example, a lyophilic polymer resin, such as PVA (polyvinyl alcohol), a cation compound, or fine particles, such as silica. The ink absorption layer 500 makes it possible to appropriately form the printed addressee's name and address.

When the ink is jetted on the ink transmission layer 550 formed on the front surface of the ink absorption layer 500, the ink transmission layer 550 transmits the ink. That is, the ink transmission layer 550 appropriately transmits the ink to the ink absorption layer 500 such that no ink remains on the ink transmission layer 550. Therefore, the ink transmission layer 550 serves as a base for the addressee's name and address. The ink transmission layer 550 is formed of, for example, a titanium oxide, silica gel, PMMA (methacrylic resin), binder resin, barium sulfate, glass fiber, or plastic fiber, and has a white color which is suitable for a base. In general, the color of the surface of a postcard on which information of an addressee is written is preferably white or light color, but the invention is not limited thereto. For example, the ink absorption layer 550 may be formed of any other material as long as it can transmit ink and is of a light color.

When the unit region S0 of the base 300 where the ink absorption layer 500 is formed is bent at the adjacent portion R14 toward the unit region S0 of the adhesive surface S20 adjacent to the left side of the ink absorption layer 500, the adhesive layer 610 formed on the front surface of the base 300 is used to bond the unit region S0 of the base 300 where the ink absorption layer 500 is formed to the unit region S0 of the adhesive surface S20 in the extending portion 100*b*. Therefore, after the bonding is performed using the adhesive layer 610, the addressee's name and address printed on the ink absorption layer 500 can be viewed from the surface of the adhesive surface S20.

When the unit region S0 of the adhesive surface S20 is bent at the adjacent portion R13 toward the first printing surface P10 adjacent to the left side of the adhesive surface S20, the adhesive layer 620 formed on the rear surface of the base 300 is used to bond the unit region S0 of the adhesive surface S20 to the rear surface of the first printing surface P10 in the extending portion 100*b*. Therefore, after the bonding is performed using the adhesive layer 620, the unit region S0 of the adhesive surface S20 overlaps the rear surface of the first printing surface P10.

When the unit region S0 of the base 300 where the ink absorption layer 400 is formed is bent at the adjacent portion R12 toward the unit region S0 of the adhesive surface S10 adjacent to the left side of the ink absorption layer 400, the adhesive layer 630 formed on the front surface of the base 300 is used to bond the unit region S0 of the base 300 where the ink absorption layer 400 is formed to the unit region S0 of the adhesive surface S10 in the extending portion 100*b*. Therefore, after the bonding is performed using the adhesive layer 630, the parallax image printed on the ink absorption layer 400 can be viewed from the rear surface of the adhesive surface S10.

When the unit region S0 of the adhesive surface S10 is bent at the adjacent portion R11 toward the lenticular sheet 100*a* adjacent to the left side of FIG. 4, the adhesive layer 640 formed on the rear surface of the base 300 is used to bond the unit region S0 of the adhesive surface S10 to the rear surface of lenticular sheet 100*a* in the extending portion 100*b*. Therefore, after the bonding is performed using the adhesive layer 640, the unit region S0 of the adhesive surface S20 overlaps the rear surface of the lenticular sheet 100*a*.

Since the adhesive layer 630 and the adhesive layer 640 are interposed between the lenticular sheet 100*a* and the ink absorption layer 400 having a parallax image formed thereon, the adhesive layers 630 and 640 are formed of a material to have sufficient transparency for the parallax image to be viewed from the front surface of the lenticular sheet 100*a*.

The adhesive layers 610 to 640 are formed of a material having sufficient adhesion to prevent each unit region S0 of the first and second printing surfaces P10 and P20 from peeling off from the corresponding adhesive surface during assortment or mailing when the printing medium 100 is sent as a postcard. For example, each of the adhesive layers 610 to 640 may be formed of an epoxy-based, an acryl-based or a cyanoacrylate-based adhesive. Alternatively, each of the adhesive layers 610 to 640 is formed of a double-faced adhesive tape.

In this embodiment, a peeling sheet is not provided on the surface of each adhesive layer. However, assuming that the adhesion of the adhesive layer deteriorates due to contamination, a peeling sheet may be provided to protect the adhesive layer. Of course, when the unit regions are bonded to each other, the peeling sheet is peeled off from the adhesive layer before adhesion. Therefore, the peeling sheet may be formed of a material that can be peeled off from the adhesive layer, such as a resin material or paper.

Next, a process of sequentially bending the extending portion 100*b* to bond the bent portion to the rear surface of the lenticular sheet 100*a* will be described with reference to FIGS. 5A to 5E.

FIGS. 5A to 5E are diagrams schematically illustrating the printing medium 100 according to this embodiment as viewed in the thickness direction. The components of the printing medium 100, such as the base 300 and the ink absorption layer 400, are formed in sheets (thin films) each having a thickness of several tens of microns to several hundreds of microns, as described above. However, for simplicity of explanation, in FIGS. 5A to 5E, components other than the base 300, the first printing surface P10, and the second printing surface P20 are omitted, and only the base 300, the first printing surface P10, and the second printing surface P20 are shown.

Figure 5A:
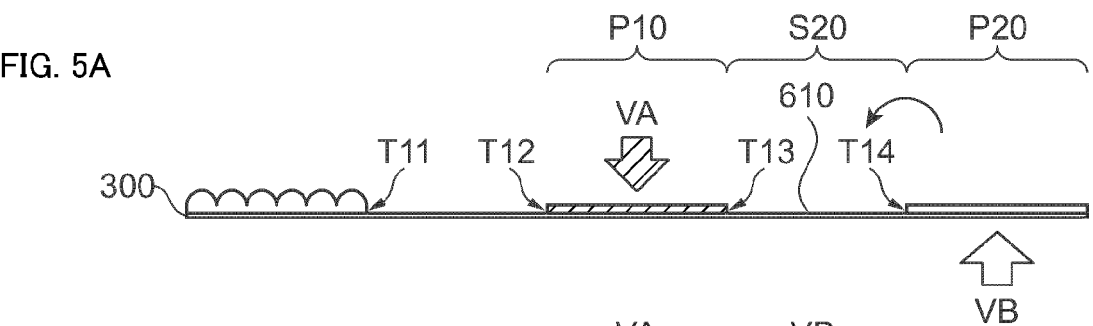
FIG. 5A is a diagram schematically illustrating the printing medium according to the second embodiment, as viewed in the thickness direction.

As shown in FIG. 5A, it is assumed that, in the printing medium 100, a 'parallax image' VA is printed on the first printing surface P10 and the 'addressee's name and address' VB is printed on the second printing surface P20 on the front surface (the upper surface in FIGS. 5A to 5E) of the base 300. In this case, as represented by large arrows in FIGS. 5A to 5E, the parallax image VA can be viewed from the front surface of the first printing surface P10, that is, the front surface of the base 300, and the addressee's name and address VB can be viewed from the rear surface of the base 300 opposite the front surface of the base 300. In addition, 'folding lines T11 to T14' are formed on the printing medium 100 to correspond to the adjacent portions R11 to R14, respectively. The formation of the 'parallax image' VA, the 'addressee's name and address' VB, and the 'folding lines T11 to T14' will be described later.

Figure 5B:
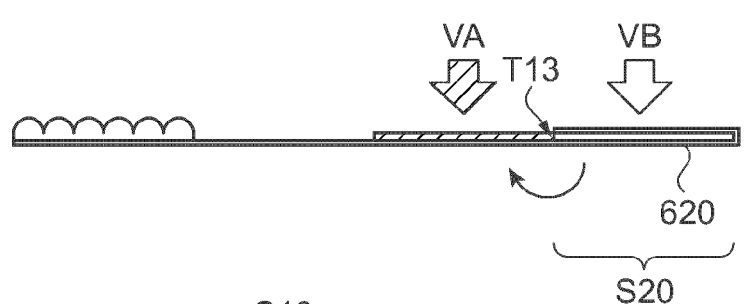
FIGS. 5B to 5D are diagrams schematically illustrating a folded extending portion.

First, as shown in FIG. 5A, the base 300 is folded at the folding line T14. That is, the second printing surface P20 is bent in the direction of an arrow in FIG. 5A such that the unit region of the adhesive surface S20 and the unit region of the second printing surface P20 are bonded to each other by the adhesive layer 610. FIG. 5B shows the base 300 after the bonding. As represented by large arrows in FIG. 5B, the addressee's name and address VB and the parallax image VA can be viewed in the same direction, that is, from the front surface of the base 300.

Figure 5C:
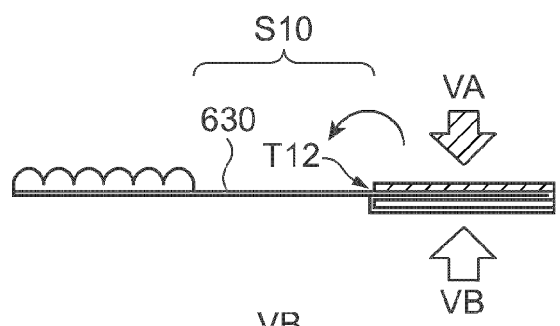

Next, as shown in FIG. 5B, the base 300 is folded at the folding line T13. That is, the adhesive surface S20 is bent in the direction of an arrow in FIG. 5B such that the unit region of the adhesive surface S20 and the unit region of the first printing surface P10 are bonded to each other by the adhesive layer 620. FIG. 5C shows the base 300 after the bonding. As can be represented by large arrows in FIG. 5C, the addressee's name and address VB can be viewed from a side opposite the parallax image VA, that is, from the rear surface of the base 300.

Figure 5D:
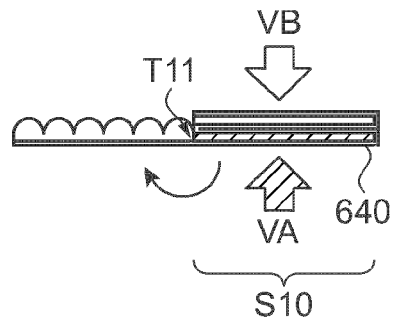

Then, as shown in FIG. 5C, the base 300 is folded at the folding line T12. That is, the first printing surface P10 is bent in the direction of an arrow in FIG. 5C such that the unit region of the adhesive surface S10 and the unit region of the first printing surface P10 are bonded to each other by the adhesive layer 630. FIG. 5D shows the base 300 after the bonding. As represented by large arrows in FIG. 5D, the addressee's name and address VB can be viewed from the front surface of the base 300, and the parallax image VA can be viewed from the rear surface of the base 300.

Figure 5E:
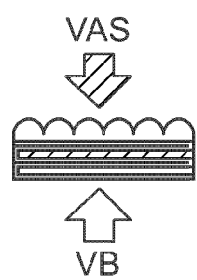
FIG. 5E is a diagram schematically illustrating the printing medium after the extending portion is folded.

Next, as shown in FIG. 5D, the base 300 is folded at the folding line T11. That is, the adhesive surface S10 is bent in the direction of an arrow in FIG. 5D such that the unit region of the adhesive surface S10 and the unit region of the rear surface of the lenticular sheet 100a are bonded to each other by the adhesive layer 640. FIG. 5E shows the base 300 after the bonding.

As can be seen from FIG. 5E, when the base 300 is sequentially folded at the folding lines T11 to T14, the extending portion 100b is bonded to the lenticular sheet 100a so as to overlap the rear surface of the lenticular sheet 100a. As represented by large arrows in FIG. 5E, in the printing medium 100, a parallax image VAS can be viewed from the front surface of the lenticular sheet 100a, and the addressee's name and address VB can be viewed from the rear surface of the lenticular sheet 100a. That is, the printing medium 100 is a 'postcard' having one surface from which a three-dimensional image due to the parallax image VAS can be viewed and the other surface from which the addressee's name and address VB can be viewed.

As described with reference to FIGS. 5A to 5E, in the printing medium 100 according to this embodiment, the extending portion 100b is sequentially folded at the folding lines T11 to T14, which makes it possible to easily bond the lenticular sheet 100a to the extending portion 100b. In addition, the extending portion 100b is folded at the folding lines T11 to T14 inward and outward, which makes it possible to bond the unit regions while preventing the positional deviation therebetween. Therefore, a user can easily write a postcard having a three-dimensional image on the front surface thereof without bonding a sheet having the addressee's name and address VB written thereon to the parallax image VA by using an adhesive while performing alignment with the lenticular sheet. As can be seen from FIG. 4 and FIGS. 5A to 5E, since adhesive layers are not formed on the first and second printing surfaces P10 and P20, it is possible to prevent the parallax image VA and the addressee's name and address VB from being damaged due to contamination.

Figure 6A:
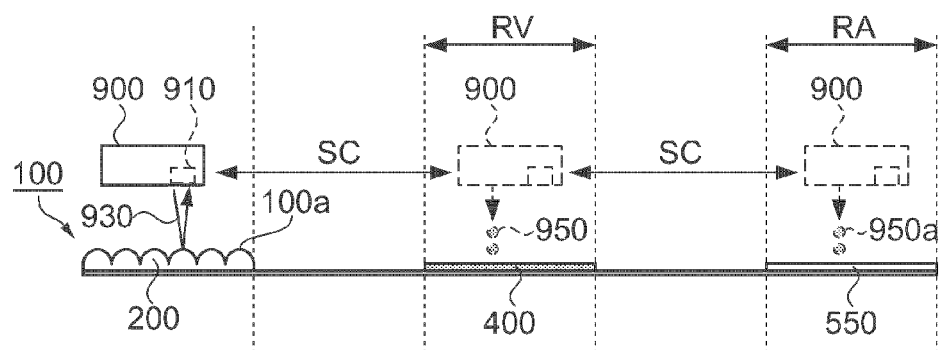
FIG. 6A is a diagram schematically illustrating the printing of images on the printing medium according to the second embodiment.
Figure 6B:
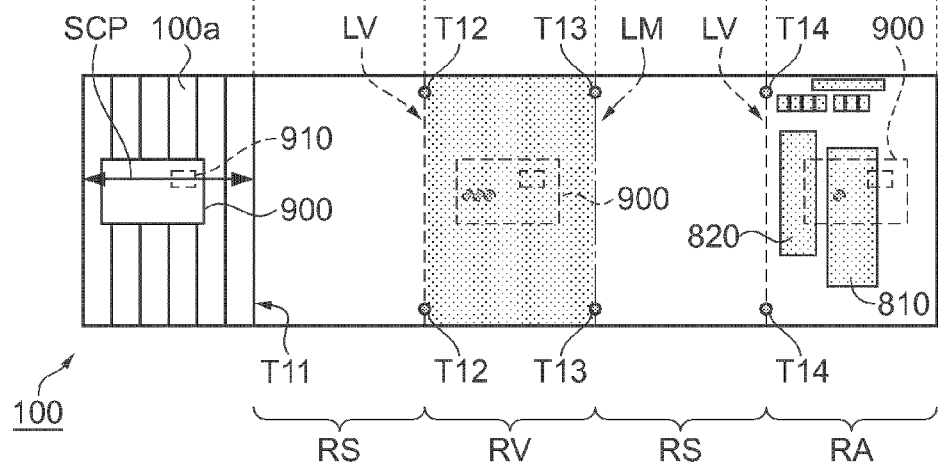
FIG. 6B is a diagram schematically illustrating the printing medium shown in FIG. 6A, as viewed from the upper side.

Next, the printing of the 'parallax image' VA and the 'addressee's name and address' VB will be described with reference to FIGS. 6A and 6B. FIG. 6A is a diagram schematically illustrating the printing medium 100 as viewed in the thickness direction, and FIG. 6B is a diagram schematically illustrating the printing medium 100 as viewed from the upper side. In this embodiment, it is assumed that a printer includes a carriage having a printing head, and the printing head discharges ink droplets while the carriage is being moved, thereby printing a parallax image, the addressee's name and address, and folding lines on a printing medium. Any kind of printers other than ink jet printers can be used to perform printing as long as the carriage can scan a printing medium.

As shown in FIG. 6A, a carriage 900 having a printing head (not shown) of a printer is arranged above the printing medium 100, and the carriage 900 scans the printing medium 100 in a horizontal direction SC to perform printing on the printing medium, as represented by an arrow in FIG. 6A. The printing medium 100 is transported backward in the vertical direction of the plane of the drawing by a transport member of the printer, such as a roller, so that printing is performed on the entire region of the printing medium 100.

Further, as shown in FIG. 6A, the carriage 900 is provided with a detecting unit 910 for detecting pitches among the convex lenses 200 using reflected light 930, and the detecting unit 910 detects the pitches among the convex lenses 200 according to the scanning operation of the carriage. In the pitch detecting range where the lenticular sheet 100a exists, as represented by an arrow on the left side of FIG. 6B, the detecting unit performs pitch detection scanning SCP according to the scanning operation of the carriage 900. Then, a predetermined process is performed on the results of the detection, and the processed results are stored in, for example, a storage unit provided in the printer. In this way, information on the pitches among the convex lenses 200 of the lenticular sheet 100a is stored.

As shown in the center of FIG. 6A, when the carriage 900 scans a parallax image printing range, as described above, the information on the pitches among the convex lenses 200 stored is read before the printing of the parallax image, and ink 950 is discharged from the printing head (not shown) of the carriage 900 at positions corresponding to the convex lenses 200 on the basis of the read pitch information such that the ink is dropped on the surface of the ink absorption layer 400, thereby printing a predetermined parallax image. The parallax image is printed on the overall parallax image printing range RV shown in a central netted portion of FIG. 6B. In this way, parallax images for right and left eyes are formed on the basis of the information on the pitches among the convex lenses 200, so that the parallax image is formed at appropriate positions on the convex lenses 200 of the lenticular sheet 100a. Then, as described above, the first printing surface P10 is bonded to an appropriate position of the rear surface of the lenticular sheet 100a such that a three-dimensional image can be viewed.

As can be seen from FIGS. 5A to 5E, the parallax image formed on the basis of the information on the pitches among the convex lenses 200 is bent two times alternating between inward and outward to be bonded to the rear surface of the lenticular sheet 100*a* by the adhesive layer 630 and the adhesive layer 640 formed on the adhesive surface S10. Therefore, in FIG. 6B, the position of each convex lens is not reverse to the position of the parallax image corresponding to the convex lens. Thus, it is possible to read and use the information on the pitches among the convex lenses without performing an additional process, such as a reverse process, on the pitch information. The adhesive surface S10 interposed between the lenticular sheet 100*a* and the first printing surface P10 makes it possible to form the first printing surface P10 on the surface of the base on which the lenticular sheet 100*a* is fixed. In addition, it is possible to use the information on the pitches among the convex lenses 200 without additionally processing the pitch information.

Subsequently, as shown on the right side of FIG. 6A, when the scanning position of the carriage 900 is moved from the parallax image printing range RV to the addressee's name and address range RV, the addressee's name and address are printed on a postcard. For example, as shown in a right netted portion of FIG. 6B, predetermined characters are printed in a name section 810 and an address section 820. In addition, characters corresponding to the items to be written on a postcard, such as characters 'postcard', are printed. More specifically, the printing head (not shown) of the carriage 900 discharges the ink 950*a* onto the surface of the ink transmission layer 550 to print the addressee's name and address. In addition, in FIGS. 6A and 6B, the ink 950*b* is discharged to print addressee's name in the name section 810.

In this embodiment, in FIG. 6B, backward characters of the addressee's name and address are printed as viewed from the front of the drawing. This is because, when the second printing surface P20 overlaps the adhesive surface S20, the printed addressee's name and address are reversed, as described in FIGS. 5A to 5E. Therefore, the addressee's name and address are printed so as to be reversed, so that they are correctly read.

In general, since the parallax image is a color image, color ink is used as the ink 950. In order to print parallax images for right and left eyes at a narrow pitch between the convex lenses, ink droplets having a small diameter are preferably discharged. Meanwhile, since a zip code and an address are written as characters in an address section, black ink is generally used as the ink 950*a*. In many cases, since bold characters are used so as to be recognizable, ink droplets having a large diameter are preferably discharged.

In this embodiment, the printing head of the carriage 900 can discharge both the ink 950 and the ink 950*a* to print the parallax image and the addressee's name and address. The ink 950 is used in the parallax image printing region RV, and the ink 950*a* is used in the addressee's name and address printing range PA. In this way, it is possible to simultaneously print both the parallax image and the addressee's name and address by moving the carriage 900.

Since the size of characters printed in the address and name sections is larger than that of the parallax image, the carriage 900 may scan the printing medium at a larger pitch in the addressee's name and address printing range RA than in the parallax image printing range RV. In this way, it is possible to shorten the time required to print the addressee's name and address. In addition, color ink may be used as the ink 950*a*, and ink droplets may have the same diameter. Further, the carriage may scan the printing medium at the same pitch.

Next, the formation of the 'folding line T11 to T14' will be described below. In this embodiment, as shown in FIG. 6B, the carriage 900 scans the printing medium to print the parallax image to print the folding lines T12 and T13 at right and left ends of the parallax image printing range RV, that is, at positions corresponding to the adjacent portions R12 and R13 shown in FIG. 4. In addition, the carriage 900 prints the folding line T14 at the left end of the addressee's name and address printing range RA, that is, at a position corresponding to the adjacent portion R14 shown in FIG. 4. Therefore, the printing head of the carriage 900 discharges ink onto the surface of the ink transmission layer 550 and the surface of the ink absorption layer 400 at the corresponding positions to print the folding lines T12 to T14.

In this case, the ink discharged onto the ink transmission layer 550 to print the folding line T14 is transmitted to the ink absorption layer 500, similar to the ink for printing the parallax image. Therefore, since a user views the printed folding line T14 through the ink transmission layer 550, ink for printing the folding line T14 may be ink having a high chroma such as black ink.

In FIG. 6B, each of the printed folding lines T12 to T14 is composed of two dots, that is, upper and lower dots, but the invention is not limited thereto. The printed folding lines T12 to T14 may be dotted lines or solid lines having sufficient sizes for the user to recognize. In addition, each of the folding lines T12 to T14 may be printed in a portion of or over the entire adjacent portion. As can be seen from FIGS. 5A to 5E, the base 300 is folded in different directions at the folding lines T12 and T14 and the folding line T13. Therefore, the folding lines T12 and T14 may be valley folds LV (dotted lines), and the folding line T13 may be a mountain fold LM (one-dot chain line). In this way, it is possible to improve the visibility of a bending direction as well as the positions of the folding lines.

In this embodiment, since the printing surface is not formed at the folding line T11 formed at a position corresponding to the adjacent portion R11, a right long side of the lenticular sheet 100*a* is used as the folding line T11.

As described above, according to the printing medium 100 of the second embodiment, it is possible to print the 'parallax image' VA and the 'addressee's name and address' VB on the first printing surface P10 and the second printing surface P20 provided on a surface of the base 300 on which the lenticular sheet 100*a* is formed, respectively. Therefore, it is possible to simultaneously print the parallax image and the addressee's name and address on one surface of a printing medium, without performing double-faced printing on the printing medium.

Further, information on the pitches among the convex lenses 200 is accurately read by using reflected light of the lenses when the parallax image is printed, and the parallax image is printed on the first printing surface P10 on the basis of the read pitch information, which makes it possible to accurately print the parallax image at positions aligned with the convex lenses 200.

Furthermore, the adhesive surface S20 is interposed between the first printing surface P10 and the second printing surface P20, and the adhesive surface S10 is interposed between the first printing surface P10 and the lenticular sheet 100*a*. Therefore, the base 300 is sequentially folded at the folding lines T14 to T11 such that the entire surface of the extending portion 100*b* is bonded to the rear surface of the lenticular sheet 100*a*, without forming adhesive layers on the printing surfaces for the parallax image and the addressee's name and address. Thus, a user can send a postcard to another person without bonding the extending portion 100*b* to the rear surface of the lenticular sheet 100*a* using an additional adhesive and damaging the parallax image and the addressee's name and address. Further, since the extending portion 100*b* is folded at the folding lines inward and outward, it is possible to bond the extending portion 100*b* to the rear surface of the lenticular sheet 100a while preventing the positional deviation between the extending portion 100b and the convex lenses 200.

As can be apparently seen from the first and second embodiments, an adhesive layer is interposed between the first printing surface and the second printing surface, which makes it possible to form the first and second printing surfaces on one surface of the base. In addition, an adhesive surface is interposed between the lenticular sheet and the first printing surface, which makes it possible to form the first and second printing surfaces on the surface of the base on which the lenticular sheet is fixed or to form the printing surface in a direction in which the parallax image is viewed. That is, a user can write a printing medium suitable for a desired printing method according to a method of providing an adhesive layer.

For example, when a user uses a printer that detects pitches between convex lenses by using reflected light, an adhesive layer is interposed between the lenticular sheet and the first printing surface, as in the second embodiment. Alternatively, when a parallax image is printed on a transfer sheet, it is difficult to view the parallax image from the back side of the printing surface. Therefore, adhesive layers may be provided as in the second embodiment such that the parallax image can be viewed from the printing surface. In this way, it is possible to adjust the positions of printing surfaces where a parallax image and the addressee's name and address are formed by setting the positions of the adhesive layers and the number of adhesive layers. As a result, it is possible to form a printing medium that a user wants to use.

Third Embodiment

Figure 10:
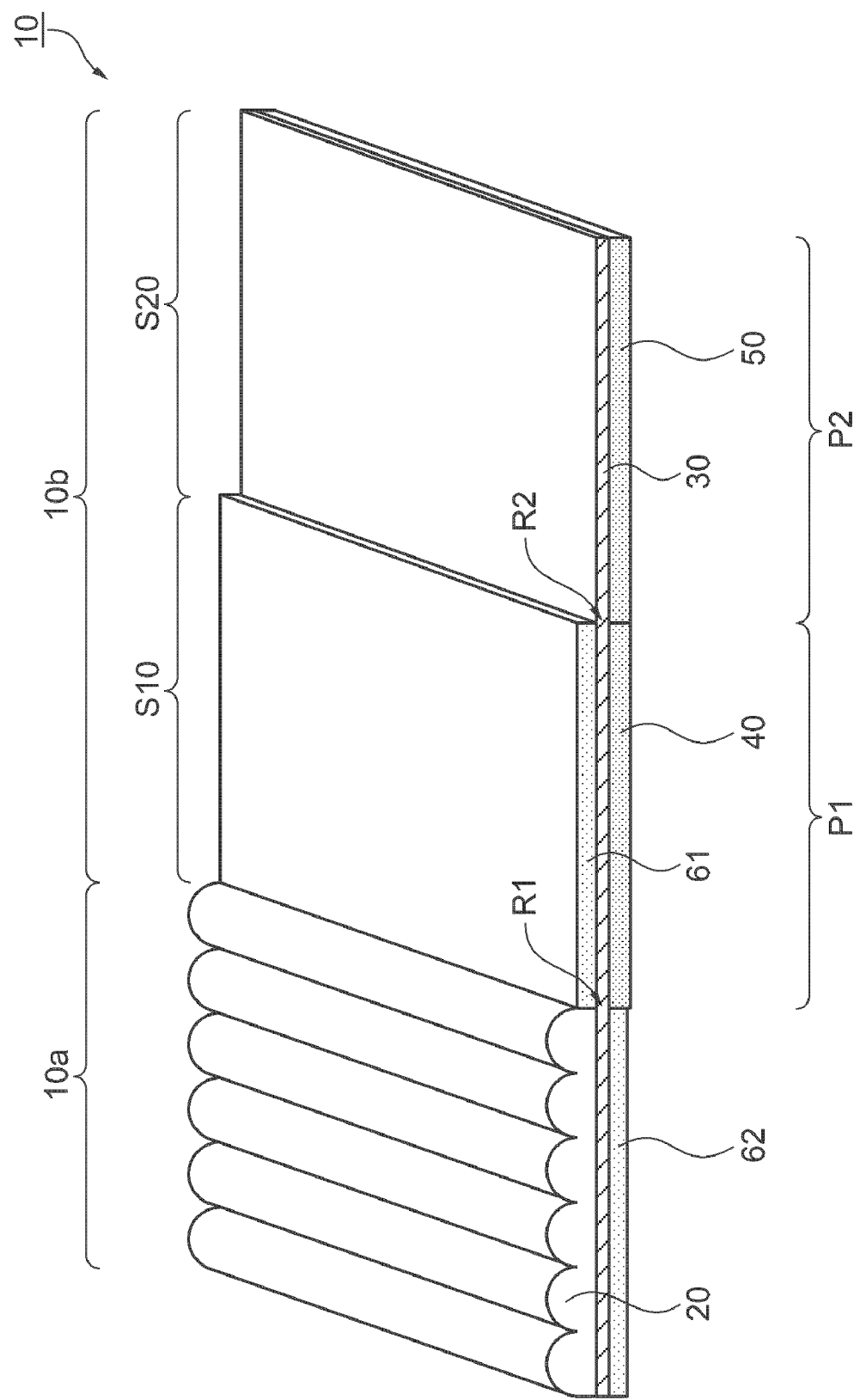
FIG. 10 is a diagram schematically illustrating components of a printing medium according to a third embodiment of the invention.

A printing medium 10 according to a third embodiment of the invention will be described with reference to FIG. 10. FIG. 10 is a diagram schematically illustrating components of the printing medium 10. The printing medium 10 includes a rectangular lenticular sheet 10a having a plurality of circular convex lenses 20 formed on the surface thereof (an upper surface in FIG. 10), a base 30, an ink absorption layer 40, an ink absorption layer 50, an adhesive layer 61, and an adhesive layer 62.

In this embodiment, the axial direction of each of the cylindrical convex lenses 20 is parallel to a long side of the rectangular lenticular sheet 10a. In addition, for simplicity of explanation, it is assumed that the lenticular sheet is composed of six cylindrical convex lenses 20. In many cases, the lenticular sheet 10a having convex lenses 20 arranged at pitches of 10 to 180 LPI (lenses per inch) is generally used, and actually, the number of convex lenses corresponding to the pitches is provided in the lenticular sheet.

Further, in FIG. 10, the components of the printing medium 10 are shown to have recognizable thicknesses, but actually, the components are formed in sheets (thin films) each having a thickness of several tens of microns to several hundreds of microns.

Next, the components of the printing medium 10 will be described in detail. Then, a structure for bending an extending portion 10b to use the printing medium as a postcard will be described with reference to FIG. 11.

The lenticular sheet 10a is formed of a transparent resin material capable of being used as a lens, such as PET (polyethylene terephthalate), PETG (glycol-modified polyethylene terephthalate), APET, PP, PS, PVC, acryl, UV, or PC (polycarbonate) resin, or PMMA (methacrylic) resin, and the entire rear surface (the entire lower surface) of the lenticular sheet 10a is fixed to the base 30. A known method, such as welding or adhesion, is used to fix the lenticular sheet 10a to the base 30 according to a material forming the base 30. However, any method can be used to fix the lenticular sheet 10a to the base 30 as long as transparency of the lenticular sheet 10a and the base 30 can be ensured.

The base 30 is formed of a transparent material, such as a PETG resin, in a thin film form. Of course, the base 30 may be formed of a general PET resin. In addition, the base 30 may be formed of any transparent material as long as a viewer can view a parallax image formed on a first printing surface, which will be described later, through the lenticular sheet 10a and the base 30 can be folded at a folding line, which will be described later.

As shown in FIG. 10, the base 30 has an extending portion 10b that extends from the lenticular sheet 10a toward the right side of FIG. 10 and is adjacent to the right of a right long side of the rectangular lenticular sheet 10a. When an area corresponding to the rear surface of the lenticular sheet 10a is referred to as a unit region, the extending portion 10b has an area corresponding to two unit regions, and includes a first unit region S10 adjacent to the lenticular sheet 10a at an adjacent portion R1 and a second unit region S20 adjacent to the first unit region S10 at an adjacent portion R2. Therefore, the base has an area corresponding to three unit regions. When the base 30 is folded at the adjacent portions R1 and R2, the extending portion 10b overlaps the entire rear surface of the lenticular sheet 10a.

The ink absorption layer 40 is formed on the rear surface (the lower surface in FIG. 10) of the base 30 in the first unit region S10 to form a first printing surface P1 having a unit area. The ink absorption layer 40 is a component for forming a parallax image for each convex lens 20. When the parallax image is formed by ink jet printing, the ink absorption layer 40 absorbs the jetted ink and fixes the ink to a jetted position. The ink absorption layer 40 makes it possible to stably form a parallax image at a position corresponding to each convex lens 20, and to appropriately form a three-dimensional image. The ink absorption layer 40 is formed of, for example, a lyophilic polymer resin, such as PVA (polyvinyl alcohol), a cation compound, or fine particles, such as silica.

The ink absorption layer 50 is formed on the rear surface of the base 30 in the second unit region S20 to form a second printing surface P2 having a unit area. When characters corresponding to information of an addressee, such as a zip code or an address, are formed by ink jet printing, the ink absorption layer 50 absorbs the jetted ink and fixes the ink at a jetted position. The ink absorption layer 50 is formed of, for example, a lyophilic polymer resin, such as PVA (polyvinyl alcohol), a cation compound, fine particles, such as silica. The ink absorption layer 50 makes it possible to appropriately form the addressee's name and address. In general, the color of the surface of a postcard on which information of an addressee is written is preferably white or light color, but the invention is not limited thereto. For example, the ink absorption layer 50 may be formed of any other material as long as it can transmit ink and is of a light color.

The adhesive layer 61 and the adhesive layer 62 are formed on the front and rear surfaces of the base 30, respectively. The adhesive layer 61 is formed as an adhesive surface in the first unit region S10 where the first printing surface P1 is formed, and the adhesive layer 62 is formed on the entire rear surface of the lenticular sheet 10a as an adhesive surface.

When the second unit region S20 of the base 30 where the ink absorption layer 50 is formed is bent at the adjacent portion R2 toward the first unit region S10 adjacent to the left side of the ink absorption layer 50, the adhesive layer 61 formed on the front surface of the base 30 is used to bond the second unit region S20 of the base 30 where the ink absorption layer 50 is formed to the first unit region S10 in the extending portion 10b. Therefore, after the bonding of the second unit region S20 by the adhesive layer 61, the addressee's name and address printed on the ink absorption layer 50 can be viewed from the front surface of the printing medium 10 (the upper surface in FIG. 10), which is a surface of the base 30 having the lenticular sheet 10a fixed thereto.

Therefore, the adhesive layer 61 is formed of a material having sufficient adhesion to prevent the second unit region S20 from peeling off from a postcard during assortment or mailing when the printing medium 10 is sent as a postcard. For example, the adhesive layer 61 may be formed of an epoxy-based, an acryl-based or a cyanoacrylate-based adhesive. In addition, the adhesive layer 61 may be formed of a double-sided adhesive tape. Of course, any adhesive may be used as long as it can bond the base 30.

When the first unit region S10 of the base 30 where the ink absorption layer 40 is formed is bent at the adjacent portion R1 toward the rear surface of the lenticular sheet 10a adjacent to the left side of the first unit region S10, the adhesive layer 62 formed on the rear surface of the base 30 is used to bond the first unit region S10 to the rear surface of the lenticular sheet 10a in the extending portion 10b. Therefore, after the bonding of the first unit region S10 by the adhesive layer 62, the first printing surface P1 overlaps the rear surface of the lenticular sheet 10a.

The adhesive layer 62 is formed of a material to have sufficient adhesion to bond the ink absorption layer 40 to the base 30. For example, the adhesive layer 62 may be formed of an epoxy-based, an acryl-based or a cyanoacrylate-based adhesive. Of course, the adhesive layer 62 may be formed of any material as long as it can bond the ink absorption layer 40 to the base 30.

Since the adhesive layer 62 is interposed between the lenticular sheet 10a and the ink absorption layer 40 having a parallax image formed thereon, the adhesive layer 62 is preferably formed of a material to have sufficient transparency for the parallax image to be viewed from the front surface of the lenticular sheet 10a when the ink absorption layer 40 is bonded to the base 30.

In this embodiment, a peeling sheet is not provided on the rear surface of the adhesive layer. However, assuming that the adhesion of the adhesive layer deteriorates due to contamination, a peeling sheet may be provided to protect the adhesive layer. Of course, the peeling sheet is peeled off from the adhesive layer before bonding the unit regions. Therefore, the peeling sheet may be formed of a material that can be peeled off from the adhesive layer, such as a resin material or paper.

Figure 11A:
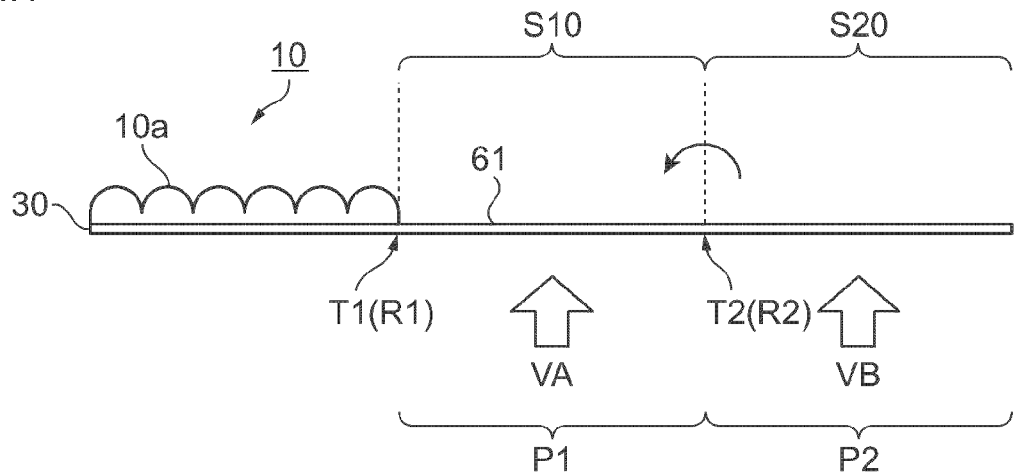
FIG. 11A is a diagram schematically illustrating the printing medium according to the third embodiment, as viewed in the thickness direction.
Figure 11B:
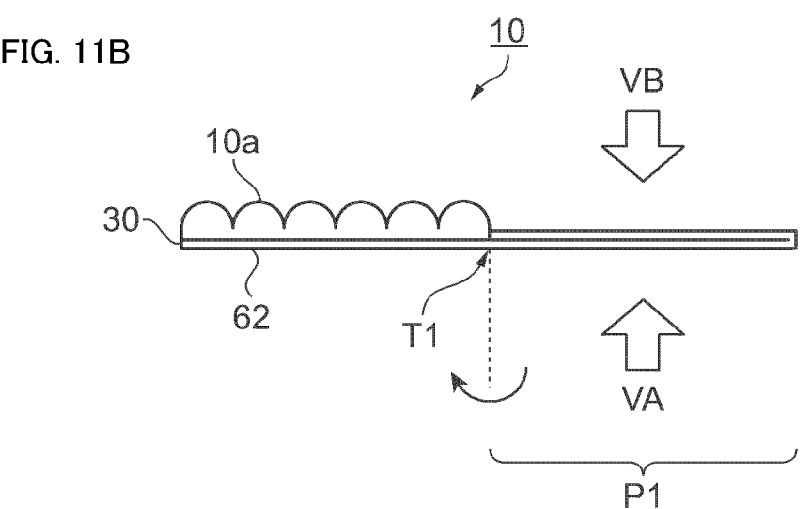
FIG. 11B is a diagram schematically illustrating a folded extending portion.
Figure 11C:
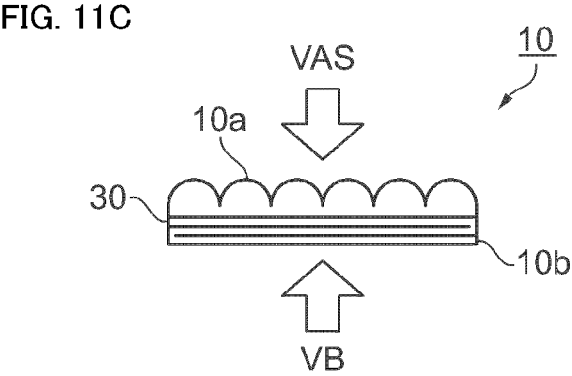
FIG. 11C is a diagram schematically illustrating the printing medium after the extending portion is folded.

Next, a process of sequentially bending the extending portion 10b to bond the bent portion to the rear surface of the lenticular sheet 10a will be described with reference to FIGS. 11A to 11C. FIGS. 11A to 11C are diagrams schematically illustrating the printing medium 10 as viewed in the thickness direction. The components of the printing medium 10, such as the base 30 and the ink absorption layer 40, are formed in sheets (thin films) each having a thickness of several tens of microns to several hundreds of microns, as described above. Therefore, for simplicity of explanation, in FIGS. 11A to 11C, components other than the base 30 are omitted, and only the base 30 is shown as a sheet.

As shown in FIG. 11A, it is assumed that, in the printing medium 10, a 'parallax image' VA is printed on the first printing surface P1 formed in the first unit region S10 and the 'addressee's name and address' VB is printed on the second printing surface P2 in the second unit region S20, on the rear surface (the lower surface in FIGS. 11A to 11C) of the base 30.

In this case, as represented by large arrows in FIG. 11A, the parallax image VA and the addressee's name and address VB can be viewed from the rear surface of the base 30. A 'folding line T1' corresponding to the adjacent portion R1 and a 'folding line T2' corresponding to the adjacent portion R2 are formed on the rear surface of the printing medium 10. The formation of the parallax image VA, the addressee's name and address VB, the folding line T1, and the folding line T2 will be described in detail later.

First, as shown in FIG. 11A, the base 30 is folded at the folding line T2. That is, the second printing surface P2 is bent in the direction of an arrow in FIG. 11A, and the first unit region S10 and the second unit region S20 where the second printing surface P2 is formed are bonded to each other by the adhesive layer 61. FIG. 11B shows the base 30 after the bonding. As represented by large arrows in FIG. 11B, the addressee's name and address VB can be viewed in a direction opposite to the direction in which the parallax image VA is viewed, that is, from the front surface of the base 30.

Next, as shown in FIG. 11B, the base 30 is folded at the folding line T1. That is, the first printing surface P1 is bent in the direction of an arrow in FIG. 11B, and the first printing surface P1 is bonded to the rear surface of the lenticular sheet 10a by the adhesive layer 62. FIG. 11C shows the base 30 after the bonding.

As can be seen from FIG. 11C, when the base 30 is folded at the folding lines T2 and T1, the extending portion 10b is bonded to the lenticular sheet 10a so as to overlap the rear surface of the lenticular sheet 10a. As represented by large arrows in FIG. 1C, in the printing medium 10, the parallax image VA can be viewed from the front surface of the lenticular sheet 10a through the lenticular sheet 10a and the base 30, and the addressee's name and address VB can be viewed from the rear surface of the lenticular sheet 10a. That is, the printing medium 10 is a postcard having one surface from which a three-dimensional image due to the parallax image VA can be viewed and the other surface from which the addressee's name and address can be viewed.

As described with reference to FIGS. 11A to 11C, in the printing medium 10 according to this embodiment, the base 30 is folded at the folding line T1 and the folding line T2 inward and outward, which makes it possible to easily bond the lenticular sheet 10a to the extending portion 10b. In addition, the first printing surface P1 is bent at the folding line T1, which makes it possible to accurately bond the extending portion 10b to the lenticular sheet 10a with the parallax image VA aligned with the convex lenses 20 formed on the lenticular sheet 10a. Therefore, a user can easily write a postcard having a three-dimensional image to be visible without bonding a sheet having the addressee's name and address written thereon to the parallax image by using an adhesive while performing alignment with the lenticular sheet.

Figure 12A:
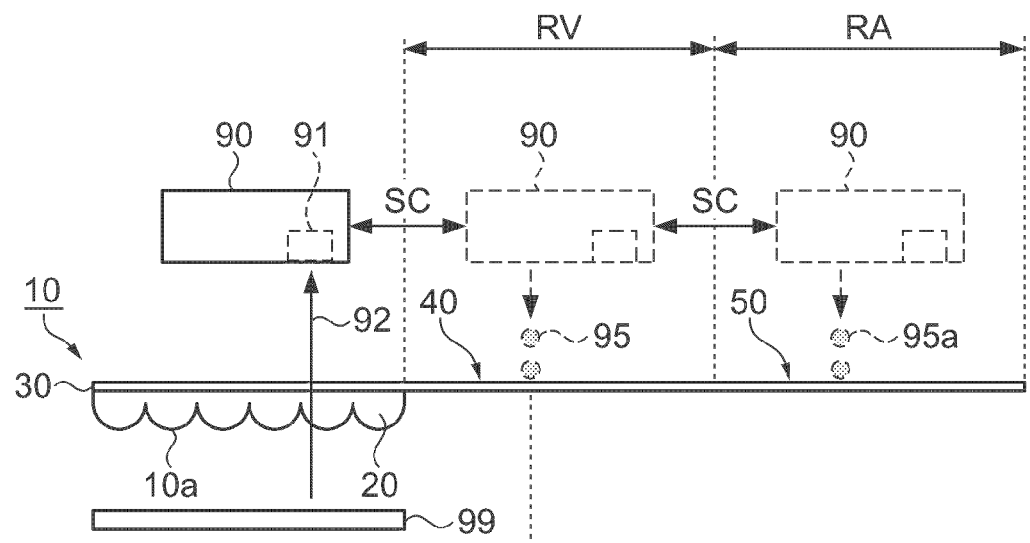
FIG. 12A is a diagram schematically illustrating the printing of images on the printing medium according to the third embodiment.
Figure 12B:
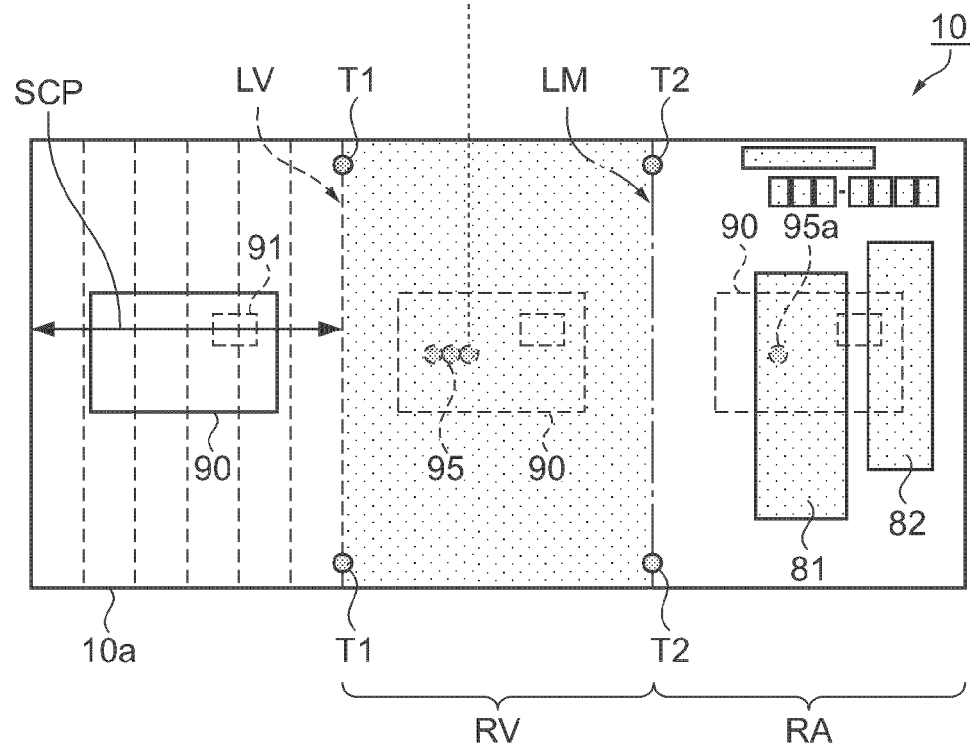
FIG. 12B is a diagram schematically illustrating the printing medium shown in FIG. 12A, as viewed from the upper side.

Next, the printing of the 'parallax image' VA and the 'addressee's name and address' VB will be described with reference to FIGS. 12A and 12B. FIG. 12A is a diagram schematically illustrating the printing medium 10 as viewed in the thickness direction, and FIG. 12B is a diagram schematically illustrating the printing medium 10 as viewed from the upper side. In this embodiment, similar to FIGS. 11A to 11C, for simplicity of explanation, only the base 30 is shown as a sheet. Further, in this embodiment, it is assumed that a printer includes a carriage having a printing head, and the printing head discharges ink droplets while the carriage is being moved, thereby printing a parallax image VA, the addressee's name and address VB, and folding lines on a printing medium. Any kind of printers, such as thermal printers, other than ink jet printers can be used to perform printing as long as the carriage can scan a printing medium.

As shown in FIG. 12A, a carriage 90 having a printing head (not shown) of a printer is arranged above the printing medium 10, and the carriage 90 scans the printing medium 10 in a horizontal direction SC to perform printing, as represented by an arrow in FIG. 12A. The printing medium 10 is transported backward in the vertical direction of the plane of the drawing by a transport member (not shown) of the printer, such as a roller, so that printing is performed on the entire region of the printing medium 10.

A light-emitting surface 99 is arranged below the lower surface of the lenticular sheet 10*a* of the printing medium 10. A detecting unit 91 is provided in the carriage 90 to detect transmission light 92 that is emitted from the light-emitting surface 99 and then sequentially passes through each convex lens 20, the base 30, and the adhesive layer 62. Since the amount of transmission light 92 depends on a variation in the thickness of the convex lens 20, the detecting unit 91 detects a variation in the amount of transmission light caused by the scanning of the carriage (which is represented by an arrow in FIGS. 12A and 12B) and thus detects pitches among the convex lenses 20 in the lenticular sheet 10*a*. Alternatively, the carriage may be provided with a detecting unit that detects pitches among the convex lenses 20 by using reflected light, and the detecting unit may detects the pitches among the convex lenses 20 according to the scanning operation of the carriage. A method of detecting pitches among the convex lenses 20 using reflected light will be described in a fourth embodiment, which will be described later.

The detection range is the overall range of the lenticular sheet 10*a*. As represented by an arrow on the left side of FIG. 12B, in the detection range, the detecting unit performs pitch detection scanning SCP according to the scanning operation of the carriage 90. Then, a predetermined process is performed on the results of the detection, and the processed results are stored in, for example, a storage unit provided in the printer. In this way, information on the pitches among the convex lenses 20 of the lenticular sheet 10*a* is stored before the printing of a parallax image.

As represented by a dotted line in the center of FIG. 12A, when the carriage 90 scans a parallax image printing range RV, as described above, the information on the pitches among the convex lenses 20 stored before the printing of the parallax image is read, and ink 95 is discharged from the printing head (not shown) of the carriage 90 at positions corresponding to the convex lenses 20 on the basis of the read pitch information such that ink is dropped on the surface of the ink absorption layer 40, thereby printing a predetermined parallax image. In this way, the parallax image is formed at an appropriate position relative to each convex lens 20.

Next, as represented by a dotted line on the right side of FIG. 12A, when the scanning position of the carriage 90 is moved from the parallax image printing range RV to an addressee's name and address printing range RA, information of an addressee, such as an address and name, is printed on a postcard, which is the printing medium. For example, as represented by a netted portion on the right side of FIG. 12B, predetermined characters are printed in a name section 81 and an address section 82. In addition, characters corresponding to the items to be written on a postcard, such as characters 'postcard', are printed. More specifically, the printing head (not shown) of the carriage 90 discharges ink 95*a* onto the surface of the ink absorption layer 50 to print the addressee's name and address. In addition, the addressee's name is printed in the name section 81 at the scanning position of the carriage 90 represented by dotted lines in FIGS. 12A and 12B.

In general, since the parallax image is a color image, color ink is used as the ink 95. In order to print parallax images for right and left eyes at a narrow pitch between the convex lenses, ink droplets having a small diameter are preferably discharged. Meanwhile, since a zip code and an address are written as characters in an address section, black ink is generally used as the ink 95*a*. In many cases, since bold characters are used so as to be recognizable, ink droplets having a large diameter are preferably discharged.

In this embodiment, the printing head of the carriage 90 can discharge both the ink 95 and the ink 95*a* to print the parallax image and the addressee's name and address, respectively. The ink 95 is used in the parallax image printing region RV, and the ink 95*a* is used in the addressee's name and address printing range RA. In this way, it is possible to simultaneously print both the parallax image and the addressee's name and address by moving the carriage 90.

Since the size of characters printed in the address and name sections is larger than that of the parallax image, the carriage 90 may scan the printing medium at a larger pitch in the addressee's name and address printing range RA than in the parallax image printing range RV. In this way, it is possible to shorten the time required to print the addressee's name and address. In addition, color ink may be used as the ink 95*a*, and ink droplets may have the same diameter. Further, the carriage may scan the printing medium at the same pitch.

Next, the formation of the 'folding line T1' and the 'folding line T2' will be described below. In this embodiment, as shown in FIG. 12B, when the carriage 90 scans the printing medium to print the parallax image, the carriage 90 prints the folding line T1 at the left end of the parallax image printing range RV, that is, at a position corresponding to the adjacent portion R1 shown in FIG. 10. In addition, the carriage 90 prints the folding line T2 at the right end of the parallax image printing range RV or the left end of the addressee's name and address printing range RA, that is, at a position corresponding to the adjacent portion R2 shown in FIG. 10. Therefore, the printing head of the carriage 90 discharges ink onto the surface of the ink absorption layer 40 and the surface of the ink absorption layer 50 at the corresponding positions to print the folding lines T1 and T2.

In this case, since the printed folding lines T1 and T2 are disposed at the ends of the parallax image, ink for printing the folding lines T1 and T2 may be ink having a high chroma, such as black ink, which is easily discriminated from the ink forming the parallax image.

In FIG. 12B, for example, each of the printed folding lines T1 and T2 is composed of two dots, that is, upper and lower dots, but the invention is not limited thereto. The printed folding lines T1 and T2 may be dotted lines or solid lines having sufficient sizes for the user to recognize. In addition, the folding line T1 may be printed in a portion of or over the entire adjacent portion R1. As can be seen from FIGS. 11A to 11C, the base 30 is folded in different directions at the adjacent portion R1 and the adjacent portion R2. Therefore, as shown in FIG. 12B, the folding line T1 may be a valley fold LV (dotted line), and the folding line T2 may be a mountain fold LM (one-dot chain line). In this way, it is possible to improve the visibility of a bending direction as well as the positions of the folding lines.

As described above, according to the printing medium 10 of the third embodiment (see FIG. 10), it is possible to print the 'parallax image' VA on the first printing surface P1 provided on a surface of the base 30 opposite the lenticular sheet 10*a* and the 'addressee's name and address' VB on the second printing surface P2, respectively. Therefore, it is possible to simultaneously print the parallax image VA and the addressee's name and address VB on one surface of a printing medium, without performing double-faced printing on the printing medium.

Further, information on the pitches among the convex lenses 20 is detected before the parallax image VA is printed, and the parallax image VA is printed on the first printing surface P1 on the basis of the detected pitch information, which makes it possible to print the parallax image at positions aligned with the convex lenses 20.

Furthermore, the first and second adhesive layers 61 and 62 are formed on the base 30 and the base 30 is folded at the folding lines T2 and T1 inward and outward, which makes it possible to easily bond the extending portion 10 having the parallax image VA and the addressee's name and address VB printed thereon to the rear surface of the lenticular sheet 10a at an appropriate position. Therefore, a user can send a postcard to another person without bonding the extending portion 10b to the rear surface of the lenticular sheet 10a using an additional adhesive so as to be aligned with the lenticular sheet 10a. In addition, as can be seen from FIG. 10 and FIGS. 11A to 11C, since adhesive layers are not formed on the first and second printing surfaces P1 and P2, it is possible to prevent the parallax image VA and the addressee's name and address VB from being damaged due to contamination. Further, since printing is directly performed on the printing surfaces, it is possible to print the parallax image VA and the addressee's name and address VB using a printing apparatus such as a printer.

Fourth Embodiment

Figure 13:
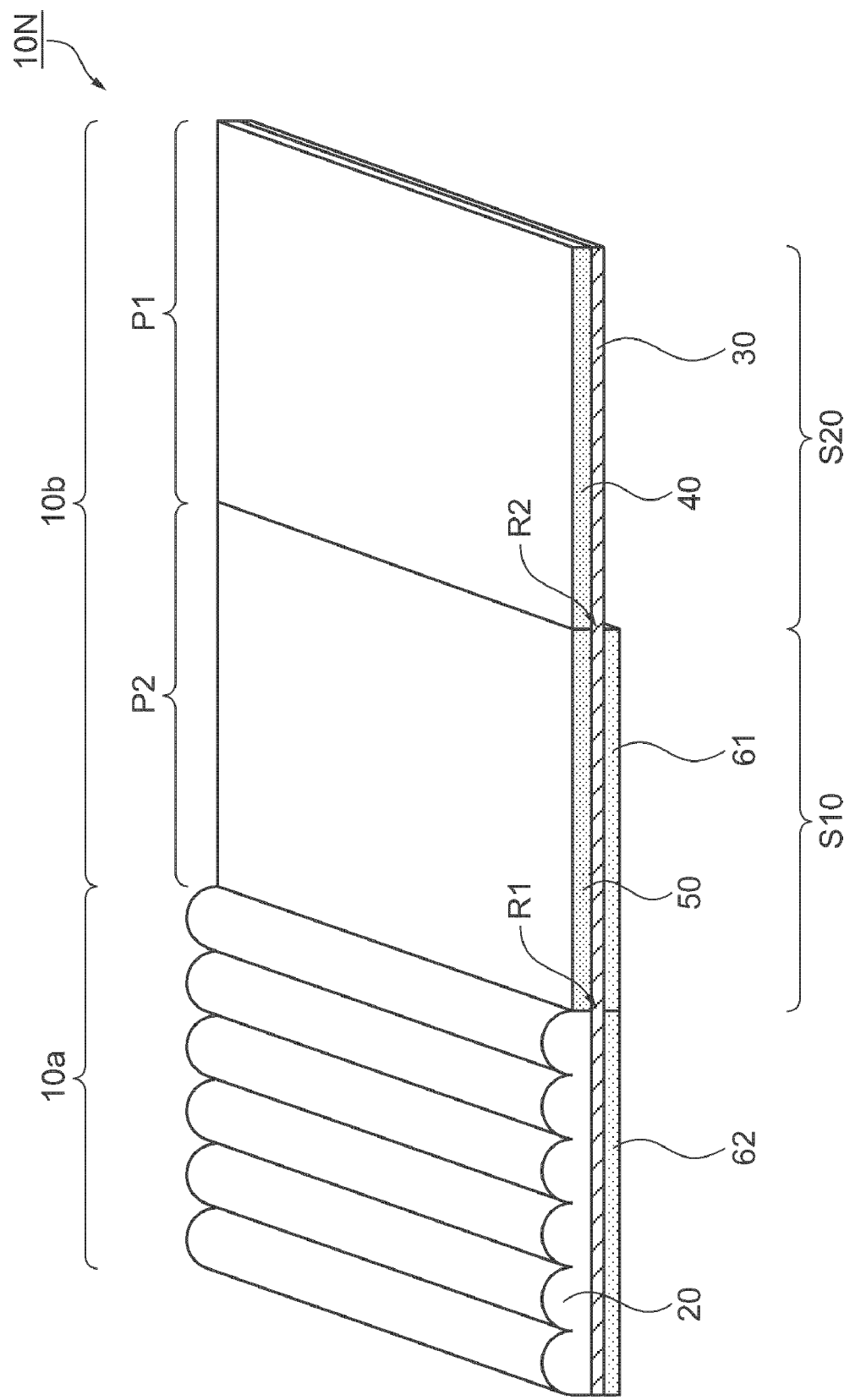
FIG. 13 is a diagram schematically illustrating components of a printing medium according to a fourth embodiment of the invention.

A printing medium 10N according to a fourth embodiment of the invention will be described with reference to FIG. 13. In the printing medium 10N, a first printing surface and a second printing surface are formed on a front surface of a base having a lenticular sheet fixed thereon. FIG. 13 is a diagram schematically illustrating components of the printing medium 10N. The printing medium 10N includes a rectangular lenticular sheet 10a having a plurality of cylindrical convex lenses 20 formed on the surface thereof (an upper surface in FIG. 13), a base 30, an ink absorption layer 40, an ink absorption layer 50, an adhesive layer 61, and an adhesive layer 62.

Unlike the third embodiment, in an extending portion 10b of the base 30, the ink absorption layer 50 is formed on a front surface base 30 in a first unit region S10 adjacent to a unit region corresponding to the rear surface of the lenticular sheet 10a with an adjacent portion R1 interposed therebetween. As described above, the ink absorption layer 50 is formed as a second printing surface P2 on which the addressee's name and address are printed. In addition, unlike the third embodiment, the ink absorption layer 40 is formed on the front surface of the base 30 in a second unit region S20 adjacent to the first unit region S10 with an adjacent portion R2 interposed therebetween. As described above, the ink absorption layer 40 is formed as a first printing surface P1 on which a parallax image is printed. The extending portion 10b overlaps the entire rear surface of the lenticular sheet 10a when the base 30 is folded at the adjacent portions R1 and R2.

Unlike the third embodiment, both the adhesive layer 61 and the adhesive layer 62 are formed on the rear surface of the base 30, and have unit regions. The adhesive layers are adjacent to each other with the adjacent portion R1 interposed therebetween in the base 30. Therefore, the adhesive layer 61 and the second printing surface P2 are formed in the first unit region S10, and the first printing surface P1 is formed in the second unit region S20.

Next, a process of sequentially bending the extending portion 10b to bond the bent portion to the rear surface of the lenticular sheet 10a will be described with reference to FIGS. 14A to 14C.

Figure 14A:
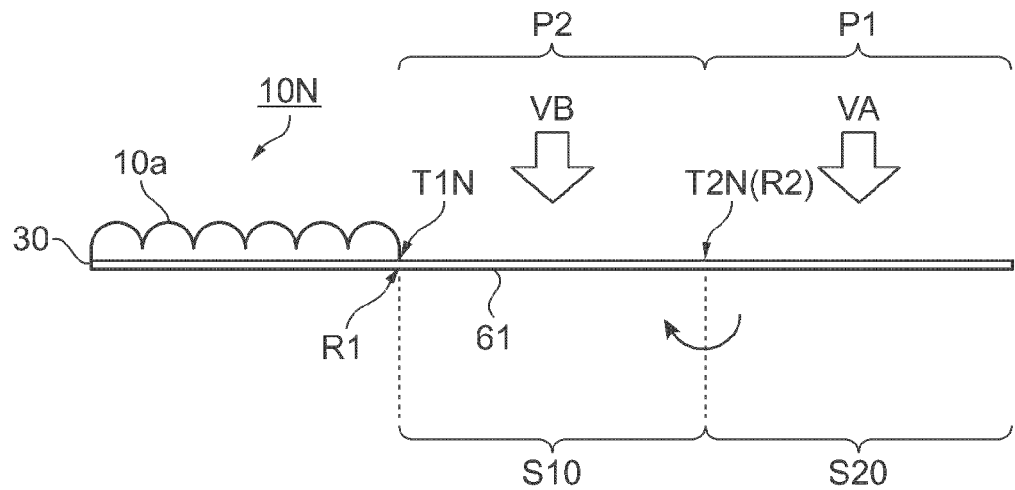
FIG. 14A is a diagram schematically illustrating the printing medium according to the fourth embodiment, as viewed in the thickness direction.
Figure 14B:
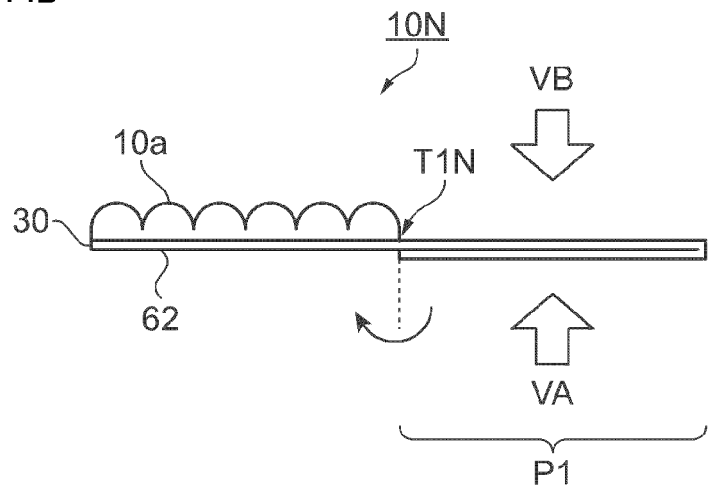
FIG. 14B is a diagram schematically illustrating a folded extending portion.
Figure 14C:
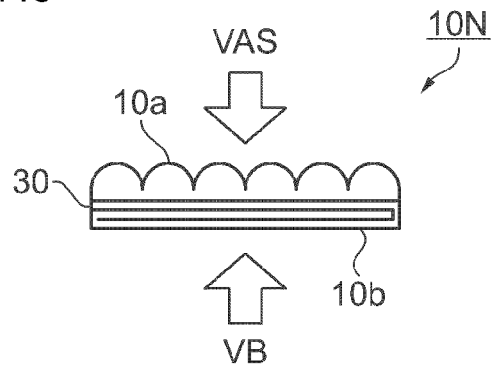
FIG. 14C is a diagram schematically illustrating the printing medium after the extending portion is folded.

FIGS. 14A to 14C are diagrams schematically illustrating the printing medium 10N as viewed in the thickness direction. The components of the printing medium 10N, such as the base 30 and the ink absorption layer 40, are formed in sheets (thin films) each having a thickness of several tens of microns to several hundreds of microns, as described above. Therefore, similar to the third embodiment shown in FIGS. 11A to 11C, for simplicity of explanation, in FIGS. 14A to 14C, components other than the base 30 are omitted, and only the base 30 is shown as a sheet.

As shown in FIG. 14A, it is assumed that, in the printing medium 10N, a 'parallax image' VA is printed on the first printing surface P1 and the 'addressee's name and address' VB is printed on the second printing surface P2 on the front surface (the upper surface in FIGS. 14A to 14C) of the base 30. In this case, as represented by large arrows in FIG. 14A, both the parallax image VA and the addressee's name and address VB can be viewed from the front surface of the first printing surface P1, that is, the front surface of the base 30. A 'folding line T1N' corresponding to the adjacent portion R1 and a 'folding line T2N' corresponding to the adjacent portion R2 are formed on the printing medium 10N. The printing of the 'parallax image VA' and the 'addressee's name and address VB', and the formation of the 'folding line T1N' and the 'folding line T2N' will be described in detail later.

First, as shown in FIG. 14A, the base 30 is folded at the folding line T2N. That is, the first printing surface P1 is bent in the direction of an arrow in FIG. 14A, and the second unit region S20 and the first unit region S10 are bonded to each other by the adhesive layer 61. FIG. 14B shows the base 30 after the bonding. As represented by large arrows in FIG. 14B, the addressee's name and address VB can be viewed in a direction opposite to the direction in which the parallax image VA is viewed, that is, from the rear surface of the base 30.

Next, as shown in FIG. 14B, the base 30 is folded at the folding line T1N. That is, the first printing surface P1 is bent in the direction of an arrow in FIG. 14B, and the first printing surface P1 is bonded to the rear surface of the lenticular sheet 10a by the second adhesive layer 62. FIG. 14C shows the base 30 after the bonding.

As can be seen from FIG. 14C, when the base 30 is folded at the folding lines T2N and T1N, the extending portion 10b is bonded to the lenticular sheet 10a so as to overlap the rear surface of the lenticular sheet 10a. As represented by large arrows in FIG. 14C, in the printing medium 10N, the parallax image VA can be viewed from the front surface of the lenticular sheet 10a through the lenticular sheet 10a and the base 30, and the addressee's name and address VB can be viewed from the rear surface of the lenticular sheet 10a. That is, the printing medium 10N is a postcard having one surface from which a three-dimensional image due to the parallax image VA can be viewed and the other surface from which the addressee's name and address VB can be viewed.

As described with reference to FIGS. 14A to 14C, in the printing medium 10N according to this embodiment, the base 30 is sequentially folded at the folding line T2N and the folding line T1N in the same direction, which makes it possible to easily bond the lenticular sheet 10a to the extending portion 10b. In addition, the first printing surface P1 is sequentially bent at the folding line T2N and the folding line T1N, which makes it possible to accurately bond the extending portion 10b to the lenticular sheet 10a with the parallax image VA aligned with the convex lenses 20 formed on the lenticular sheet 10a. Therefore, a user can easily write a postcard having a three-dimensional image to be visible without bonding a sheet having the addressee's name and address written thereon to the parallax image VA by using an adhesive while performing alignment with the lenticular sheet. In addition, as can be seen from FIG. 13 and FIGS. 14A to 14C, since adhesive layers are not formed on the first and second printing surfaces P1 and P2, it is possible to prevent the parallax image VA and the addressee's name and address VB from being damaged due to contamination. Further, since printing is directly performed on the printing surfaces, it is possible to print the parallax image VA and the addressee's name and address VB using a printing apparatus such as a printer.

Next, the printing of the 'parallax image' VA and the 'addressee's name and address' VB will be described with reference to FIGS. 15A and 15B.

Figure 15A:
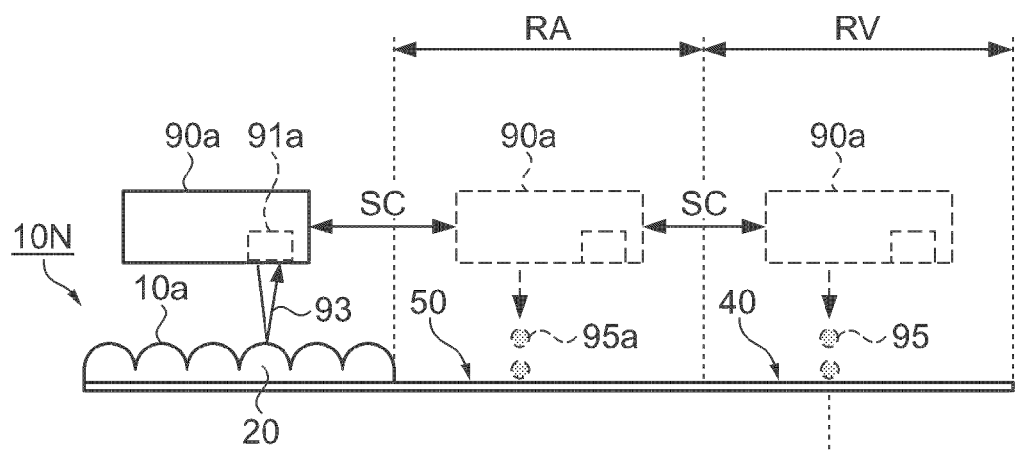
FIG. 15A is a diagram schematically illustrating the printing of images on the printing medium according to the fourth embodiment.
Figure 15B:
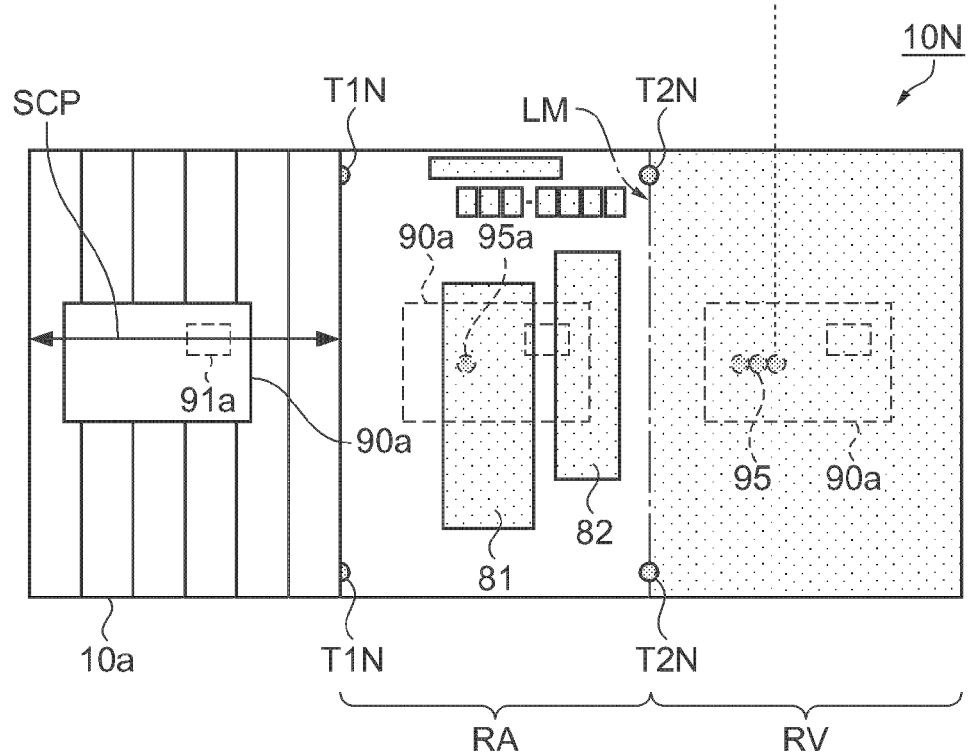
FIG. 15B is a diagram schematically illustrating the printing medium shown in FIG. 15A, as viewed from the upper side.

FIG. 15A is a diagram schematically illustrating the printing medium 10N as viewed in the thickness direction, and FIG. 15B is a diagram schematically illustrating the printing medium 10N as viewed from the upper side. In this embodiment, it is assumed that a printer includes a carriage having a printing head, and the printing head discharges ink droplets while the carriage is being moved, thereby printing a parallax image, the addressee's name and address, and folding lines on a printing medium. Any kind of printers, such as thermal printers, other than ink jet printers can be used to perform printing as long as the carriage can scan a printing medium.

As shown in FIG. 15A, a carriage 90a having a printing head (not shown) of a printer is arranged above the printing medium 10N, and the carriage 90a scans the printing medium 10N in the horizontal direction SC to perform printing, as represented by an arrow in FIG. 15A. The printing medium 10N is transported backward in the vertical direction of the plane of the drawing by a transport member of the printer, such as a roller, so that printing is performed on the entire region of the printing medium 10N.

As shown in FIG. 15A, the carriage 90a is provided with a detecting unit 91a that detects pitches among the convex lenses 20 by using reflected light 93, and the detecting unit 91a detects the pitches among the convex lenses 20 according to the scanning operation of the carriage (which is represented by an arrow in FIG. 15A). Alternatively, similar to the third embodiment, the detecting unit 91a may detect the pitches among the convex lenses 20 by using transmission light that is emitted from a light-emitting surface arranged below the lenticular sheet, not the reflected light. The detection range is the overall range of the lenticular sheet 10a. As represented by an arrow on the left side of FIG. 15B, in the detection range, the detecting unit performs pitch detection scanning SCP according to the scanning operation of the carriage 90a. Then, a predetermined process is performed on the results of the detection, and the processed results are stored in, for example, a storage unit provided in the printer. In this way, information on the pitches among the convex lenses 20 of the lenticular sheet 10a is stored.

As shown in the center of FIG. 15A, when the scanning position of the carriage 90a is moved from a parallax image printing range RV to an addressee's name and address printing range RA, the printing head (not shown) of the carriage 90a discharges ink 95a to print information of an addressee, such as an address and name, on a postcard, which is the printing medium, similar to the third embodiment (see FIGS. 12A and 12B). For example, as represented by a netted portion in the center of FIG. 15B, predetermined characters are printed in a name section 81 and an address section 82.

Subsequently, as shown on the right side of FIG. 15A, when the carriage 90a scans the parallax image printing range RV, as described above, the information on the pitches among the convex lenses 20 stored before the printing of the parallax image is read, and ink 95 is discharged from the printing head (not shown) of the carriage 90a at positions corresponding to the convex lenses 20 on the basis of the read pitch information such that the ink 95 is dropped on the surface of the ink absorption layer 40, thereby printing a predetermined parallax image. The parallax image is formed on the overall parallax image printing range shown in a netted portion on the right side of FIG. 15B. In this way, parallax images for right and left eyes are formed on the basis of the information on the pitches among the convex lenses 20, so that the parallax image is formed at appropriate positions on the convex lenses 20 of the lenticular sheet 10a. Then, as described above, the first printing surface P1 is bonded to an appropriate position of the rear surface of the lenticular sheet 10a such that a three-dimensional image can be viewed.

As can be seen from FIGS. 14A to 14C, the parallax image formed on the basis of the information on the pitches among the convex lenses 20 is bent two times alternating between inward and outward to be bonded to the rear surface of the lenticular sheet 10a by the adhesive layer 61 and the adhesive layer 62. Therefore, in FIG. 15B, the position of each convex lens is not reverse to the position of the parallax image corresponding to the convex lens. Thus, it is possible to read and use the information on the pitches among the convex lenses without performing an additional process, such as a reverse process, on the pitch information.

In this embodiment, the printing head of the carriage 90a can discharge the ink 95 and the ink 95a suitable for the parallax image and the addressee's name and address, respectively, similar to the third embodiment.

The ink 95 is used in the parallax image printing region, and the ink 95a is used in the addressee's name and address printing range. In this way, it is possible to simultaneously print both the parallax image and the addressee's name and address by moving the carriage 90a.

Similar to the third embodiment, since the size of characters printed in the address and name sections is larger than that of the parallax image, the carriage 90a may scan the printing medium at a larger pitch in the addressee's name and address printing range RA than in the parallax image printing range RV. In this way, it is possible to shorten the time required to print the addressee's name and address. In addition, color ink may be used as the ink 95a, and ink droplets may have the same diameter. Further, the carriage 90a may scan the printing medium at the same pitch.

Next, the formation of the 'folding line T1N' and the 'folding line T2N' will be described below. In this embodiment, as shown in FIG. 15B, when the carriage 90a scans the printing medium to print the folding line T2N at the left end of the parallax image printing range, that is, at a position corresponding to the adjacent portion R2 shown in FIG. 13. In addition, the carriage 90a prints the folding line T1N at the left end of the addressee's name and address printing range, that is, at a position corresponding to the adjacent portion R1 shown in FIG. 13. Therefore, the printing head of the carriage 90a discharges ink onto the surface of the ink absorption layer 40 and the surface of the ink absorption layer 50 at the corresponding positions to print the folding lines T1N and T2N.

The ink discharged onto the ink absorption layer 40 to print the folding line T2N is fixed to the ink absorption layer 40, similar to the ink printing the parallax image. Therefore, a user can discriminate the position of the folding line T2N printed at the end of the parallax image from the parallax image. Thus, ink having high a high chroma, such as black ink, may be used to print the folding line T2N.

In FIG. 15B, for example, each of the printed folding lines T1N and T2N is composed of two dots, that is, upper and lower dots, but the invention is not limited thereto. The printed folding lines T1N and T2N may be dotted lines or solid lines having sufficient sizes for the user to recognize. In addition, each of the folding lines may be printed in a portion of or over the entire adjacent portion. As can be seen from FIGS. 14A to 14C, the folding line T1N or the folding line T2N may be a mountain fold LM (one-dot chain line). In this way, it is possible to improve the visibility of a bending direction as well as the positions of the folding lines. In FIG. 15B, a mountain fold is printed as the folding line T2N.

As described above, according to the printing medium 10N of the fourth embodiment, it is possible to print the 'parallax image' VA and the 'addressee's name and address' VB on the first printing surface P1 and the second printing surface P2 provided on the surface of the base 30 on which the lenticular sheet 10a is fixed, respectively. Therefore, it is possible to simultaneously print the parallax image and the addressee's name and address on one surface of a printing medium, without performing double-sided printing on the printing medium.

Further, it is possible to accurately read information on the pitches among the convex lenses 20 when a parallax image is printed, by using light reflected from the lenses, and to print the parallax image on the first printing surface P1 on the basis of the read pitch information, which makes it possible to print the parallax image at positions aligned with the convex lenses 20.

In the base 30, the adhesive layer 61 is formed on the opposite surface of the printing surface to bond the second unit region S20 to the first unit region S10, and the adhesive layer 62 is formed on the surface of the base 30 opposite the lenticular sheet 10a to bond the first unit region S10 to the rear surface of the lenticular sheet 10a, which makes it possible to sequentially fold the base 30 at the folding lines T2N and T1N to bond the entire extending portion 10b to the rear surface of the lenticular sheet 10a, without forming adhesive layers on the printing surfaces on which the parallax image and the addressee's name and address. Therefore, a user can send, for example, a postcard to another person without bonding the extending portion 10b to the rear surface of the lenticular sheet 10a using an additional adhesive and damaging the parallax image and the addressee's name and address. In addition, since the extending portion 10b is folded at the folding lines, it is possible to bond the extending portion to the rear surface of the lenticular sheet 10a while preventing the positional deviation between the convex lenses 20 and the parallax image.

As can be apparently seen from the third and fourth embodiments, the first printing surface P1 and the second printing surface P2 are formed on the same surface of the base, which makes it possible to simultaneously print the 'parallax image' VA and the 'addressee's name and address' VB on one surface. In addition, the first printing surface P1 and the second printing surface P2 are formed on the front surface of the base (that is, on the surface of the base where the lenticular sheet is fixed) or the rear surface of the base, which makes it possible form a printing medium suitable for a printing method that a user wants to use.

For example, when a user uses a printer that detects pitches between convex lenses by using reflected light, the first printing surface P1 and the second printing surface P2 may be formed on the front surface of the base in a printing medium, as in the fourth embodiment. Meanwhile, when the user uses a printer that detects pitches between convex lenses by using light passing through the convex lenses, the first printing surface P1 and the second printing surface P2 may be formed on the rear surface of the base in a printing medium, as in the third embodiment.

Although the fourth embodiment of the invention has been described above, the invention is not limited thereto. It will be understood by those skilled in the art that various modifications and changes of the invention can be made without departing from the scope and spirit of the invention.

Fifth Embodiment

Figure 18:
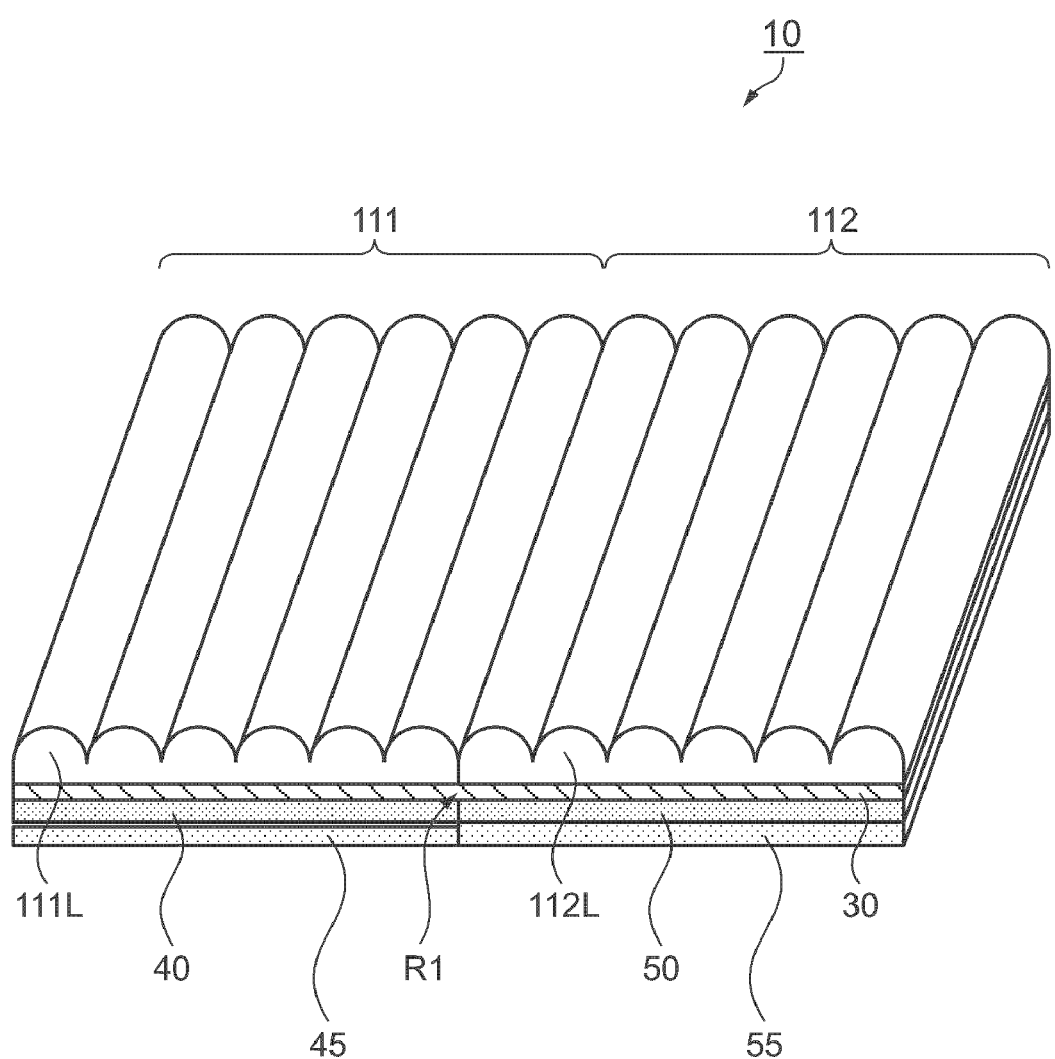
FIG. 18 is a diagram schematically illustrating components of a printing medium according to a fifth embodiment of the invention.

A printing medium 10 according to a fifth embodiment of the invention will be described with reference to FIG. 18. FIG. 18 is a diagram schematically illustrating components of the printing medium 10. The printing medium 10 includes a first lenticular sheet 111, a second lenticular sheet 112, a base 30, an ink absorption layer 40, an ink transmission layer 45, an ink absorption layer 50, and an ink transmission layer 55.

When a region corresponding to a rear surface of the first lenticular sheet 111 is a unit region, the ink absorption layer 40 is formed on the rear surface of the base 30 (a lower surface in FIG. 18) as a first printing surface P1 having the unit region. Therefore, the first printing surface P1 overlaps the first lenticular sheet 111 in plan view. In addition, when a region corresponding to a rear surface of the second lenticular sheet 112 is a unit region, the ink absorption layer 50 is formed on the rear surface of the base 30 (the lower surface in FIG. 18) as a second printing surface P2 having the unit region. Therefore, the second printing surface P2 overlaps the second lenticular sheet 112 in plan view.

A plurality of cylindrical convex lenses 111L are formed on a front surface (an upper surface in FIG. 18) of the first lenticular sheet 111, and similarly, a plurality of cylindrical convex lenses 112L are formed on the front surface of the second lenticular sheet 112. In this embodiment, the axial direction of each of the cylindrical convex lenses is parallel to a long side of each of the first and second rectangular lenticular sheets 111 and 112. In addition, for simplicity of explanation, it is assumed that each of the first and second lenticular sheets is composed of six cylindrical convex lenses. In many cases, the first lenticular sheet 111 or the second lenticular sheet 112 having convex lenses 111L or 112L arranged at pitches of 10 to 180 LPI (lenses per inch) is generally used, and actually, the number of convex lenses corresponding to the pitches is provided in the lenticular sheet. Therefore, the axial direction or the number of convex lenses in the first lenticular sheet may be different from the axial direction or the number of convex lenses in the second lenticular sheet.

Further, the components of the printing medium 10 shown in FIG. 18 are shown to have recognizable thicknesses. However, actually, the lenticular sheet is formed in a sheet (thin film) having a thickness of several hundreds of microns to several millimeters, and the other components are formed in sheets (thin films) each having a thickness of several tens of microns to several hundreds of microns.

Next, the components of the printing medium 10 will be described in detail. Then, a process of printing a parallax image on the printing medium 10 and a process of forming three-dimensional images on both surfaces of the printing medium to be viewed from both surfaces will be described.

The first lenticular sheet 111 is formed of a transparent resin material capable of being used as a lens, such as PET (polyethylene terephthalate), PETG (glycol-modified polyethylene terephthalate), APET, PP, PS, PVC, acryl, UV, or PC (polycarbonate) resin, or PMMA (methacrylic) resin, and the entire rear surface (the entire lower surface) of the first lenticular sheet 111 is fixed to the base 30. A known method, such as welding or adhesion, is used to fix the first lenticular sheet 111 to the base 30 according to a material forming the base 30. However, any method can be used to fix the lenticular sheet 111 to the base 30 as long as transparency of the first lenticular sheet 111 and the base 30 can be ensured.

The second lenticular sheet 112 is formed of the same material as that forming the first lenticular sheet 111, and the entire rear surface (the lower surface in FIG. 18) of the second lenticular sheet 112 is fixed to the base 30 by the same fixing method as that used to fix the first lenticular sheet 111 to the base 30. The second lenticular sheet 112 and the first lenticular sheet 111 are formed in rectangular shapes having the same size.

The base 30 is formed of a transparent material, such as a PETG resin, in a thin film form. Of course, the base 30 may be formed of a general PET resin. In addition, the base 30 may be formed of any transparent material as long as a viewer can view parallax images formed on first and second printing surfaces P1 and P2, which will be described later, through the first and second lenticular sheets 111 and 112, respectively, and the base 30 can be folded at a folding line, which will be described later.

As shown in FIG. 18, when a region corresponding to the rear surface of the first lenticular sheet 111 (or the second lenticular sheet 112) is referred to as a unit region, the base 30 has two unit regions adjacent to each other with an adjacent portion R1 interposed therebetween. Therefore, when the base 30 is folded at the adjacent portion R1, the two unit regions overlap each other, so that the rear surface of the first lenticular sheet 111 overlaps the rear surface of the second lenticular sheet 112.

The ink absorption layer 40 formed on the rear surface (the lower surface in FIG. 18) of the base 30, which is opposite the surface of the base 30 having the first lenticular sheet 111 fixed thereto, is a component for forming a first parallax image corresponding to each convex lens 111L. When the first parallax image is formed by ink jet printing, the ink absorption layer 40 absorbs the jetted ink and fixes the ink at a jetted position. The ink absorption layer 40 makes it possible to stably form the first parallax image at a position corresponding to each convex lens 111L, and to appropriately form a three-dimensional image. The ink absorption layer 40 is formed of, for example, a lyophilic polymer resin, such as PVA (polyvinyl alcohol), a cation compound, or fine particles, such as silica.

When the ink is jetted on the ink transmission layer 45 formed on the rear surface of the ink absorption layer 40, the ink transmission layer 45 transmits the ink. That is, the ink transmission layer 45 appropriately transmits the ink to the ink absorption layer 40 such that no ink remains on the ink transmission layer 45. Therefore, the ink transmission layer 45 serves as a base for the first parallax image. The ink transmission layer 45 is formed of, for example, a titanium oxide, silica gel, PMMA (methacrylic resin), binder resin, barium sulfate, glass fiber, or plastic fiber, and has a color (white) suitable for a base.

The ink absorption layer 50 formed on the rear surface (the lower surface in FIG. 18) of the base 30, which is opposite the surface of the base 30 having the second lenticular sheet 112 fixed thereto, is a component for forming a second parallax image corresponding to each convex lens 112L. When the second parallax image is formed by ink jet printing, the ink absorption layer 50 absorbs the jetted ink and fixes the ink at a jetted position. The ink absorption layer 50 makes it possible to stably form the second parallax image at a position corresponding to each convex lens 112L, and to appropriately form a three-dimensional image. The ink absorption layer 50 is formed of, for example, a lyophilic polymer resin, such as PVA (polyvinyl alcohol), a cation compound, or fine particles, such as silica.

When the ink is jetted on the ink transmission layer 55 formed on the rear surface of the ink absorption layer 50, the ink transmission layer 55 transmits the ink. That is, the ink transmission layer 55 appropriately transmits the ink to the ink absorption layer 50 such that no ink remains on the ink transmission layer 55. Therefore, the ink transmission layer 55 serves as a base for the second parallax image. The ink transmission layer 55 is formed of, for example, a titanium oxide, silica gel, PMMA (methacrylic resin), binder resin, barium sulfate, glass fiber, or plastic fiber, and has a color (white) suitable for a base.

Figure 19A:
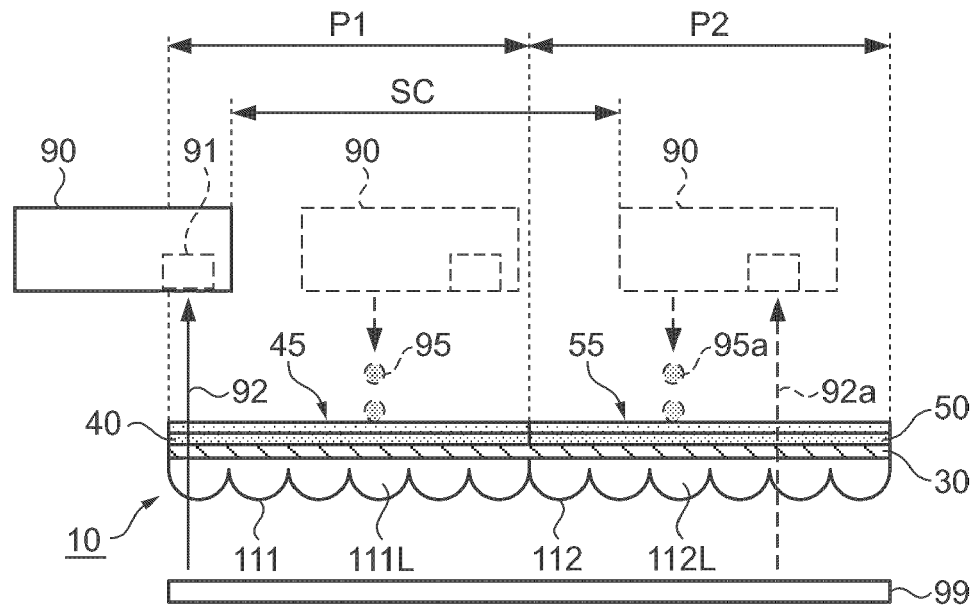
FIG. 19A is a diagram schematically illustrating the printing of images on the printing medium according to the fifth embodiment.
Figure 19B:
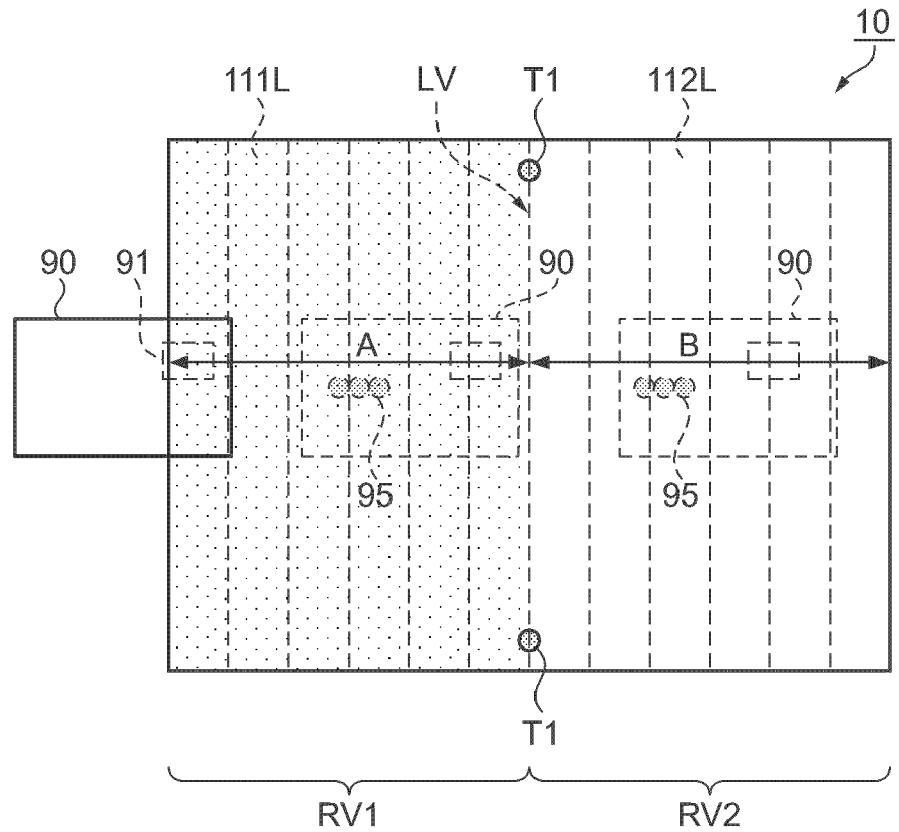
FIG. 19B is a diagram schematically illustrating the printing medium shown in FIG. 19A, as viewed from the upper side.

Next, the printing of images on the first and second printing surfaces P1 and P2 will be described with reference to FIGS. 19A and 19B. FIG. 19A is a diagram schematically illustrating the printing medium 10 as viewed from the side, and FIG. 19B is a diagram schematically illustrating the printing medium 10 as viewed from the upper side. In this embodiment, it is assumed that a printer includes a carriage having a printing head, and the printing head discharges ink droplets while the carriage is being moved, thereby printing the first parallax image, the second parallax image, a folding line, which will be described later, on a printing medium. Any kind of printers, such as thermal printers, other than ink jet printers can be used to perform printing as long as the carriage can scan a printing medium.

As shown in FIG. 19A, a carriage 90 having a printing head (not shown) of a printer is arranged above the printing medium 10, and the carriage 90 scans the printing medium 10 in a horizontal direction SC to perform printing, as represented by an arrow in FIG. 19A. The printing medium 10 is transported backward in the vertical direction of the plane of the drawing by a transport member (not shown) of the printer, such as a roller, so that printing is performed on the entire region of the printing medium 10.

A light-emitting surface 99 is arranged below the lower surfaces of the first and second lenticular sheets 111 and 112 of the printing medium 10. A detecting unit 91 is provided in the carriage 90 to detect transmission light 92 that is emitted from the light-emitting surface 99 and then sequentially passes through the convex lens 111L (the convex lens 112L), the base 30, the ink absorption layer 40 (the ink absorption layer 50), and the ink transmission layer 45 (the ink transmission layer 55). Since the amount of transmission light 92 depends a variation in the thickness of the convex lens, the detecting unit 91 detects a variation in the amount of transmission light caused by the scanning of the carriage (which is represented by an arrow in FIGS. 19A and 19B) and thus detects pitches among the convex lenses 111L in the first lenticular sheet 111 and pitches among the convex lenses 112L in the second lenticular sheet 112.

The detection range is the overall range of the first and second lenticular sheets 111 and 112. In a range A represented by an arrow on the left side of FIG. 19B, the detecting unit detects pitches among the convex lenses 111L according to the scanning operation of the carriage 90. In a range B represented by an arrow on the right side of FIG. 19B, the detecting unit detects pitches among the convex lenses 112L according to the scanning operation of the carriage 90. Then, a predetermined process is performed on the results of the detection, and the processed results are stored in, for example, a storage unit provided in the printer. In this way, information on the pitches among the convex lenses in each of the lenticular sheets is stored before the printing of each parallax image.

Then, as represented by a dotted line in the center of FIG. 19A, when the carriage 90 scans the first printing surface, the information on the pitches among the convex lenses 111L stored in the storage unit is read, and ink 95 is discharged from the printing head (not shown) of the carriage 90 at positions corresponding to the convex lenses 111L on the basis of the read pitch information such that the ink is dropped on the surface of the ink transmission layer 45, thereby printing the first parallax image. The printing range of the first parallax image is shown on the left side (netted portion) of FIG. 19B. In this way, the first parallax image is formed at an appropriate position relative to each convex lens 111L.

Next, as represented by a dotted line on the right side of FIG. 19A, when the scanning position of the carriage 90 is moved from the first printing surface P1 to the second printing surface P2 to scan the second printing surface P2, the information on the pitches among the convex lenses 112L stored in the storage unit is read, and ink 95a is discharged from the printing head (not shown) of the carriage 90 at positions corresponding to the convex lenses 112L on the basis of the read pitch information such that the ink 95a is dropped on the surface of the ink transmission layer 55, thereby printing the second parallax image. The printing range of the second parallax image is shown on the right side (portions other than the netted portion) of FIG. 19B. In this way, the second parallax image is formed at an appropriate position relative to each convex lens 112L.

In this embodiment, the printing head of the carriage 90 can discharge both the ink 95 and the ink 95a to print the first and second parallax images, respectively. For example, when the first parallax image is a color image and the second parallax image is a monochromatic image, the printing head can discharge color ink and black ink in the first and second parallax printing ranges, respectively. In this way, the printing head can simultaneously print a color image and a monochromatic image by the scanning operation of the carriage 90. Alternatively, the same ink may be used for the ink 95 and the ink 95a.

Next, the formation of the folding line will be described below. In this embodiment, as shown in FIG. 19B, when the carriage 90 scans the printing medium to print the parallax image, the carriage 90 prints a folding line T1 at the right end of the first parallax image printing range or at the left end of the second parallax image printing range, that is, at a position corresponding to the adjacent portion R1 shown in FIG. 18. Therefore, the printing head of the carriage 90 discharges ink onto the surface of the ink transmission layer 45 or the surface of the ink transmission layer 55 at the corresponding position to print the folding line T1. Alternatively, the folding line may be formed on the base 30. The formation of the folding line on the base 30 will be described in a sixth embodiment, which will be described below.

In this case, since the printed folding line T1 is disposed at the end of the parallax image, ink for printing the folding line T1 may be ink having a high chroma, such as black ink, that can be easily discriminated from the parallax image.

In FIG. 19B, the printed folding line T1 is composed of two dots, that is, upper and lower dots, but the invention is not limited thereto. The printed folding line T1 may be a dotted line or a solid line having a sufficient size for the user to recognize. In addition, the folding line T1 may be printed in a portion of or over the entire adjacent portion R1. Since the base 30 is folded outward at the adjacent portion R1 in FIG. 20A, the folding line T1 may be a valley fold (dotted line), as shown in FIG. 19B. In this way, it is possible to improve the visibility of a bending direction as well as the position of the folding line.

Figure 20A:
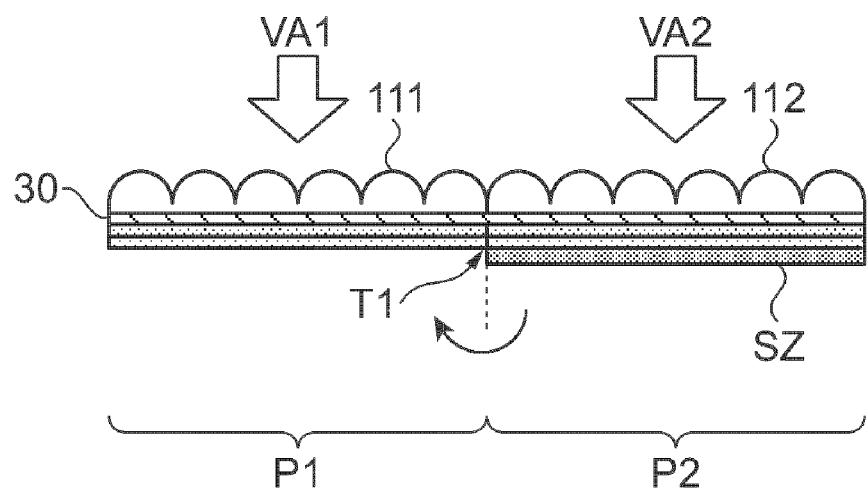
FIG. 20A is a diagram schematically illustrating a process of folding the printing medium according to the fifth embodiment.
Figure 20B:
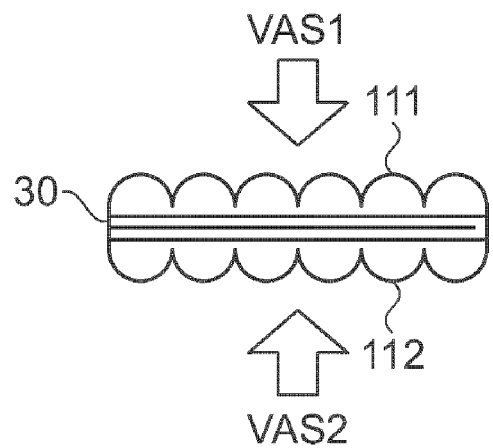
FIG. 20B is a diagram schematically illustrating the folded printing medium.

Next, a process of fold the base 30 such that the first lenticular sheet 111 is bonded to the second lenticular sheet 112 so as to overlap the second lenticular sheet 112 will be described with reference to FIGS. 20A and 20B. FIGS. 20A and 20B are diagrams illustrating the printing medium 10 according to this embodiment, as viewed from the side.

As shown in FIG. 20A, a 'first parallax image' VA1 is printed on the first printing surface P1 and a 'second parallax image' VA2 is printed on the second printing surface P2, on the rear surface (the lower surface in FIG. 20A) of the base 30 in the printing medium 10. In this case, as represented by large arrows in FIG. 20A, the first and second parallax images can be viewed from the first and second lenticular sheets through the base 30. In addition, the 'folding line T1' is formed at a position corresponding to the adjacent portion R1 on the rear surface of the printing medium 10.

Then, the base 30 is folded at the folding line T1, as shown in FIG. 20A. That is, the second printing surface P2 is bent in the direction of an arrow in FIG. 20A to be bonded to the first printing surface P1. In this case, an adhesive layer SZ may be additionally formed to bond the second printing surface P2 to the first printing surface P1. As shown in FIG. 20A, an operator applies an adhesive on at least the second printing surface P2 (or the first printing surface P1) or sticks a double-faced adhesive tape on the second printing surface P2 (or the first printing surface P1) to form the adhesive layer SZ before the first and second printing surfaces P1 and P2 are bonded to each other.

FIG. 20B shows the base 30 after the bonding. As represented by large arrows in FIG. 20B, a three-dimensional image VAS1 caused by the first parallax image VA1 can be viewed from the upper side of FIG. 20B, and a three-dimensional image VAS2 caused by the first parallax image VA1 can be viewed from the lower side of FIG. 20B. In this way, three-dimensional images of the printing medium 10 can be viewed from both surfaces thereof.

As described above, in the printing medium 10 according to the fifth embodiment, the base 30 is folded at the folding line T1, which makes it possible to easily bond the rear surface of the first lenticular sheet 111 to the rear surface of the second lenticular sheet 112. In addition, since the base 30 is folded at the folding line T1, the first lenticular sheet 111 and the second lenticular sheet 112 can be bonded to each other with high alignment accuracy, which makes it possible to prevent the position deviation between the first and second lenticular sheets. Therefore, a user can easily write a printing medium having three-dimensional images that can be viewed from both surfaces, without aligning the two lenticular sheets to bond the two lenticular sheets.

Further, according to the printing medium 10 (see FIG. 18) of the fifth embodiment, the first and second parallax images are printed on the first and second printing surfaces provided on one surface of the base 30 that is opposite the other surface of the base 30 having the first and second lenticular sheets fixed thereto, respectively. Therefore, it is possible to simultaneously print the two parallax images on one surface of a printing medium, without performing double-faced printing on the printing medium, and thus a process of reversing the printing medium is not needed.

Further, information on the pitches among the convex lenses 111L and information on the pitches among the convex lenses 112L are detected before the parallax images are printed, and the parallax images are printed on the basis of the detected pitch information, which makes it possible to print the parallax images at positions aligned with the convex lenses. In addition, printing on one surface or single-sided printing makes it possible to simultaneously perform the detection of pitch information and the printing of parallax images at positions aligned with the convex lenses.

Sixth Embodiment

A printing medium according to a sixth embodiment of the invention will be described with reference to FIGS. 22A and 22B. In the printing medium according to the sixth embodiment, printing surfaces are formed on portions of a base other than the rear surface of a lenticular sheet, parallax images are printed on the printing surfaces, and the printing surfaces are bonded to the rear surface of the lenticular sheet so as to overlap the lenticular sheet, so that a three-dimensional image can be viewed from the printing medium.

Figure 22A:
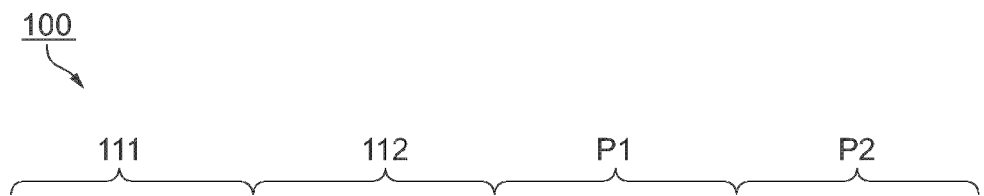
FIG. 22A is a diagram schematically illustrating components of a printing medium according to a sixth embodiment of the invention.

FIG. 22A is a diagram schematically illustrating components of a printing medium 100 according to the sixth embodiment, as viewed from the side. The printing medium 100 includes first and second rectangular lenticular sheets 111 and 112 each having a plurality of cylindrical convex lenses on a surface (an upper surface in FIG. 22A), a base 30, an ink absorption layer 40, an ink absorption layer 50, and an adhesive layer 65.

The components of the printing medium 100 according to the sixth embodiment shown in FIG. 22A will be described below.

Figure 22B:
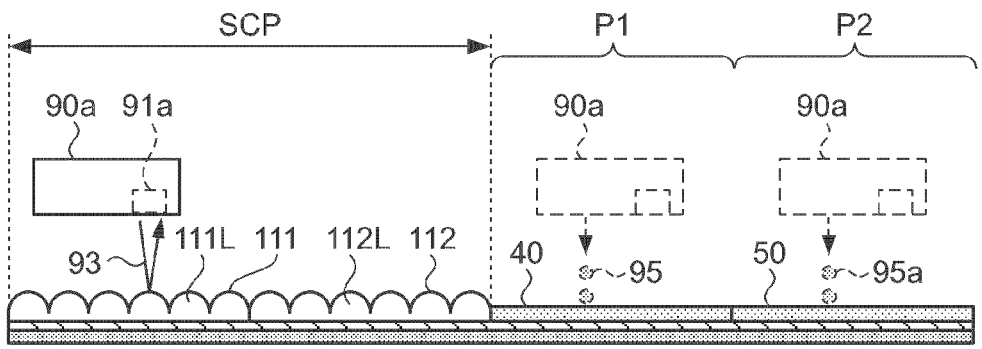
FIG. 22B is a diagram schematically illustrating the printing of images on the printing medium according to the sixth embodiment.

As shown in FIGS. 22A and 22B, the base 30 includes four unit regions adjacent to one another with adjacent portions R1, R2, and R3 interposed therebetween. Therefore, when the base 30 is sequentially folded at the adjacent portions R1, R2, and R3, the printing medium 100 overlaps the entire rear surface of the first lenticular sheet 111.

The first lenticular sheet 111 is fixed to the surface of a first unit region on the leftmost side of FIG. 22A, and the second lenticular sheet 112 is fixed to the surface of a second unit region adjacent to the first unit region with the adjacent portion R1 interposed therebetween. In addition, the ink absorption layer 40 is formed in a third unit region adjacent to the second unit region of the base 30 with the adjacent portion R2 interposed therebetween, and the ink absorption layer 50 is formed in a fourth unit region, which is a rightmost unit region, adjacent to the third unit region of the base 30 with the adjacent portion R3 interposed therebetween. As described above, the ink absorption layer 40 is formed as a first printing surface P1, and the ink absorption layer 50 is formed as a second printing surface P2 on which first and second parallax images are printed. The parallax images are printed on the printing surfaces such that they can be viewed from the surfaces of the printing surfaces, that is, the surface of the base 30 (which are represented by large arrows in FIG. 22A). Therefore, in the sixth embodiment, the ink transmission layer described in the fifth embodiment does not need to be formed.

The adhesive layer 65 is formed on the entire rear surface of the base 30, and functions to bond the unit regions such that the unit regions overlap each other. Therefore, the adhesive layer 65 is formed of a material having sufficient adhesion to bond the ink absorption layer 40 to the base 30 or the ink absorption layer 50 to the base 30. For example, the adhesive layer 65 may be formed of an epoxy-based, an acryl-based or a cyanoacrylate-based adhesive. In addition, any kind of material may be used for the adhesive layer as long as it can bond the ink absorption layer 40 or the ink absorption layer 50 to the base 30.

As described above, since the adhesive layer 65 is interposed between each lenticular sheet and each ink absorption layer having the parallax image formed thereon, the adhesive layer 65 is preferably formed of a material t have sufficient transparency for the parallax image to be viewed from the surface of each lenticular sheet when it bonds each ink absorption layer to the base 30. The adhesive layer 65 may be formed on the entire rear surface of the base 30 as long as it can bond the unit regions. In addition, in FIG. 22A, the adhesive layer may be formed on the rear surface of the base in one of the unit region having the first printing surface P1 formed therein and the unit region having the second printing surface P2 formed therein.

In this embodiment, a peeling sheet is not provided on the surface of the adhesive layer 65. Assuming that the adhesion of the adhesive layer 65 deteriorates due to contamination, a peeling sheet may be provided to protect the adhesive layer 65. Of course, the peeling sheet is peeled off from the adhesive layer 65 before bonding the unit regions. Therefore, the peeling sheet may be formed of a material that can be peeled off from the adhesive layer 65, such as a resin material or paper.

The printing of parallax images will be described with reference to FIG. 22B. FIG. 22B is a diagram schematically illustrating the printing medium 100 as viewed from the side. Similar to the fifth embodiment, in this embodiment, it is assumed that a printer includes a carriage having a printing head, and the printing head discharges ink droplets while the carriage is being moved, thereby printing parallax images on the printing surfaces. Any kind of printers, such as thermal printers, other than ink jet printers can be used to perform printing as long as the carriage can scan a printing medium.

As shown in FIG. 22B, a carriage 90a having a printing head (not shown) of a printer is arranged above the printing medium 100, and the carriage 90a scans the printing medium 100 in the horizontal direction of FIG. 22B to detect pitches among the convex lenses formed on the surface of each lenticular sheet and to perform images on the printing surfaces formed on the printing medium. The printing medium 100 is transported backward in the vertical direction of the plane of the drawing by a transport member of the printer, such as a roller, so that printing is performed on the entire region of the printing medium 100.

In the sixth embodiment, as shown in FIG. 22B, the carriage 90a is provided with a detecting unit 91a for detecting pitches among the convex lenses using reflected light 93, and the detecting unit 91a detects the pitches among the convex lenses 111L and the pitches among the convex lenses 112L according to the scanning operation of the carriage. In the pitch detecting range where the first lenticular sheet 111 and the second lenticular sheet 112 exist, as represented by an arrow on the left side of FIG. 22B, the detecting unit performs pitch detection scanning SCP according to the scanning operation of the carriage 90a. Then, a predetermined process is performed on the results of the detection, and the processed results are stored in, for example, a storage unit provided in the printer. In this way, information on the pitches among the convex lenses 111L of the first lenticular sheet 111 and information on the pitches among the convex lenses 112L of the second lenticular sheet 112 are stored.

Then, as represented by a dotted line on the right side of FIG. 22B, when the scanning position of the carriage 90a is moved from the pitch detection scanning range to the first printing surface P1, the information on the pitches among the convex lenses 111L stored in the storage unit before the printing of the parallax image is read, and ink 95 is discharged from the printing head (not shown) of the carriage 90a to print the first parallax image, on the basis of the read pitch information. Then, when the carriage 90a is moved above the second printing surface P2, the stored information on the pitches among the convex lenses 112L is read, and the printing head (not shown) of the carriage 90a discharges ink 95a on the basis of the read pitch information to print the second parallax image.

In this embodiment, the printing head of the carriage 90a can discharge both the ink 95 and the ink 95a to print the first and second parallax images, respectively, similar to the fifth embodiment. The ink 95 is used to print the first parallax image, and the ink 95a is used to print the second parallax image. In this way, the printing head can simultaneously print two parallax images by the scanning operation of the carriage 90a.

The first and second parallax images for right and left eyes that correspond to the convex lenses are formed at appropriate positions corresponding to the first lenticular sheet 111 and the second lenticular sheet 112, on the basis of the information on the pitches among the convex lenses. Then, the base 30 is sequentially folded at the adjacent portions to bond the second parallax image at an appropriate position on the rear surface of the second lenticular sheet 112 and the first parallax image at an appropriate position on the rear surface of the first lenticular sheet 111, thereby forming a printing medium having three-dimensional images on both surfaces.

Next, a process of bending the printing medium 100 to form the printing medium having three-dimensional image on both surfaces will be described with reference to FIGS. 23A to 23D.

FIGS. 23A to 23D are diagrams schematically illustrating the printing medium 100 according to this embodiment, as viewed from the side. The components, such as the base 30 and the ink absorption layer 40, of the printing medium 100 are shown to have recognizable thicknesses, but actually, the components are formed in sheets (thin films) each having a thickness of several tens of microns to several hundreds of microns. In FIGS. 23A to 23D, for simplicity of explanation, only the base 30 is shown as a sheet.

As shown in FIG. 23A, it is assumed that, in the printing medium 100, a first parallax image VA1 is printed on the first printing surface P1 and a second parallax image VA2 is printed on the second printing surface P2 on the front surface (the upper surface in FIG. 23A) of the base 30. In this case, as described above, the first and second parallax images VA1 and VA2 can be viewed from the front surfaces of the first and second printing surfaces, that is, from the front surface of the base 30 (which is represented by large arrows in FIG. 23A. In addition, folding lines T10, T20, and T30 are formed on the base at positions corresponding to the adjacent portions R1, R2, and R3, respectively.

In the fifth embodiment, as shown in FIGS. 19A and 19B, the folding line is printed on the printing surface at a position corresponding to the adjacent portion. However, in the sixth embodiment, slits or perforations (not shown) are provided at predetermined intervals on the base 30 to form the folding lines T10 to T30. Then, the base 30 is easily folded at the slits or perforations, which makes it possible for a user to bend the base 30 at the adjacent portions without paying attention to the position of the folding line. Alternatively, the folding line may be formed by printing.

A line formed by folding the base 30 beforehand may be used as the folding line. Alternatively, a notch may be used as the folding line. The folding line may be formed by any kind of methods as long as it can enable the base 30 to be easily folded and the parallax images to be bonded to the rear surfaces of the lenticular sheets.

Returning to FIG. 23A, the base 30 is folded at the folding line T30. That is, when the second printing surface P2 is bent in the direction of an arrow in FIG. 23A, the unit region of the second printing surface is bonded to the unit region on the rear surface of the first printing surface P1 by the adhesive layer 65. FIG. 23B shows the base after the bonding. As represented by large arrows in FIG. 23B, the second parallax image VA2 can be viewed in a direction opposite to the direction in which the first parallax image VA1 is viewed, that is, from the rear surface of the base 30.

Next, as shown in FIG. 23B, the base 30 is folded at the folding line T20. That is, the second printing surface P2 is bent in the direction of an arrow in FIG. 23B such that the second printing surface P2 is bonded to the rear surface of the second lenticular sheet 112 by the adhesive layer 65. FIG. 23C shows the base 30 after the bonding. As represented by large arrows in FIG. 23C, the second parallax image VA2 can be viewed through the second lenticular sheet 112. As a result, the second parallax image VA2 can be viewed as a three-dimensional image VAS2 by the second lenticular sheet 112.

Then, as shown in FIG. 23C, the base 30 is folded at the folding line T10. That is, the first printing surface P1 is bent in the direction of an arrow in FIG. 23C such that the first printing surface P1 and the rear surface of the first lenticular sheet 111 are bonded to each other by the adhesive layer 65. FIG. 23D shows the base 30 after the bonding. As represented by large arrows in FIG. 23D, the first parallax image VA1 can be viewed through the first lenticular sheet 111. As a result, the first parallax image VA1 can be viewed as a three-dimensional image VAS1 by the first lenticular sheet 111.

As can be seen from FIGS. 23A to 23D, when the base 30 is sequentially folded at the folding lines T30 to T10, the parallax images are bonded to the rear surfaces of the corresponding lenticular sheets. As represented by large arrows in FIG. 23, in the printing medium 100, the first parallax image VA1 can be viewed from the front surface (the upper surface in FIG. 23D) of the first lenticular sheet 111 through the first lenticular sheet 111 and the base 30, and the second parallax image VA2 can be viewed from the front surface (the lower surface in FIG. 23D) of the second lenticular sheet 112 through the second lenticular sheet 112 and the base 30. That is, three-dimensional images caused by the parallax images can be viewed from both surfaces of the printing medium 100.

As described with reference to FIGS. 23A to 23D, in the printing medium 100 according to this embodiment, the base 30 is sequentially folded at the folding lines T30 to T10 in the same direction, which makes it possible to easily bond the printing surfaces each having the parallax image formed thereon to the rear surfaces of the corresponding lenticular sheets. In addition, the base 30 is folded at the folding lines, which makes it possible to accurately bond the parallax image to correspond to the position of each convex lens formed on the corresponding lenticular sheet. Therefore, a user can easily write a printing medium having three-dimensional images on both surfaces thereof without bonding the parallax images to the lenticular sheets by using an adhesive while performing alignment with the lenticular sheets. As can be seen from FIGS. 22A and 22B and FIGS. 23A to 23D, since adhesive layers are not formed on the first and second printing surfaces P1 and P2, it is possible to prevent the printed parallax images from being damaged due to contamination.

Further, according to the printing medium 100 of the sixth embodiment, the first and second parallax images VA1 and VA2 are printed on the first and second printing surfaces P1 and P2 provided on one surface of the base 30 on which the first and second lenticular sheets are fixed, respectively. Therefore, it is possible to simultaneously print the two parallax images on one surface of a printing medium, without performing double-faced printing on the printing medium, and thus a process of reversing the printing medium is not needed.

Furthermore, information on the pitches among the convex lenses 111L and information on the pitches among the convex lenses 112L are detected before the parallax images are printed, and the parallax images are printed on the basis of the detected pitch information. Therefore, printing on one surface or single-sided printing makes it possible to simultaneously perform the detection of pitch information and the printing of parallax images at positions aligned with the convex lenses.

As can be seen from FIGS. 23A to 23D, the parallax images formed on the basis of the information on the pitches among the convex lenses 111L and the information on the pitches among the convex lenses 112L are bent two times alternating between inward and outward to be bonded to the rear surfaces of the corresponding lenticular sheets. Therefore, in FIG. 23B, the position of each convex lens is not reverse to the position of the parallax image corresponding to the convex lens. Thus, it is possible to read and use the information on the pitches among the convex lenses without performing an additional process, such as a reverse process, on the pitch information.

As described above, according to the printing medium 100 of the sixth embodiment, it is possible to print the first parallax image VA1 and the second parallax image VA2 on the first printing surface P1 and the second printing surface P2 that are provided on one surface of the base 30 to which the lenticular sheets are fixed, respectively. Therefore, it is possible to simultaneously print two parallax images on one surface of a printing medium, without performing double-sided printing on the printing medium. In addition, it is possible to simultaneously perform the detection of pitches among the convex lenses and the printing of parallax images by the scanning operation of the carriage on one surface of a printing medium.

Further, it is possible to accurately read information on pitches among the convex lenses during the scanning operation of the carriage, and to print parallax images on the basis of the read pitch information. As a result, it is possible to accurately print parallax images on the convex lenses.

When the adhesive layer 65 is formed on a surface of the base 30 opposite the printing surfaces and the base 30 is sequentially folded at the folding lines T30 to T10, the first and second printing surfaces can be bonded to the rear surfaces of the first lenticular sheet 111 and the second lenticular sheet 112, respectively (see FIG. 23D). Therefore, a user can write a printing medium having three-dimensional images on both surfaces thereof without bonding the printing surfaces having parallax images formed thereon to the rear surfaces of the corresponding lenticular sheets using an additional adhesive and damaging the parallax images.

Although the sixth embodiment of the invention has been described above, the invention is not limited thereto. It will be understood by those skilled in the art that various modifications and changes of the invention can be made without departing from the scope and spirit of the invention.

First Modification

In the first and second embodiments, as can be seen from FIGS. 2A to 2C and FIGS. 5A to 5E, the parallax image is correctly viewed from the front surface (the upper surface in the drawings) of the base, and the addressee's name and address are correctly viewed from the rear surface (the lower surface in the drawings) of the base. The parallax image and the addressee's name and address are viewed in the opposite directions. Therefore, the first printing surface and the second printing surface are formed of different materials.

In the first embodiment, an additional adhesive layer may be provided between the first printing surface and the second printing surface. In this case, the parallax image and the addressee's name and address can be viewed in the same direction, and the first printing surface and the second printing surface can be formed of the same material.

A first modification will be described with reference to FIGS. 7A to 7D. FIG. 7A is a diagram illustrating the printing medium 10 according to the first embodiment, and FIG. 7B is a diagram schematically illustrating a first modification of the first embodiment. FIG. 7C is a diagram illustrating the printing medium 100 according to the second embodiment, and FIG. 7D is a diagram schematically illustrating a first modification of the second embodiment.

As represented by a large arrow in FIG. 7A, in the printing medium 10 according to the first embodiment, the parallax image can be viewed from the upper side of the drawing, and the addressee's name and address can be viewed from the lower side of the drawing. However, as shown in FIG. 7B, an adhesive surface S2 having a unit region is additionally provided adjacent to the adhesive surface S1 on the right side of the adhesive surface S1 in order to form an adhesive layer on the rear surface of the adhesive surface S2. In this case, as represented by large arrows in FIG. 7B, the addressee's name and address and the parallax image are viewed in the same direction. When the addressee's name and address are bent in the direction of an arrow in FIG. 7B, it is reversed. Therefore, in the first modification, the addressee's name and address are printed as backward characters.

As represented by large arrows in FIG. 7C, in the printing medium 100 according to the second embodiment, the parallax image can be viewed from the upper side of the drawing, and the addressee's name and address can be viewed from the lower side of the drawing. However, as shown in FIG. 7D, an adhesive surface S21 having a unit region is additionally provided adjacent to the adhesive surface S20 on the right side of the adhesive surface S20 in order to form an adhesive layer on the rear surface of the adhesive surface S21. In this case, as represented by large arrows in FIG. 7D, the addressee's name and address and the parallax image are viewed in the same direction. In this case, the addressee's name and address are printed as backward characters in the second embodiment, but the addressee's name and address are bent in the direction of an arrow in FIG. 7D. Therefore, in the first modification, the addressee's name and address are printed as normal characters without being reversed.

As shown in FIGS. 7A to 7D, an adhesive surface is additionally provided, which makes it possible to form the first printing surface and the second printing surface with the same material. For example, in the printing medium shown in FIG. 7B, two printing surfaces may be formed as an ink absorption layer and an ink transmission layer. In this case, the first and second printing surfaces can be formed of the same material, which makes it easy to form the printing surfaces.

In the printing medium shown in FIG. 7D, the first printing surface and the second printing surface may be formed as ink absorption layers. Alternatively, the two printing surfaces may be formed of ink sheets or printing sheets. In this case, the first printing surface and the second printing surface can be formed of the same material, which makes it easy to form the printing surfaces. In particular, when transfer sheets are used as printing sheets, the printing quality of parallax images can be improved.

During the formation of each printing sheet, the layers or printing sheets may be formed to have the same thickness. In this case, the printing surfaces have the same thickness, which makes it easy to form the printing surfaces.

Second Modification

In the first and second embodiments, for example, as shown in FIG. 1, the axial direction of each of the cylindrical convex lenses 20 formed on the rectangular lenticular sheet 10a is parallel to the long side of the lenticular sheet 10a. However, in a second modification, the axial direction of each of the cylindrical convex lenses may not be parallel to the long side of the lenticular sheet 10a.

Figure 8A:
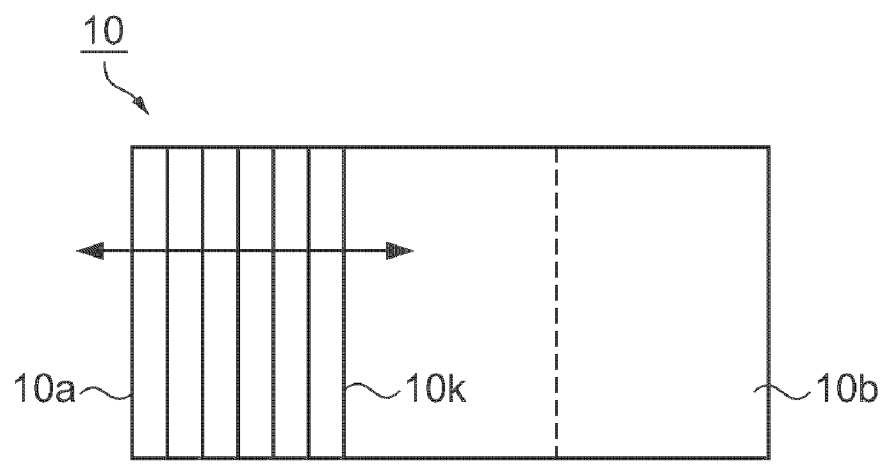
FIG. 8A is a diagram schematically illustrating the printing medium according to the first embodiment.
Figure 8B:
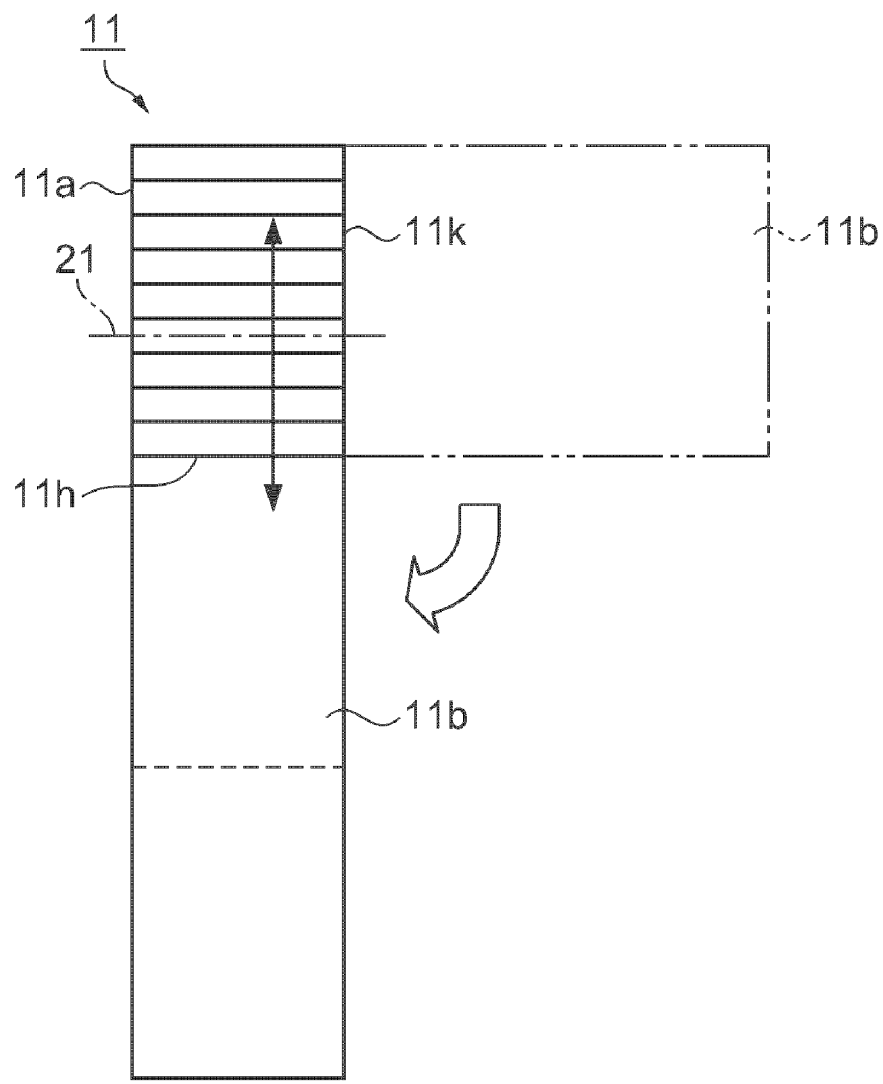
FIG. 8B is a diagram schematically illustrating a printing medium according to a second modification of the first embodiment.

The second modification will be described with reference to FIGS. 8A and 8B. FIG. 8A is a diagram schematically illustrating the printing medium 10 according to the first embodiment, and FIG. 8B is a diagram schematically illustrating a printing medium according to the second modification. In the first embodiment, as shown in FIG. 8A, the cylindrical convex lenses, each having an axial direction in the vertical direction of the drawing, are formed in parallel to each other on the lenticular sheet 10a, and the extending portion 10b extends from a long side 10k of the lenticular sheet toward the right. Therefore, in FIG. 8A, the carriage scans the printing medium in the direction of an arrow to simultaneously perform the detection of information on the pitches among the convex lenses and the printing of addressee's name and address.

In contrast, a printing medium 11 according to the second modification shown in FIG. 8B includes a lenticular sheet 11a having a plurality of cylindrical convex lenses, each having an axial axis 21 in the horizontal direction of FIG. 8B, and an extending portion 11b extending from the lenticular sheet 11a to the lower side of FIG. 8B. In the printing medium 11 shown in FIG. 8B, when the carriage scans the printing medium in the direction of an arrow in FIG. 8A to detect pitches among the convex lenses, the number of detected pitches among the convex lenses 20 becomes smaller, or all the pitches among the convex lenses are not detected, which causes the accuracy of the detected information on the pitched among the convex lenses to be lowered or no pitch information to be obtained, making it difficult to print a parallax image at an appropriate position.

Therefore, in this modification, the extending portion 11b is not formed adjacent to a long side 11k of the rectangular lenticular sheet, but is formed adjacent to a lower short side 11h. In this way, it is possible to set the printing medium 11 in a printer such that the carriage scans the printing medium in the direction of an arrow in FIG. 8B, that is, in the vertical direction to print a parallax image and the addressee's name and address. As a result, the number of detected pitches among the convex lenses increases, and the accuracy of pitch information is improved. Alternatively, the extending portion 12b may be formed on the upper side of the lenticular sheet 11a, not the lower side.

When the axial direction of each of the cylindrical convex lenses is inclined with respect to the long side or the short side of the lenticular sheet 11a, the extending portion may be formed so as to extend from one of the long and short sides that is more parallel to the axial direction of the convex lens. In this way, the number of detected pitches among the convex lenses increases, and the accuracy of pitch information is improved.

Third Modification

In the first and second embodiments, as shown in FIGS. 1 and 4, the extending portion extending from the lenticular sheet toward the right includes a plurality of unit regions adjacent to one another with their long sides, serving as the adjacent portions, interposed therebetween. In this case, it is possible to detect pitches among the convex lenses and to print the parallax image and the addressee's name and address by the scanning operation of the carriage. However, when the width of a printing medium may be larger than the scanning width of the carriage or the transport range of a transporting unit provided in a printing apparatus. In this case, in the third modification, a short side between predetermined unit regions may be used as the adjacent portion, which makes it possible to change the width of the printing medium and for the printing device to print the parallax image and the addressee's name and address. The third modification will be described with reference to FIGS. 9A and 9B.

Figure 9A:
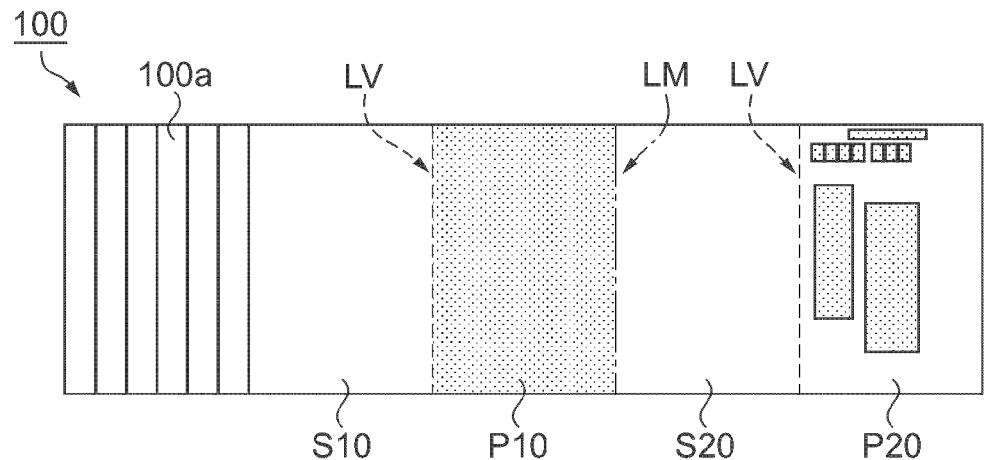
FIG. 9A is a diagram schematically illustrating the printing medium according to the second embodiment.
Figure 9B:
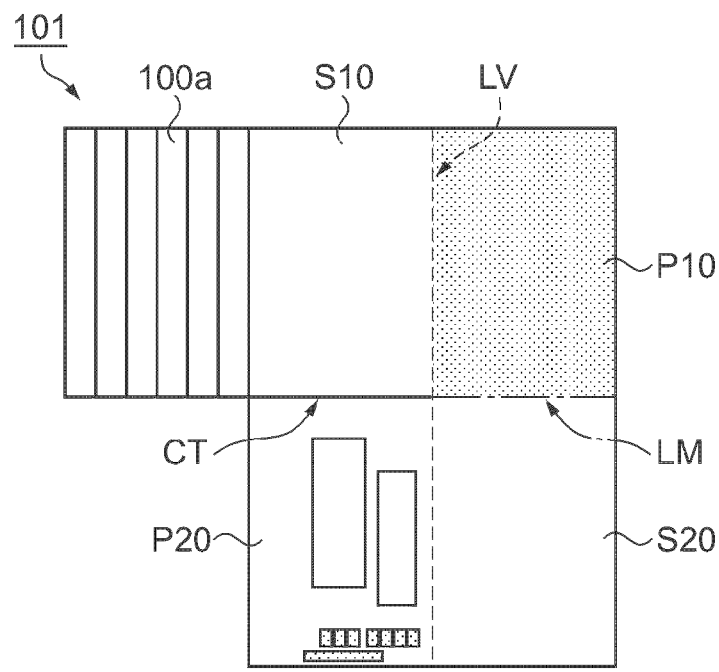
FIG. 9B is a diagram schematically illustrating a printing medium according to a third modification of the second embodiment.

FIG. 9A is a diagram illustrating the printing medium 100 according to the second embodiment, as viewed from the front surface of the lenticular sheet 100a, and FIG. 9B is a diagram illustrating a printing medium 101 according to the third modification, as viewed from the front surface of the lenticular sheet 100a. In the second embodiment, as shown in FIG. 9A, the unit regions of the adhesive surface S10, the first printing surface P10, the adhesive surface S20, and the second printing surface P20 are formed adjacent to one another using their long sides represented by a mountain fold LM and valley folds LV as the adjacent portions. Meanwhile, in FIG. 9B, the first printing surface P10 and the adhesive surface S20, each having a unit region, are adjacent to each other with a short side represented by a mountain fold LM used as the adjacent portion, and the first printing surface P10 and the adhesive surface S20 are adjacent to the other unit regions with a long side represented by a valley fold LV used as an adjacent portion. The adhesive surface S10 and the second printing surface P20 are separated from each other by a cut line.

As a result, in the second embodiment, the printing medium 100 has a width corresponding to five unit regions adjacent to one another in the widthwise direction. However, the printing medium 101 according to this modification can have a width corresponding to three unit regions adjacent to one another in the widthwise direction. As such, predetermined unit regions are adjacent to each other using a common short side as the adjacent portion, which makes it possible to change the width of a printing medium and for a printing apparatus to print a parallax image and the addressee's name and address.

Alternatively, the adhesive surface S10 and the first printing surface P10, or the adhesive surface S20 and the second printing surface P20 other than the adhesive surface S20 and the first printing surface P10 may be used as the predetermined unit regions. As such, it is possible to adjust the width of a printing medium by appropriately setting predetermined unit regions. In this case, the printing direction of a parallax image or the addressee's name and address may vary according to the position of the adjacent portion between the unit regions. For example, in FIGS. 9A and 9B, the second printing surface P20 of the printing medium 101 is rotated by 180° relative to the second printing surface P20 of the printing medium. In this case, the printing direction may be changed to perform printing.

Fourth Modification

In the first and second embodiments, as shown in FIGS. 3A and 3B and FIGS. 6A and 6B, the folding lines are printed on the printing surfaces. Alternatively, the folding lines may be formed on the base.

When the folding lines are formed on the base, the folding lines are not formed by printing, but slits or perforations (not shown) may be provided at predetermined intervals on the base to form the folding lines. Then, the base is easily folded at the slits or the perforations, which makes it possible for a user to bend an extending portion without paying attention to the position of the folding line.

Alternatively, when the folding lines are formed on the base, a line formed by folding the base beforehand may be used as the folding line. In this case, the line folded beforehand makes it easy for the user to fold the extending portion, and thus the user can bond a parallax image to the rear surface of the lenticular sheet.

Fifth Modification

In the first and second embodiments, as shown in FIGS. 3A and 3B and FIGS. 6A and 6B, the printer prints addressee's name and address. Alternatively, the user may write the addressee's name and address by hand. In this case, items necessary for a postcard, for example, sections for items other than the addressee's name and address, such as a zip code section, may be printed.

Sixth Modification

In the third and fourth embodiments, for example, as shown in FIG. 10, the axial direction of each of the cylindrical convex lenses 20 formed on the lenticular sheet 10a is parallel to the long side of the rectangular lenticular sheet 10a. However, in a sixth modification, the axial direction of each of the cylindrical convex lenses may not be parallel to the long side of the lenticular sheet 10a.

Figure 16A:
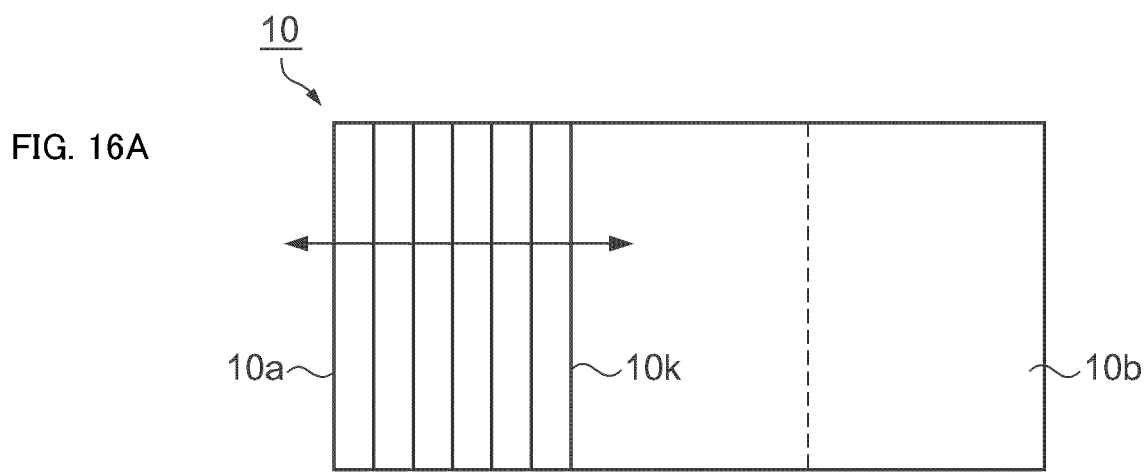
FIG. 16A is a diagram schematically illustrating the printing medium according to the third embodiment.
Figure 16B:
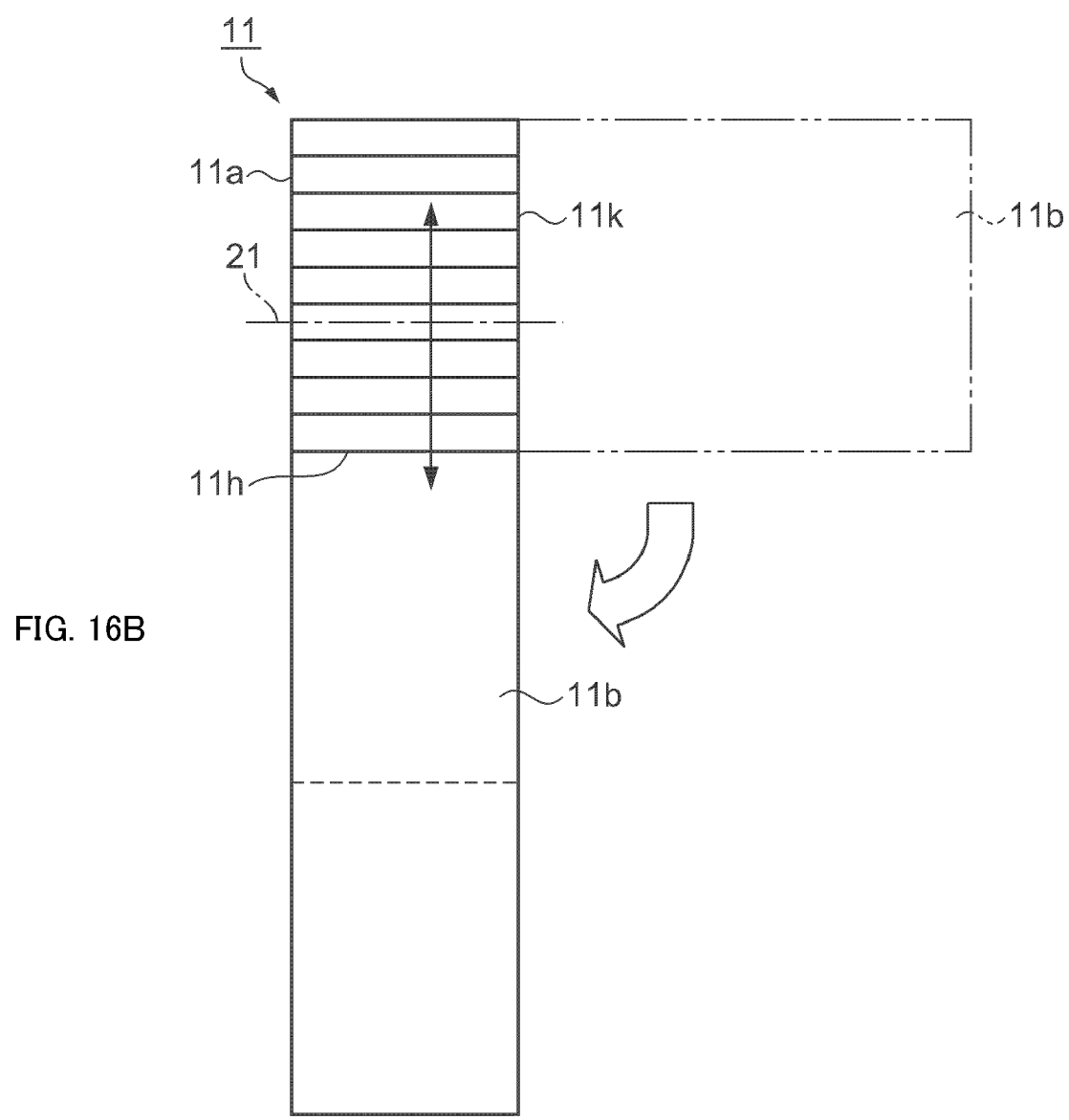
FIG. 16B is a diagram schematically illustrating a printing medium according to a sixth modification.

The sixth modification will be described with reference to FIGS. 16A and 16B. FIG. 16A is a diagram schematically illustrating the printing medium 10 according to the third embodiment, and FIG. 16B is a diagram schematically illustrating a printing medium according to the sixth modification. In the third embodiment, as shown in FIG. 16A, the cylindrical convex lenses, each having an axis in the vertical direction of the drawing, are formed in parallel to each other on the lenticular sheet 10a, and the extending portion 10b extends from a long side 10k of the lenticular sheet toward the right. Therefore, in FIG. 16A, the carriage scans the printing medium in the direction of an arrow to simultaneously perform the detection of information on the pitches among the convex lenses and the printing of a parallax image and the addressee's name and address.

In contrast, a printing medium 11 according to the sixth modification shown in FIG. 16B includes a lenticular sheet 11a having a plurality of cylindrical convex lenses, each having an axis 21 in the horizontal direction of FIG. 16B, and an extending portion 11b extending from the lenticular sheet 11a to the lower side of FIG. 16B. In the printing medium 11 shown in FIG. 16B, when the carriage scans the printing medium in the direction of an arrow in FIG. 16A to detect pitches among the convex lenses, the number of detected pitches among the convex lenses becomes smaller, or all the pitches among the convex lenses are not detected, which causes the accuracy of the detected information on the pitched among the convex lenses to be lowered or no pitch information to be obtained, making it difficult to print a parallax image at an appropriate position.

Therefore, in this modification, the extending portion 11b is not formed adjacent to a long side 11k of the rectangular lenticular sheet 11a, but is formed adjacent to a lower short side 11h. In this way, it is possible to set the printing medium 11 in a printer such that the carriage scans the printing medium in the direction of an arrow in FIG. 16B, that is, in the vertical direction to print a parallax image and the addressee's name and address. As a result, the number of detected pitches among the convex lenses increases, and the accuracy of pitch information is improved. Alternatively, the extending portion 11b may be formed on the upper side of the lenticular sheet 11a, not the lower side.

When the axial direction of each of the cylindrical convex lenses is inclined with respect to the long side or the short side of the lenticular sheet 11a, the extending portion may be formed so as to extend from one of the long and short sides that is more parallel to the axial direction of the convex lens. In this way, the number of detected pitches among the convex lenses increases, and the accuracy of pitch information is improved.

Seventh Modification

In the third and fourth embodiments, as shown in FIGS. 10 and 13, the extending portion extending from the lenticular sheet toward the right includes two unit regions adjacent to each other with a common long side, serving as the adjacent portion, interposed therebetween. In this case, it is possible to detect pitches among the convex lenses and to print the parallax image and the addressee's name and address by the scanning operation of the carriage. However, when the width of a printing medium may be larger than the scanning width of the carriage or the transport range of a transporting unit provided in a printing apparatus. In this case, in the seventh modification, a common short side between predetermined unit regions may be used as the adjacent portion, which makes it possible to change the width of the printing medium and for the printing apparatus to print the parallax image and the addressee's name and address. The seventh modification will be described with reference to FIGS. 17A and 17B.

Figure 17A:
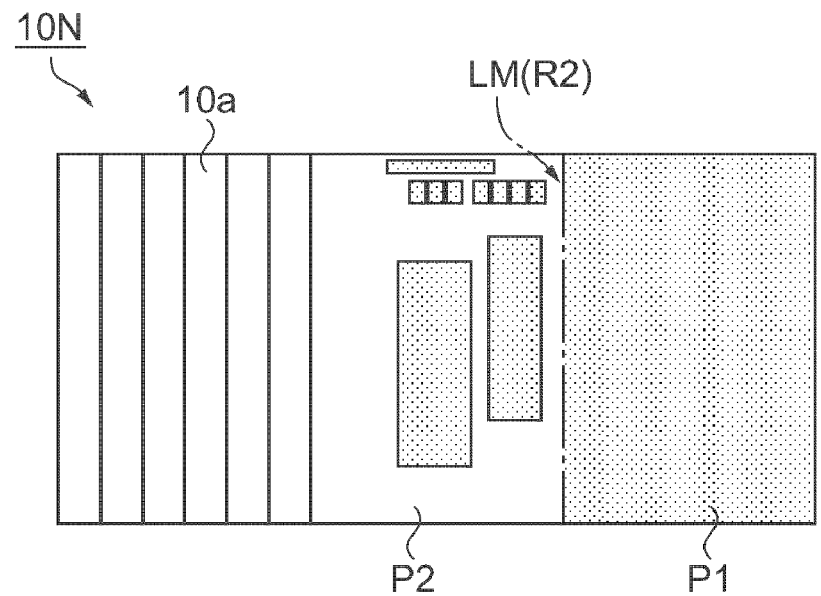
FIG. 17A is a diagram schematically illustrating the printing medium according to the fourth embodiment.
Figure 17B:
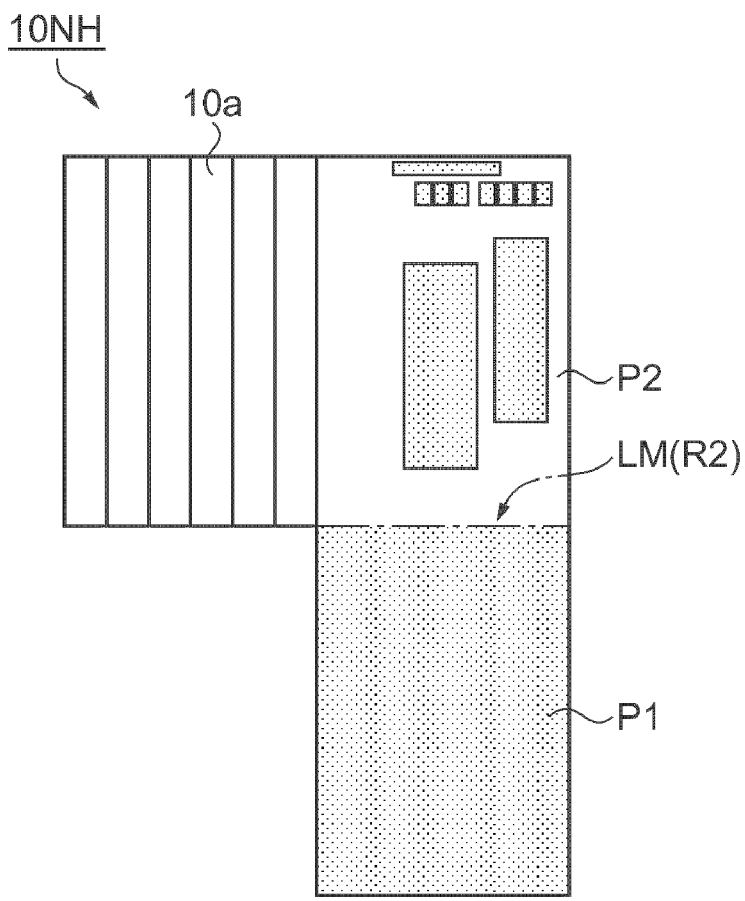
FIG. 17B is a diagram schematically illustrating a printing medium according to a seventh modification.

FIG. 17A is a diagram illustrating the printing medium 10N according to the fourth embodiment, as viewed from the front surface of the lenticular sheet 10a, and FIG. 9B is a diagram illustrating a printing medium 10NH according to the seventh modification, as viewed from the front surface of the lenticular sheet 10a. In the fourth embodiment, as shown in FIG. 17A, the second printing surface P20 is formed adjacent to the right side of the lenticular sheet 10a, and the first printing surface P1 is adjacent to the right side of the second printing surface P2 with a common long side represented by a mountain fold LM used as the adjacent portion. Meanwhile, in FIG. 17B, the first printing surface P1 is formed adjacent to a lower side of the second printing surface P2 that is adjacent to the right side of the lenticular sheet 10a, with a common short side represented by a mountain fold LM used as the adjacent portion.

As a result, in the fourth embodiment, the printing medium 10N has a width corresponding to three unit regions adjacent to one another in the widthwise direction. However, the printing medium 10NH according to this modification can have a width corresponding to two unit regions adjacent to each other in the widthwise direction. As such, predetermined unit regions are adjacent to each other using a common short side as the adjacent portion, which makes it possible to change the width of a printing medium and for a printing apparatus to print a parallax image and the addressee's name and address.

Alternatively, in this modification, the second printing surface P2 and the first printing surface P1 are adjacent to each other with a common short side used as the adjacent portion, but the invention is not limited thereto. For example, the lenticular sheet 10a and the second printing surface P2 are adjacent to each other with a common short side used as the adjacent portion. Alternatively, in the printing medium 10 according to the third embodiment shown in FIG. 10, the lenticular sheet 10a and the first printing surface P1 are adjacent to each other with a common short side used as the adjacent portion. In addition, the lenticular sheet 10a, the first printing surface P1, and the second printing surface P2 may be adjacent to one another with common short sides used as the adjacent portions. According to this modification, the carriage performs different scanning operations to detect pitches among the convex lenses and to print a parallax image and the addressee's name and address.

In this case, the printing direction of a parallax image or the addressee's name and address may vary according to the position of the adjacent portion between the unit regions. For example, in FIGS. 17A and 17B, the first printing surface P1 of the printing medium 10NH is reversed relative to the first printing surface P1 of the printing medium 10N in the horizontal and vertical directions. In this case, the printing direction may be changed to perform printing.

Eighth Modification

In the third and fourth embodiments, as described in FIGS. 12A and 12B and FIGS. 15A and 15B, the folding lines are formed on the printing surfaces. However, the folding lines may be formed on the base.

When the folding lines are formed on the base, slits or perforations may be provided at predetermined intervals on the base to form the folding lines. In this way, the base is easily folded at the slits or perforations, which makes it possible for a user to bend the extending portion at the folding lines without paying attention to the position of the folding lines.

A line formed by folding the base beforehand may be used as the folding line. In this way, the folding lines make it easy for the user to bend the extending portion, and thus to bond a parallax image to the rear surface of the lenticular sheet.

Ninth Modification

In the third and fourth embodiments, the ink absorption layer is formed as a printing surface. However, a printing sheet may be used as the printing surface.

As described above, when a parallax image and the addressee's name and address are printed by an ink jet printing method, the ink absorption layer is formed of a lyophilic polymer resin, such as PVA (polyvinyl alcohol), a cation compound, or fine particles, such as silica. Therefore, the amount of ink discharged or an ink fixing tool depends on a material forming the ink absorption layer. A material forming the ink absorption layer may cause the printing quality of a printed parallax image, such as the resolution or color of the parallax image, to be different from what the user expects. For example, when the user wants to obtain a parallax image having the same quality as that of a photograph, it may be difficult to achieve the same quality of a photograph with the ink absorption layer.

Therefore, in this embodiment, a printing sheet, such as an ink jet sheet for a photograph (hereinafter, referred to as a 'photographic sheet'), is used as the printing surface of a parallax image, considering the above-mentioned problems. In general, glassy photographic sheets and matte photographic sheets are used as the photographic sheets, and it does not matter whether the glassy photographic sheets or the matte photographic sheets are used as the photographic sheets. The photographic sheet is bonded to the base 30 to form the printing surface of the parallax image. Any method may be used to bond the photographic sheet to the base 30. For example, the photographic sheet may be bonded to the base 30 by an adhesive.

Tenth Modification

In the third and fourth embodiments, the thicknesses of the components of the printing medium are not set to predetermined values. However, the lenticular sheet 10a and the printing surface may have the same thickness.

In this case, in FIG. 13, a step difference between the lenticular sheet 10a and the extending portion 10b is reduced, and a gap between the carriage 90a and the printing medium 10N does not vary at the adjacent portion between the lenticular sheet 10a and the extending portion 10b during the scanning operation of the carriage 90a. As a result, the carriage 90a can scan the printing medium 10N while stably maintaining a uniform gap therebetween, without stopping due to the step difference at the adjacent portion. In addition, when the lenticular sheet 10a and the printing surface are formed to have the same thickness, it is possible to form the first printing surface and the second printing surface by the same method and thus to easily form the printing surface.

The first printing surface and the second printing surface may be formed of the same material. In this case, it is possible to easily form the printing surface. For example, when the printing surface is coated, the first printing surface and the second printing surface can be formed by the same coating operation, which makes it possible to easily form the printing surface.

In FIG. 13, the adhesive layer 61 formed on the rear surface of the base 30 may be formed on the entire extending portion 10b with the same thickness as that of the adhesive layer 62. In this case, the printing medium 10N has a substantially uniform thickness in the overall range, and a variation in the thickness of the printing medium 10N is small, which makes it possible for a printing sheet transport member of a printer (not shown), such as a sheet feed roller, to stably transport the printing medium.

The adhesive layer 62 and the adhesive layer 61 may be formed of the same material. In this case, when the adhesive layer is formed on the rear surface of the base, a double-sided adhesive tape or an adhesive formed of the same material can used as the adhesive layer, which makes it easy to form the adhesive layer.

Eleventh Modification

In the fifth embodiment, when bonding the first printing surface and the second printing surface, the user applies an adhesive on the second printing surface or sticks a double-sided adhesive tape on the second printing surface to form the adhesive layer SZ. Therefore, the user needs to form an additional adhesive layer. However, in an eleventh modification, an adhesive layer may be formed on a portion of the first printing surface or the second printing surface beforehand. In this case, it is not necessary to apply, for example, an adhesive to form an additional adhesive, which makes it easy to bond the printing surfaces.

Figure 21A:
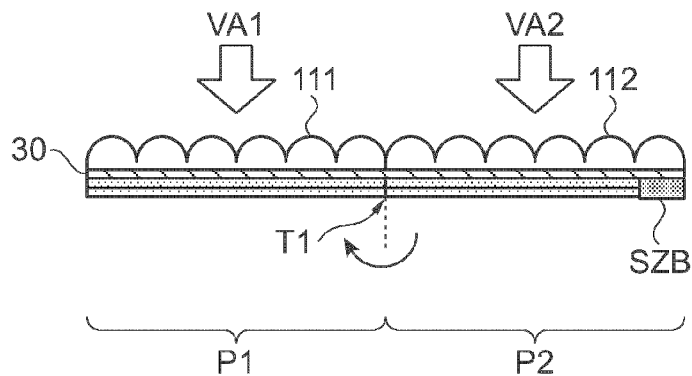
FIG. 21A is a diagram schematically illustrating a printing medium according to an eleventh modification.

FIG. 21A shows the eleventh modification. In this modification, as shown in FIG. 21A, a printing surface is not formed in a portion of the right end of the second printing surface, but an adhesive layer SZB is formed on the surface of the base 30. When the base 30 is folded at the folding line T1, the first printing surface and the second printing surface are easily bonded to each other by the adhesive layer SZB. Therefore, it is possible to easily form a printing medium having the first lenticular sheet 111 and the second lenticular sheet 112 on both surfaces thereof.

The adhesive layer SZB may be formed in a plan-view shape and of a material having sufficient adhesion to prevent one of the first and second printing surfaces from being peeled off from the other printing surface. The adhesive layer SZB may be formed of an epoxy-based, an acryl-based or a cyanoacrylate-based adhesive, or it may be formed of a double-sided adhesive tape. Any kind of material may be used for the adhesive layer as long as it can bond the ink transmission layer 45 to the base 30.

Twelfth Modification

When an adhesive layer is formed on a portion of the second printing surface, it is difficult to print a parallax image corresponding to the entire surface of the second lenticular sheet 112. Therefore, in a twelfth modification, an additional unit region may be provided on the base 30, and an adhesive may be formed on both sides of the provided unit region. In this case, it is possible to print a parallax image on the entire second printing surface, and to easily bond the first printing surface and the second printing surface without forming an additional adhesive layer on the printing surface after the parallax image is printed. Therefore, it is possible to easily form a printing medium having three-dimensional images on both surfaces thereof.

Figure 21B:
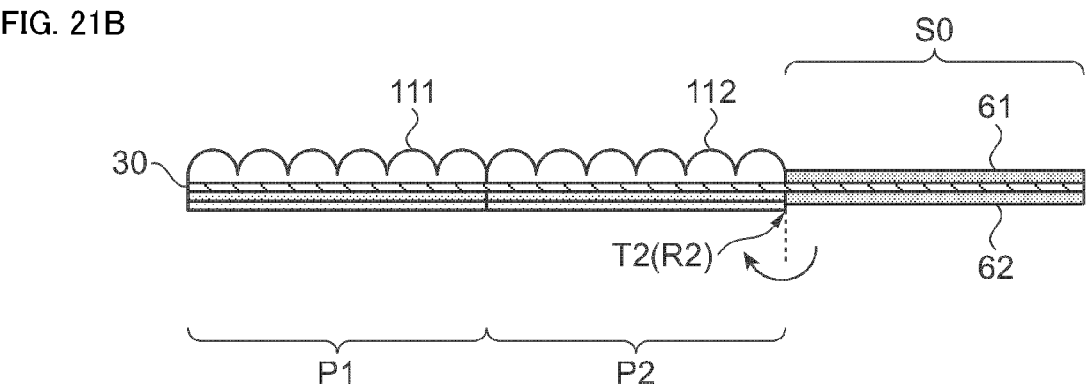
FIG. 21B is a diagram schematically illustrating a printing medium according to a twelfth modification.

The twelfth modification is shown in FIG. 21B. In this modification, as shown in FIG. 21B, one unit region is additionally formed adjacent to the right side of the second printing surface, with the adjacent portion R2 interposed therebetween, on the base 30 and the adhesive layer 61 and the adhesive layer 62 are formed on both surfaces of the unit region. Then, when the unit region is bent at the adjacent portion R2 in the direction of an arrow in FIG. 21B, the unit region of the base is bonded to the second printing surface by the adhesive layer 62. As a result, the adhesive layer 61 is formed on the rear surface of the second printing surface. This structure is the same as the structure in which adhesive layer SZ is replaced with the adhesive layer 61 in the printing medium according to the fifth embodiment shown in FIG. 20A. Therefore, it is possible to easily form a printing medium having three-dimensional images on both surfaces thereof, as shown in FIG. 20B, without forming an additional adhesive on the printing surface after the parallax image is printed.

In this modification, the size of a portion of the base having adhesive layers formed on both surfaces thereof is equal to that of the unit region, but the invention is not limited thereto. For example, the size of a portion of the base having adhesive layers formed on both surfaces thereof may be smaller than that of the unit region.

Thirteenth Modification

In a thirteenth modification, a unit region of the base having adhesive layers on both surfaces thereof may be formed between the first lenticular sheet 111 and the second lenticular sheet 112. In this case, the base is folded in different directions, that is, inward and outward. Therefore, even when an error occurs between the sizes of unit regions, the base can be necessarily folded at adjacent portions. When the unit regions are bent so as to overlap each other, it is possible to prevent the positional deviation between the unit regions.

Figure 21C:
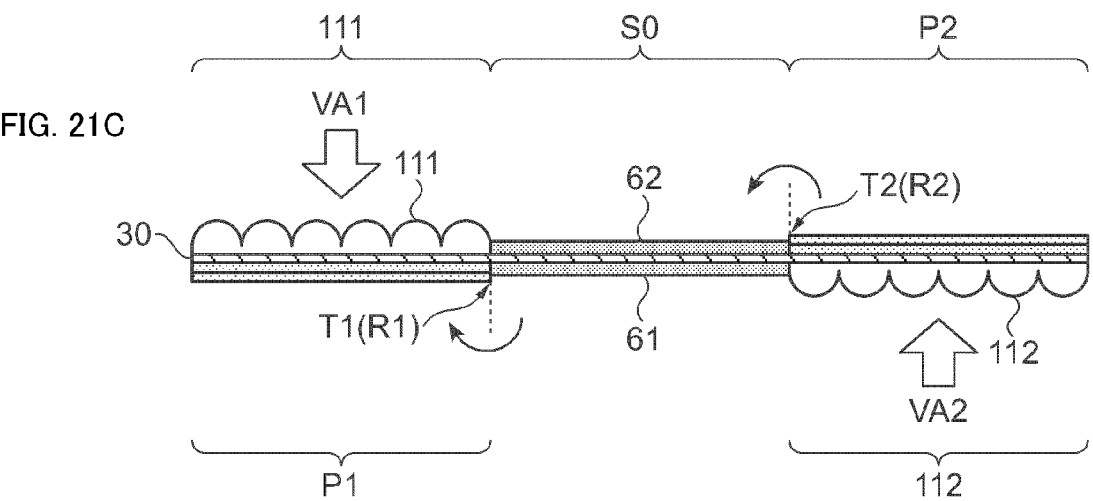
FIG. 21C is a diagram schematically illustrating a printing medium according to a thirteenth modification.

The thirteenth modification is shown in FIG. 21C. In this modification, as shown in FIG. 21C, the first lenticular sheet 111 is fixed to the front surface of the base 30, and the first printing surface is printed on the rear surface of the base 30. Then, one unit region is formed adjacent to the right side of the first lenticular sheet 111 with an adjacent portion R1 interposed therebetween, and the adhesive layer 61 and the adhesive layer 62 are formed on both surfaces of the unit region. Subsequently, the second printing surface is formed on the front surface of another unit region of the base 30 adjacent to the one unit region with an adjacent portion R2 interposed therebetween, and the second lenticular sheet 112 is fixed to the rear surface of the unit region. That is, the first lenticular sheet 111 is fixed to the front surface of the base 30 and the second lenticular sheet 112 is fixed to the rear surface of the base 30.

In the printing of parallax images, after one of the first parallax image and the second parallax image is printed on the printing medium according to the thirteenth modification, the printing medium is turned over to print the other surface. A method of printing parallax images is the same as that described with reference to FIGS. 19A and 19B, and thus a description thereof will be omitted. During the printing of parallax images on the printing surfaces, a folding line T1 and a folding line T2 are printed at positions corresponding to the first adjacent portion R1 and the second adjacent portion R2, respectively.

When the second lenticular sheet 112 is bent at the folding line T2 in the direction of an arrow in FIG. 21C (in the counterclockwise direction), the second printing surface is bonded to the unit region of the base by the adhesive layer 62. This is the same as the state of the printing medium according to the fifth embodiment shown in FIG. 20A. Therefore, when the base is folded at the folding line T1 in the direction of an arrow in FIG. 21C (in the clockwise direction), it is possible to easily form a printing medium having three-dimensional images on both surfaces thereof shown in FIG. 20B.

Fourteenth Modification

In the sixth embodiment, two printing surfaces are formed on one surface of the base 30 on which the lenticular sheet is fixed. However, in a fourteenth modification, two printing surfaces may be formed on one surface of the base 30 opposite the other surface on which the lenticular sheet is fixed. When a user uses a printer that detects pitches among the convex lenses using light passing through the convex lenses as in the fifth embodiment, the printer can print three-dimensional images on both surfaces of the printing medium, according to this modification. The fourteenth modification will be described with reference to FIGS. 24A to 24C.

Figure 24A:
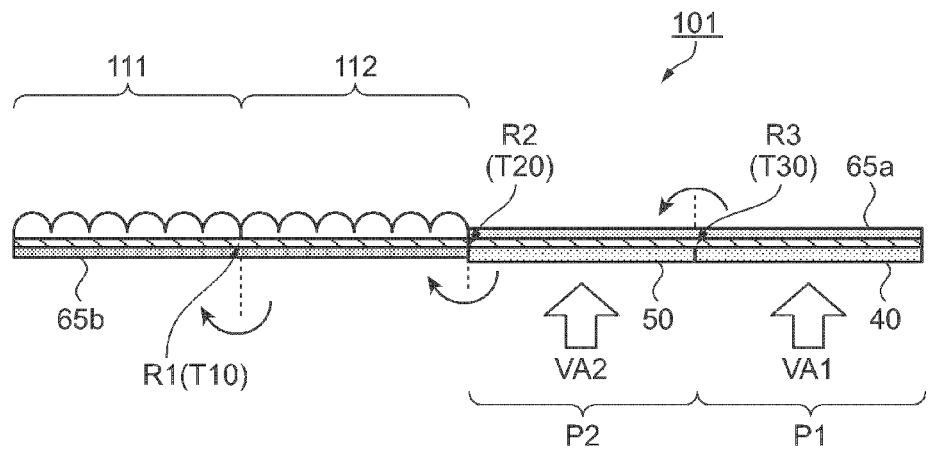
FIG. 24A is a diagram schematically illustrating a printing medium according to a fourteenth modification.

FIG. 24A is a diagram schematically illustrating components of a printing medium 101 according to the fourteenth modification, as viewed from the side. The printing medium 101 includes a first lenticular sheet 111, a second lenticular sheet 112, a base 30, an ink absorption layer 40, an ink absorption layer 50, an adhesive layer 65a, and an adhesive layer 65b. In this modification, the same components as those of the printing medium 100 according to the sixth embodiment shown in FIGS. 22A and 22B are denoted by the same reference numerals.

Figure 24B:
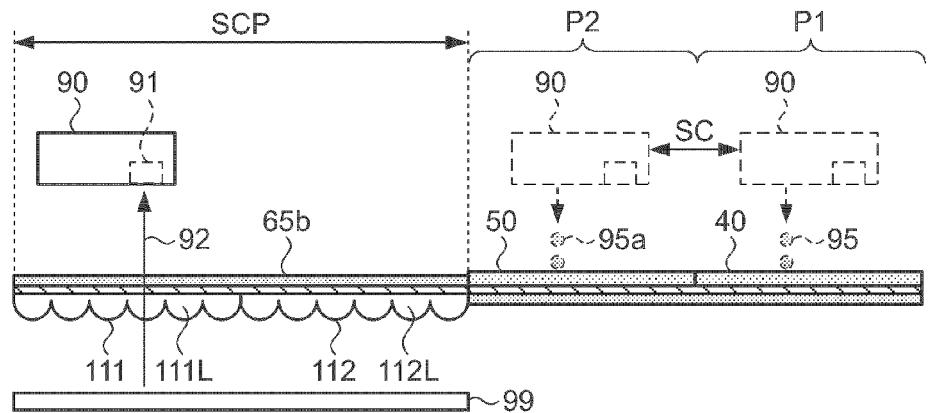
FIG. 24B is a diagram schematically illustrating the printing of images on the printing medium according to the fourteenth modification.
Figure 24C:
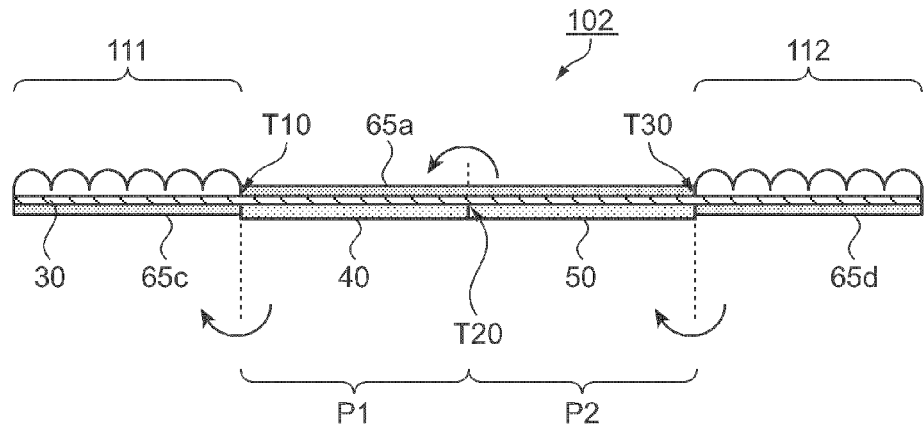
FIG. 24C is a diagram schematically illustrating a printing medium according to a fifteenth modification.

As shown in FIGS. 24A to 24C, similar to the sixth embodiment, the base 30 includes four unit regions adjacent to one another with adjacent portions R1, R2, and R3 interposed therebetween. The first lenticular sheet 111 is fixed to the front surface of a first unit region on the leftmost side of FIG. 24A, and the second lenticular sheet 112 is fixed to the front surface of a second unit region adjacent to the right side of the first unit region with the adjacent portion R1 interposed therebetween. In addition, the ink absorption layer 50 is formed on the front surface of the base 30 in a third unit region adjacent to the right side of the second unit region with the adjacent portion R2 interposed therebetween, and the ink absorption layer 40 is formed on the front surface of the base 30 in a fourth unit region adjacent to the right side of the third unit region with the adjacent portion R3 interposed therebetween. As described above, the ink absorption layer 50 forms the second printing surface, and the ink absorption layer 40 forms the first printing surface. First and parallax images are printed on the first and second printing surfaces, respectively. Therefore, in this modification, the printed first and second parallax images are viewed from the rear surface of the base 30, as represented by large arrows in FIG. 24A.

The adhesive layer 65a is formed on the front surface of the base 30 having the lenticular sheet fixed thereto, and functions to bond one surface of the base 30 opposite the other surface on which the first printing surface is formed to one surface of the base 30 opposite the other surface on which the second printing surface is formed so as to overlap each other. Therefore, the adhesive layer 65a is formed of a material having sufficient adhesion to bond the unit regions of the base 30. In addition, since the adhesive layer 65 is interposed between the first printing surface and the second printing surface, it serves as a base for the first parallax image and the second parallax image. Therefore, the adhesive layer 65a is formed of a material of an opaque color or a color close to an opaque color (for example, white), which is suitable for a base.

The adhesive layer 65b is formed on the rear surface of the base 30 opposite the surface to which the lenticular sheet is fixed, and functions to bond the first printing surface and the second printing surface to the rear surfaces of the corresponding lenticular sheet. Therefore, the adhesive layer 65b is formed of a material having sufficient adhesion to bond the ink absorption layer 40 to the base 30 or the ink absorption layer 50 to the base 30. For example, the adhesive layer 65b may be formed of an epoxy-based, an acryl-based or a cyanoacrylate-based adhesive. In addition, any kind of material may be used for the adhesive layer as long as it can bond the ink absorption layer 40 or the ink absorption layer 50 to the base 30. Further, since the adhesive layer 65b is interposed between each lenticular sheet and each ink absorption layer having a parallax image printed thereon, the adhesive layer 65b may be formed of a material to have sufficient transparency for a viewer to view the parallax image from the front surface of each lenticular sheet when the ink absorption layers are bonded to the base 30, which will be described later.

The bending direction of the printing medium 101 according to this modification will be described below. The same folding lines as those in the sixth embodiment are formed at the corresponding adjacent portions. In the sixth embodiment, as described with reference to FIG. 23A, the unit region is bent at the folding line T30 in the clockwise direction. However, in this modification, the unit region of the base where the first printing surface is formed is bent at the folding line T30 in the counterclockwise direction. That is, when the first printing surface is bent in the direction of an arrow in FIG. 24A, the unit region of the first printing surface is bonded to the unit region on the rear surface of the second printing surface by the adhesive layer 65a.

When the first printing surface is bonded to the second printing surface, the positions of the first and second parallax images are identical with the position of the first and second printing surfaces in the printing medium 100 according to the sixth embodiment shown in FIG. 23B. Therefore, as represented by an arrow in FIG. 24A, when the base 30 is folded at the folding line T20 in the clockwise direction and is then folded at the folding line T10 in the clockwise direction, the printing medium 101 is sequentially bent in the same states as those shown in FIGS. 23C and 23D. As a result, as represented by large arrows in FIG. 23D, in the printing medium 101, the first parallax image can be viewed from the front surface (the upper surface in the drawing) of the first lenticular sheet 111 through the first lenticular sheet 111 and the base 30, and the second parallax image can be viewed from the front surface (the lower surface in the drawing) of the second lenticular sheet 112 through the second lenticular sheet 112 and the base 30.

Next, the printing of parallax images on the printing medium 101 according to this modification will be described with reference to FIG. 24B. FIG. 24B is a diagram schematically illustrating the printing medium 101, as viewed from the side. Similar to the fifth embodiment, a light-emitting surface 99 is arranged below the lower surface of the first and second lenticular sheets 111 and 112 of the printing medium 101. A detecting unit 91 is provided in the carriage 90 to detect transmission light 92 that is emitted from the light-emitting surface 99 and then sequentially passes through each convex lens 111L (convex lens 112L), the base 30, and the adhesive layer 65b.

The detecting unit 91 detects a variation in the amount of transmission light in a pitch detection scanning range SCP, and detects the pitches among the convex lenses 111L of the first lenticular sheet 111 and the pitches among the convex lenses 112L in the second lenticular sheet 112. Then, a predetermined process is performed on the results of the detection, and the processed results are stored in, for example, a storage unit provided in a printer. In this way, information on the pitches among the convex lenses 111L of the first lenticular sheet 111 and information on the pitches among the convex lenses 112L of the second lenticular sheet 112 are stored before the parallax images are printed.

In the fifth embodiment, the detecting unit detects transmission light having passed through the ink absorption layer and the ink transmission layer. In contrast, in this modification, the detecting unit detects transmission light having passed through the adhesive layer. Therefore, only the base and the adhesive layer are interposed between the detecting unit 91 and the transmission light whose amount varies according to the pitches between the convex lenses, and thus this structure has little effect on the transmission light such that the amount of transmission light is not reduced, which makes it possible to improve the accuracy of the detected information on the pitches among the convex lenses.

As represented by a dotted line on the right side of FIG. 24B, when the scanning position of the carriage 90 is moved from the pitch detection scanning range SCP to the second printing surface, the information on the pitches among the convex lenses 112L stored in the storage unit before the printing of the parallax image is read, and ink 95a is discharged from a printing head (not shown) of the carriage 90 onto the surface of the ink absorption layer 50 to print the second parallax image, on the basis of the read pitch information. Then, when the carriage 90 is moved above the first printing surface, the stored information on the pitches among the convex lenses 111L is read, and the printing head (not shown) of the carriage 90 discharges ink 95 onto the surface of the ink absorption layer 40 to print the first parallax image, on the basis of the read pitch information.

The first and second parallax images for right and left eyes that correspond to the convex lenses are formed at appropriate positions corresponding to the first lenticular sheet 111 and the second lenticular sheet 112, on the basis of the information on the pitches among the convex lenses. Then, the base 30 is sequentially folded at the adjacent portions to bond the second parallax image at an appropriate position on the rear surface of the second lenticular sheet 112 and the first parallax image at an appropriate position on the rear surface of the first lenticular sheet 111, thereby forming a printing medium having three-dimensional images on both surfaces.

Fifteenth Modification

In the sixth embodiment, the first lenticular sheet 111 and the second lenticular sheet 112 are fixed to adjacent unit regions. Therefore, as shown in FIG. 23D, after the printing medium is folded, two printing layers, a double base layer, and four adhesive layers are interposed between the unit region of the base where the first lenticular sheet 111 is fixed and the unit region of the base where the second lenticular sheet 112 is fixed. Therefore, when the base 30 is folded at the folding line T10, the base is not accurately folded at the folding line T10 due to a plurality of layers interposed between the unit regions of the base, which results in the positional deviation between the parallax image and the convex lenses.

Therefore, in the fifteenth modification, the first lenticular sheet 111 and the second lenticular sheet 112 may be fixed so as not to be adjacent to each other. In this case, when the base 30 is folded at the folding lines including the folding line T10, the number of layers of components interposed between the unit regions of the base is reduced, which makes it possible to appropriately bend the base 30 at the folding lines. This modification will be described with reference to FIG. 24C.

As shown in FIG. 24C, in a printing medium 102 according to this modification, the first lenticular sheet 111 and the second lenticular sheet 112 are formed on the leftmost and rightmost unit regions of the base such that the first and second printing surfaces are interposed therebetween. Therefore, an adhesive layer 65c for bonding the first printing surface to the rear surface of the first lenticular sheet 111 and an adhesive layer 65d for bonding the second printing surface to the rear surface of the second lenticular sheet 112 are formed on the rear surface of the base 30.

In the printing medium 102 having the components according to this modification, when the base 30 is folded at the folding lines in the direction of arrows in FIG. 24C, only two layers, that is, the adhesive layer and the ink absorption layer, or two adhesive layers are interposed between the unit regions of the folded base. Therefore, the number of components interposed between the unit regions of the folded base is reduced, which makes it possible to appropriately bend the base 30 at the folding line T10. As a result, it is possible to bond the parallax images to the convex lenses with high alignment accuracy.

When the base 30 is folded alternating between inward and outward, the unit regions may have different sizes due to a form error between the unit regions. However, according to this modification, even when the unit regions have different sizes, the base can be folded at all the folding lines. Therefore, the unit regions can be appropriately bent at the folding lines so as to overlap each other, which makes it possible to prevent the positional deviation between the unit regions.

Sixteenth Modification

In the sixth modification and the fourth and fifteenth modifications, both the first printing surface and the second printing surface are formed adjacent to each other on the front surface of the base such that two parallax images can be printed by single-sided printing without turning the printing medium over. In a sixteenth modification, the first printing surface and the second printing surface are formed on both sides of one unit region of the base. In this case, a process of turning a printing medium over to print two parallax images needs to be additionally performed, but the number of unit regions is reduced from four to three, and thus the area of the base is reduced, which results in a reduction in the manufacturing costs of the base. In addition, the base is folded only twice, which makes it possible to reduce the amount of work for the bending operation.

Figure 25A:
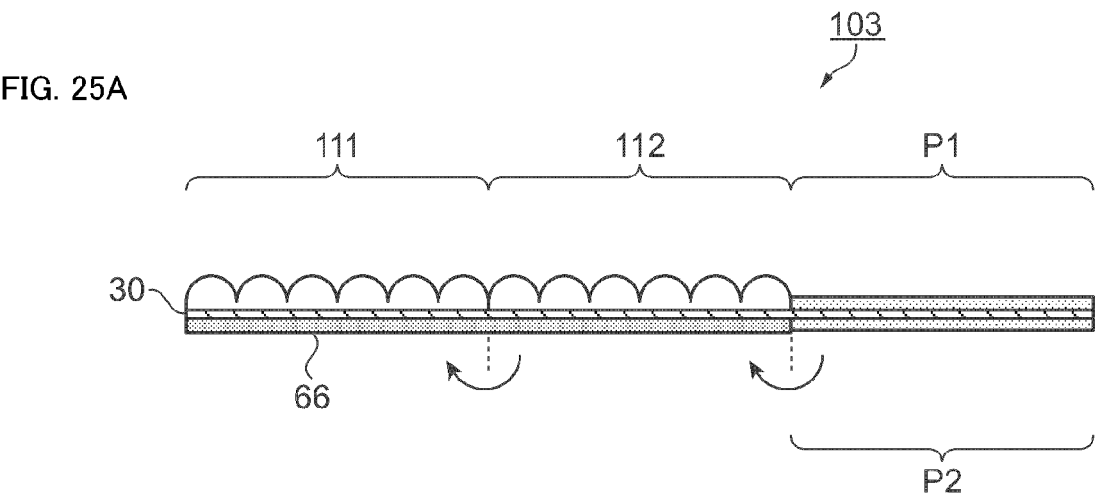
FIG. 25A is a diagram schematically illustrating a printing medium according to a sixteenth modification.

FIG. 25A shows a printing medium 103 according to this modification. As shown in FIG. 25A, the first printing surface is formed on the front surface (the upper surface in FIG. 25A) of the base 30 and the second printing surface is formed on the rear surface of the base in a rightmost unit region of the base. Therefore, the printing medium 103 includes three unit regions corresponding to a first lenticular sheet 111, a second lenticular sheet 112, and the first printing surface P1 (or the second printing surface P2).

When the first printing surface P is bent in the printing medium 101 according to the fourteenth modification shown in FIG. 24A, that is, when the second printing surface P2 is bent in the printing medium 100 according to the sixth embodiment shown in FIG. 23b, the printing medium 101 or the printing medium 100 is identical with the printing medium 103 in structure. Therefore, when the base 30 is folded twice in the clockwise direction, as represented by arrows in FIG. 25A, the second printing surface P2 is bonded at an appropriate position on the rear surface of the second lenticular sheet 112 by an adhesive layer 66, and the first printing surface P1 is bonded at an appropriate position on the rear surface of the first lenticular sheet 111 by an adhesive layer 66, which makes it possible to form a printing medium having three-dimensional images on both surfaces thereof, as shown in FIG. 23D.

Seventeenth Modification

In the sixteenth modification, after the printing medium is folded, two printing layers, a single base layer, and two adhesive layers are interposed between the unit region of the base where the first lenticular sheet 111 is fixed and the unit region of the base where the second lenticular sheet 112 is fixed. Therefore, when the base 30 is folded at the folding lines, the base 30 is not appropriately folded at the folding lines due to a plurality of layers interposed between the unit regions of the base, which results in the positional deviation between the parallax images and the convex lenses.

Therefore, in the seventeenth modification, the printing surfaces may be formed between the first lenticular sheet 111 and the second lenticular sheet 112. In this case, when the base 30 is folded at the folding lines, the number of layers of components interposed between the unit regions of the base is reduced, which makes it possible to appropriately fold the base 30 at predetermined positions. This modification will be described with reference to FIG. 25B.

Figure 25B:
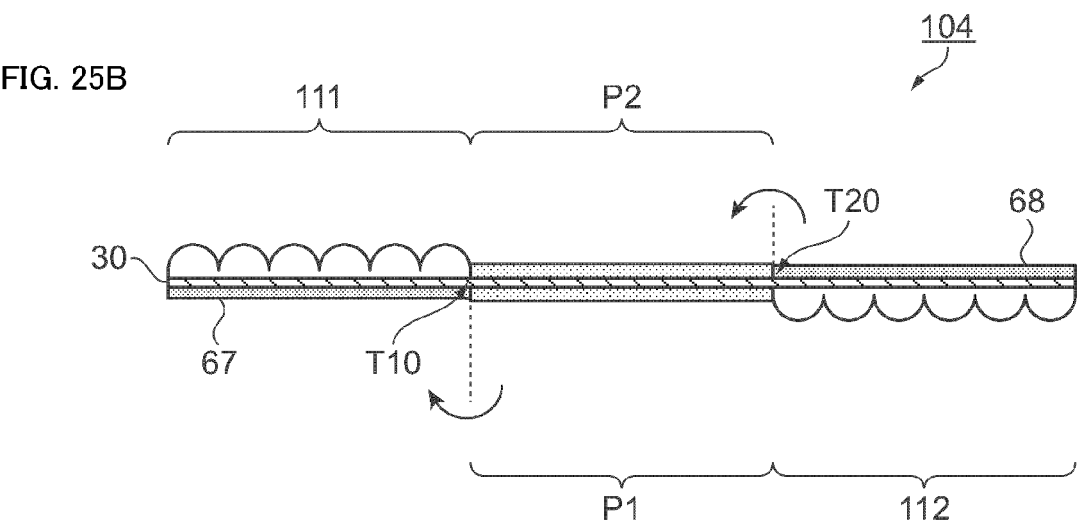
FIG. 25B is a diagram schematically illustrating a printing medium according to a seventeenth modification.
Figure 26:
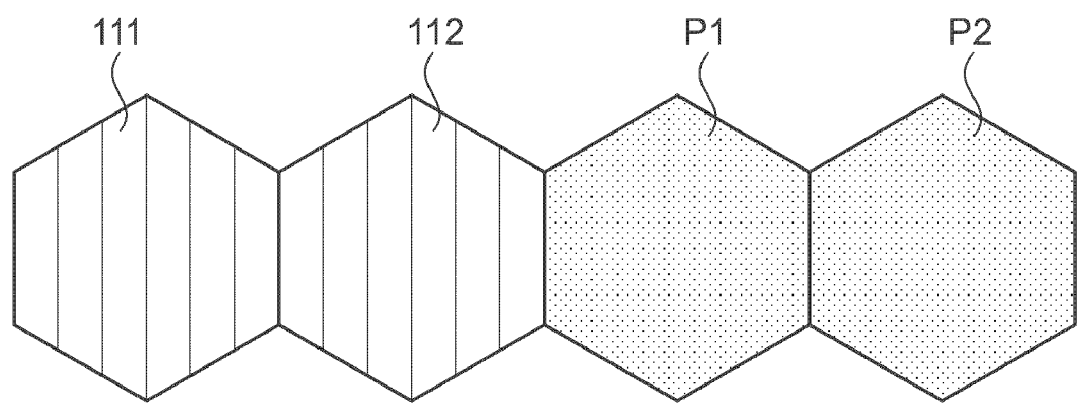
FIG. 26 is a diagram schematically illustrating a printing medium according to a ninth modification.

As shown in FIG. 25B, in a printing medium 104 according to this modification, the first lenticular sheet 111 and the second lenticular sheet 112 are formed on the leftmost and rightmost unit regions of the base such that the first printing surface P1 (or the second printing surface P2) are interposed therebetween. Therefore, the first lenticular sheet 111 and the second printing surface P2 are fixed to the front surface (the upper surface in FIG. 25B) of the base 30, and the second lenticular sheet 112 and the first printing surface P1 are fixed to the rear surface (the lower surface in FIG. 25B) of the base 30.

Further, an adhesive layer 68 for bonding the second lenticular sheet 112 to the second printing surface P2 is formed on the front surface of the base 30, and an adhesive layer 67 for bonding the first lenticular sheet 111 to the first printing surface P1 is formed on the rear surface of the base 30.

In the printing medium 104 having the components according to this modification, when the base 30 is sequentially folded at the folding lines T20 and T10 in the direction of arrows in FIG. 25B, only two layers, that is, the adhesive layer and the ink absorption layer forming the printing surface are interposed between the unit regions of the folded base. Therefore, the number of components interposed between the unit regions of the folded base is reduced, which makes it possible to appropriately fold the base 30 at the folding lines T20 and T10. As a result, it is possible to bond the parallax images to the convex lenses with high alignment accuracy.

Other Modifications

In the above-described embodiments, each adhesive layer is formed of a material having sufficient adhesion to prevent each unit region, such as the first printing surface or the second printing surface, from peeling off from each adhesive surface during assortment or mailing when the printing medium is sent as a postcard. However, when an addressee of the postcard wants only the printing surface having a three-dimensional image formed thereon, a printing surface having the addressee's name and address printed thereon is not needed. Among the adhesive layers, an adhesive layer for bonding the second printing surface having the addressee's name and address printed thereon to the base may have sufficient adhesion for the addressee to peel off the second printing surface from the base.

For example, in the first embodiment shown in FIG. 1, the adhesive layer 61 may have sufficient adhesion for the addressee to peel off the second printing surface P2 from the base, and in the second embodiment shown in FIG. 4, the adhesive layer 610 or the adhesive layer 620 may have sufficient adhesion for the addressee to peel off the second printing surface P20 from the base.

Further, in the above-described embodiments, the lenticular lenses are used as lenses of the lens sheet, but the invention is not limited thereto. For example, other lenses, such as fly-eye lenses or honeycomb lenses, may be used as the lenses of the lens sheet, as long as the lenses can change parallax images, which is an object of the invention.

What is claimed is:

1. A printing medium comprising:
   a rectangular lens sheet that has a surface formed in a predetermined lens shape; and
   a thin base that is fixed to a rear surface of the lens sheet on which no lens is formed and has an extending portion extending from one side of the lens sheet to the outside,
   wherein, the extending portion includes a plurality of unit regions adjacent to one another with adjacent portions, which are common sides, interposed therebetween, where each unit region of the plurality of unit regions comprises a region of the extending portion having approximately a same size and shape as the rear surface of the lens sheet,
   a first printing surface and a second printing surface are formed in corresponding unit regions on one surface of the base that is fixed to the rear surface of the lens sheet or the other surface of the base, and
   at least one unit region is additionally interposed between the unit region where the first printing surface is formed and the unit region where the second printing surface is formed, such that when the printing medium is folded, the second printing surface is folded and affixed to the at least one unit region and then folded again so as to be disposed below the first printing surface and the rectangular lens sheet in a stacked manner.

2. The printing medium according to claim 1,
   wherein at least one unit region is additionally interposed between the unit region corresponding to the rear surface of the lens sheet and the unit region where the first printing surface is formed.

3. The printing medium according to claim 1,
   wherein an adhesive layer is formed on at least one of the one surface of the base that is fixed to the rear surface of the lens sheet and the other surface of the base, unit regions other than the unit region where the first printing surface is formed and the unit region where the second printing surface is formed.

4. The printing medium according to claim 1,
   wherein at least an ink absorption layer for absorbing printing ink or a predetermined printing sheet is provided on the first printing surface or the second printing surface.

5. The printing medium according to claim 1,
   wherein the lens is a lenticular lens having a plurality of cylindrical convex lenses arranged in parallel.

6. The printing medium according to claim 1,
   wherein the extending portion extends from one of four sides of the rectangular lens sheet that is substantially parallel to the axis of each of the cylindrical convex lenses to the outside.

7. The printing medium according to claim 1, wherein folding lines at which the base is folded are provided at the adjacent portions.

8. The printing medium according to claim 1,
   wherein folding lines at which the base is folded are provided at positions corresponding to the adjacent portions on at least one of the first printing surface and the second printing surface.

* * * * *